(12) United States Patent
Hay et al.

(10) Patent No.: US 11,660,760 B2
(45) Date of Patent: May 30, 2023

(54) LOW-PROFILE MANIPULATOR INTERFACE SYSTEM

(71) Applicant: MACDONALD, DETTWILER AND ASSOCIATES INC., Brampton (CA)

(72) Inventors: Gavin Hay, Toronto (CA); Michael Robert Honeybrown, Milton (CA); Peter Krimbalis, Toronto (CA); Justin Charbonneau, Woodbridge (CA)

(73) Assignee: MACDONALD, DETTWILER AND ASSOCIATES INC., Brampton (CA)

( * ) Notice: Subject to any disclaimer, the term of this patent is extended or adjusted under 35 U.S.C. 154(b) by 0 days.

(21) Appl. No.: 17/234,190

(22) Filed: Apr. 19, 2021

(65) Prior Publication Data

US 2021/0237281 A1    Aug. 5, 2021

Related U.S. Application Data

(63) Continuation of application No. 15/829,619, filed on Dec. 1, 2017, now Pat. No. 10,981,281.

(51) Int. Cl.
| | | |
|---|---|---|
| *B25J 15/04* | (2006.01) | |
| *B25J 9/00* | (2006.01) | |
| *H01R 13/629* | (2006.01) | |
| *H01R 33/00* | (2006.01) | |
| *H01R 43/26* | (2006.01) | |

(52) U.S. Cl.
CPC ......... *B25J 15/0408* (2013.01); *B25J 9/0009* (2013.01); *H01R 13/629* (2013.01); *H01R 33/00* (2013.01); *H01R 43/26* (2013.01); *Y10S 901/27* (2013.01)

(58) Field of Classification Search
CPC ... B25J 15/0408; B25J 9/0009; H01R 13/629; H01R 33/00; H01R 43/26; Y10S 901/27; B64G 1/646; B64G 1/1078
See application file for complete search history.

(56) References Cited

U.S. PATENT DOCUMENTS

| | | |
|---|---|---|
| 4,898,348 A | 2/1990 | Kahn |
| 4,929,009 A | 5/1990 | Vandersluis et al. |
| 4,929,011 A | 5/1990 | Vandersluis et al. |
| | (Continued) | |

FOREIGN PATENT DOCUMENTS

| | | |
|---|---|---|
| CA | 1294997 A | 1/1992 |
| CN | 103659840 A | 3/2014 |
| DE | 102015212502 A1 | 1/2017 |

OTHER PUBLICATIONS

International Search Report for the corresponding PCT application PCT/CA2018/051548, dated Apr. 9, 2019.
(Continued)

*Primary Examiner* — Joshua J Michener
*Assistant Examiner* — Cindi M Curry
(74) *Attorney, Agent, or Firm* — Hill & Schumacher

(57) ABSTRACT

The present disclosure relates to a low mass system for releasably securing a robotic arm to a spacecraft and also securing various payloads to the robotic arm and to each other, permitting the robotic arm to be both moved from one location to another suitably equipped location on a spacecraft to another and to allow the free end of the robotic arm to be secured to any payload also similarly equipped such that this payload may be manipulated by the robotic arm.

10 Claims, 40 Drawing Sheets

(56) References Cited

U.S. PATENT DOCUMENTS

| | | | | |
|---|---|---|---|---|
| 5,145,130 | A * | 9/1992 | Purves | B64G 1/641 |
| | | | | 901/1 |
| 7,240,879 | B1 | 7/2007 | Cepollina et al. | |
| 2010/0038491 | A1* | 2/2010 | Cepollina | B64G 1/242 |
| | | | | 244/172.5 |
| 2015/0258683 | A1 | 9/2015 | Izhikevich | |
| 2017/0015443 | A1* | 1/2017 | Lakshmanan | B64G 1/646 |
| 2018/0257242 | A1* | 9/2018 | Ashmore | B64G 1/646 |

OTHER PUBLICATIONS

Walker, B.; Vandersluis, R., "Design, testing and evaluation of latching end effector", 29th Aerospace Mechanisms Symposium, pp. 1-16, Lyndon B. Johnson Space Center Published: 1995.

\* cited by examiner

LOW-PROFILE MANIPULATOR INTERFACE SYSTEM

FIELD

The present disclosure relates to a low mass system for releasably securing one end of a robotic arm (or any other selected object) to a purpose-built attach point on a spacecraft, permitting the robotic arm (or selected object) to be moved from one purpose-built attach point location on the spacecraft and to allow the free end of the robotic arm (selected object) to be secured to any payload also similarly equipped such that this payload may be manipulated by the robotic arm or connected to the selected object.

BACKGROUND

The use of robotics within the context of space operations is well known. Also well known is that one of the overriding constraints of space operations is low mass to reduce the costs to launch objects into space. Efforts to introduce commonality into space system interfaces enhance interoperability and also reduce overall spacecraft mass and complexity, thus reducing the costs to develop and operate these space systems in both the short and long term.

The benefit of any robotic system is greatly enhanced if its mounting point or base can be moved from place to place so that it may act wherever needed with as few limitations as possible. A robotic system or arm that can move itself from location to location within its environment creates a further benefit. This benefit has been realized before in systems such as the Space Station Remote Manipulator System (SSRMS) currently operating on the International Space Station (ISS). The SSRMS' purpose-built attach points are Power Data Grapple Fixtures (PDGF's) which are located at various locations around the ISS, providing a mechanical attach point, as well as power, data and video connections to the manipulator via its Latching End Effectors (LEE) which are located at either end of the seven (7) jointed SSRMS.

One of the special conditions of activities in space is the microgravity environment. Of special interest with respect to robotic arms is that within a microgravity environment a robotic arm need no longer account for the effects of Earth gravity which can result in the two ends of a robotic arm being designed with identical structural capacities without excessive mass penalties. This would not be the case under Earth gravity where the base of an arm, analogous to a human shoulder, must be significantly stronger, and therefore heavier, than the wrist or hand of an arm. The ability to make the two ends of an arm similar in terms of structural capability permits the concept of an arm that may self-move, end over end-wise, or "walk", from one prepared location to another on the spacecraft. In such a case, because of the number of these prepared locations, reducing their mass and complexity reaps significant benefits to the entire spacecraft system.

In addition, the benefits of any robotic system can be enhanced by increasing the number of objects the robotic system can interface with or grasp and subsequently manoeuvre. This can be achieved, to a degree, by creating an interface system where that portion of the interface that is to be replicated most often is also of the lowest possible mass and of the least size and complexity, thereby reducing the overall mass and cost burden on the complement of objects to be handled by the robotic system and encouraging more objects to be compatible with the robotic system.

If the interface at the base of a robotic arm can be the same as the interface between the robotic arm and any object being handled or acquired and then manoeuvred, the benefits are multiplied yet again.

The Low-Profile Manipulator Interface System disclosed herein consists of two primary subassemblies; a relatively complex and heavier "active", subassembly that is permanently attached to both ends of the robotic system or arm, and a low-mass, simple, "passive" subassembly that is attached to objects the robotic system will be based upon or to objects will manipulate. This passive subassembly is both capable of providing the full structural and electrical support needed to act as the base that enables the robotic arm's complete range of capability and of sufficiently low cost and mass to be added to any payloads that require robotic manipulation.

In order to control such complex electromechanical systems effectively, sensors can be used to create an artificial sense of touch or feel allowing the control system to precisely align and control movements of the end of the manipulator when in contact with other components, such as the passive portion of the interface, substantially easing such activities. To date, one problem that has at times limited these grasping operations of the attach point is that this force-moment sensing apparatus has been part of the primary manipulator load path and has had to possess a sufficient dynamic force sensing range to measure both the very small forces generated when attempting to delicately mate an arm to a payload and the much larger forces generated while moving these payloads, or the entire manipulator, from place to place.

SUMMARY

Disclosed herein is low mass system for releasably securing one end of a robotic manipulator (or robotic arm, or any other selected object) to a purpose-built attach point on a spacecraft, permitting the robotic arm to be move from one purpose-built attach point location on the spacecraft and to allow the free end of the robotic arm to be secured to any payload also similarly equipped such that this payload may be manipulated by the robotic arm.

This system and mechanism that releasably and structurally permits a robotic arm to be mounted to a spacecraft or attach a payload to the free end of the manipulator facilitates both the movement of the robotic arm from one place to another via a network of passive interface locations on the spacecraft and provides for the low cost and low mass releasable attachment of various payloads to the robotic arm while separating the force-moment sensing during the mating/demating of the interface from that required to manipulate payloads once the interface has been mounted to the payload or spacecraft.

An embodiment disclosed herein provides a mechanism for releasably mounting a robotic arm to a spacecraft and to payloads that the arm might acquire, manoeuvre and insert or remove from mounting locations on the spacecraft. The method of mounting the arm to the spacecraft is especially designed to permit the arm to be moved, under its own power, from mounting point to mounting point around the spacecraft in order to provide robotic services at various locations around the spacecraft. To that end, all of the active or driven components of the system are contained within that portion of the system that is permanently attached to the robotic arm, termed the "active interface assembly". The portions of the system attached to the host spacecraft or any payloads contain no mechanisms that are independently driven, and are termed the "passive interface assembly" and need not contain any electrical connections unless used as a mounting base for the arm or unless the payload itself requires power and/or data connections to keep it heated or to provide data via the arm to the other computer systems on the spacecraft.

The active portion of the interface contains the latching mechanisms that hold the active and passive portions of the interface together thus providing the structural load carrying capacity necessary for the robotic arm to perform useful tasks. In one embodiment, it also contains force and/or moment sensors mounted on alignment features on the passive interface that are by the control system of the manipulator to align the mating interfaces during the mating process. These sensors are so located that they are not in the structural load path of the robotic system once mated. By positioning these sensors in such a way, the dynamic range of the sensor can be reduced, easing the manufacture and test of such sensors and increasing reliability and robustness by eliminating several sources of potential errors in the control system which is limiting and controlling the forces and moments which occur during the mating process.

An embodiment of the interface coupling system for releasably securing a selected object to a spacecraft and securing various payloads to the selected object and to each other comprises a) an active interface assembly including
a first coupling located at its proximal end for structurally attaching it to the selected object,
electrical connections for electrically connecting it to said selected object,
a second coupling located at its distal end,
an active interface assembly latch mechanism;
an active interface assembly alignment mechanism;
a computer control system connected to said active interface assembly latch mechanism;

b) a passive interface assembly including
a first coupling located at its proximal end complementary to said second coupling on the active interface assembly for structurally attaching said passive interface assembly to said second coupling,
a second coupling located at its distal end for affixing said passive interface assembly to a desired object,
a passive interface assembly alignment mechanism complementary to said active interface assembly alignment mechanism;
passive latch features complementary to, and engageable with, said active interface assembly latch mechanism; and c) a sensor mechanism mounted and configured for sensing the forces and moments that occur during a sequence of aligning the active and passive interface assemblies together, said sensor mechanism being connected to said computer control system; and d) said computer control system being programmed with instructions to use the sensed forces and moments output from said sensor mechanism to control the alignment of said active and passive interface assemblies until they are sufficiently aligned to initiate a latching sequence to releasably and rigidly lock said active and passive interface assemblies together.

The sensor mechanism may be mounted in the active interface assembly, and wherein the sensor mechanism does not run through a primary structural load path of the passive and active interfaces or selected object.

The sensing mechanism may be a force moment sensor operably coupled to the active interface assembly alignment mechanism and configured to sense forces and moments on the active interface assembly alignment mechanism during alignment and engagement of the active interface assembly alignment mechanism to the passive interface assembly alignment mechanism.

The sensor mechanism may be mounted in said passive interface assembly, and wherein said passive interface assembly includes electrical connections configured to connect said sensor mechanism to said computer control system.

The sensor mechanism may be mounted in the selected object.

The selected object may be a robotic manipulator.

The interface coupling system may further comprise a sensor system mounted on one or both of the active and passive interface assemblies for enabling remote operator control of all activities associated with aligning and latching the active and passive interface assemblies together based on feedback from the sensor system.

The sensor system may comprise any one or combination of a camera based vision system, radar and LIDAR.

The second coupling on the active interface assembly and the first coupling on the passive interface assembly may be matched halves of a Hirth coupling.

The passive interface assembly mechanism may include one or more elongate alignment pins, and the active interface assembly alignment mechanism may comprise one or more elongate alignment sockets having a size and shape to accept the one or more elongate alignment pins.

The latch mechanism may include an actuator connected to the computer control system and latch arms wherein once the active and passive interface assemblies have come into sufficient contact, based on feedback from the sensor mechanism, the computer control system instructs the actuator to advance thereby forcing the latches outwards and into engagement with said passive latch features within the passive interface assembly to lock the active and passive interface assemblies together.

A further understanding of the functional and advantageous aspects of the disclosure can be realized by reference to the following detailed description and drawings.

BRIEF DESCRIPTION OF THE DRAWINGS

Embodiments of the mechanism for releasably securing a robotic system or arm to a spacecraft or payload will now be described, by way of example only, with reference to the drawings, in which:

FIG. 23A to 23E shows series of figures illustrating the alignment and contact of the AIA onto the PIA in which:

FIG. 23A shows the approach;

FIG. 23B shows contact (at the maximum lateral offset of the active half of the AIA with respect to the PIA);

FIG. 23C shows lateral alignment and advance of the AIA with respect to the PIA;

FIG. 23D shows full coarse alignment of the AIA to the PIA; and

FIG. 23E shows the AIA nearly in full alignment and contact with the PIA.

FIG. 24A to 24E show a series of Figures illustrating the operation of the AIA latching mechanism as it achieves the structural and electrical connection between the AIA and the PIA in which:

FIG. 24A shows the latch sequence at approximately the same point in the sequence as illustrated in FIG. 23E, with coarse alignment achieved and coupling halves in light contact;

FIG. 24B shows the actuator advancing and forcing the latches outwards,

FIG. 24C shows the latches further deployed to the point where the AIA may no longer completely separate from the PIA;

FIG. 24D shows the latches fully engages with the ramps on the PIA, ensuring the AIA is fully structurally mated to the PIA but the electrical connection has yet to be completed; and FIG. 24E shows the latch mechanism with the actuator fully extended, the latches fully engaged on the ramps and the electrical connectors fully mated.

FIG. 28A shows the manipulator 100 manoeuvering attached payload 130 fitted with a PIA 200 towards an AIA 400 fixed to the spacecraft 120.

FIG. 28B shows the payload 130 releasably mated to both the manipulator 100 and the spacecraft 120.

FIG. 28C shows the payload 130 now releasably mated to the spacecraft 120 with the manipulator 100 free to perform other tasks.

FIG. 29A shows the PIA 200 on a first payload 130 being moved towards an AIA 400 about to be berthed to the spacecraft 120.

FIG. 29B shows a payload 130 now releasably mated to the spacecraft 120 and an additional payload 130 being manoeuvered in anticipation of being mated the payload 130 currently releasably mated to the spacecraft 130.

FIG. 29C shows an additional payload 130 having been mated to the previous two creating a larger assemblage, FIG. 29D shows the larger assemblage of payloads 130 with the manipulator 100 attached to a PIA 200 on the assemblage, and having been released by the spacecraft-mounted AIA 400, being moved away from the spacecraft 130.

DETAILED DESCRIPTION

Figure 1:
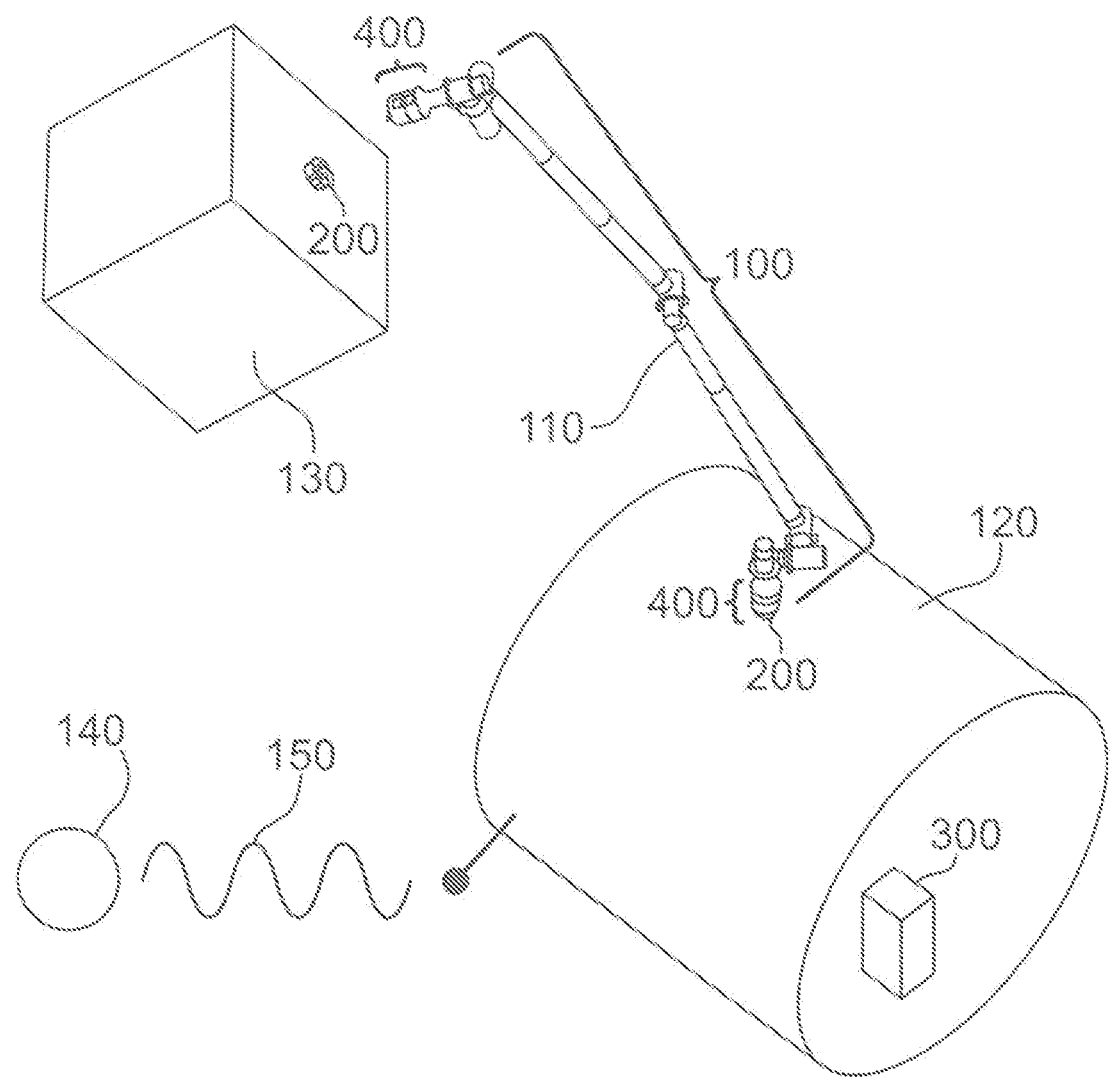
FIG. 1 shows an overall view of the entire system showing how the various principle elements relate to each other.

Various embodiments and aspects of the disclosure will be described with reference to details discussed below. The following description and drawings are illustrative of the disclosure and are not to be construed as limiting the disclosure. The drawings are not necessarily to scale. Numerous specific details are described to provide a thorough understanding of various embodiments of the present disclosure. However, in certain instances, well-known or conventional details are not described in order to provide a concise discussion of embodiments of the present disclosure.

As used herein, the terms, "comprises" and "comprising" are to be construed as being inclusive and open ended, and not exclusive. Specifically, when used in this specification including claims, the terms, "comprises" and "comprising" and variations thereof mean the specified features, steps or components are included. These terms are not to be interpreted to exclude the presence of other features, steps or components.

As used herein, the term "exemplary" means "serving as an example, instance, or illustration," and should not be construed as preferred or advantageous over other configurations disclosed herein.

As used herein, the terms "about" and "approximately", when used in conjunction with ranges of dimensions of particles, compositions of mixtures or other physical properties or characteristics, are meant to cover slight variations that may exist in the upper and lower limits of the ranges of dimensions so as to not exclude embodiments where on average most of the dimensions are satisfied but where statistically dimensions may exist outside this region. It is not the intention to exclude embodiments such as these from the present disclosure.

The following is a description of the preferred embodiment of the low-profile manipulator interface system. Additional embodiments will also be described.

The preferred embodiment consists of the following components in reference to the Figures.

| | |
|---|---|
| 100 | Manipulator |
| 110 | Arm Subassembly |
| 120 | Spacecraft |
| 130 | Payload |
| 140 | Ground Station |
| 150 | Radio Communications |
| 160 | Camera system |
| 170 | Field of View |
| 180 | Target |
| 200 | Passive Interface Ass'y |
| 210 | 1$^{st}$ half of Hirth Coupling |
| 220 | Connector Frame |
| 230 | Latch Ramp |
| 240 | Alignment Pin |
| 250 | Passive Housing |
| 260 | Ramp Doubler |
| 270 | Housing Fastener |
| 280 | Connector |
| 290 | Connector Bracket |
| 300 | Computer Control System |
| 350 | Latch Cam Surface |
| 400 | Active Interface Assembly |
| 410 | Forward Housing |
| 420 | Aft Housing |
| 430 | 2$^{nd}$ half of Hirth Coupling |
| 440 | Microswitch |
| 450 | Pillar Support |
| 460 | Tapered Gib |
| 470 | Linear Bearing Rail |
| 480 | Linear Bearing Platform |
| 500 | Latch Assembly |
| 510 | Latch Arm |
| 520 | Latch Roller |
| 530 | Roller bushing |
| 540 | Midplane Plate |
| 550 | Latch Pillar |
| 560 | Pillar Bushing |
| 570 | Load Sensor Washer |
| 580 | Load Sensor |
| 590 | Spring Washer |
| 600 | Bellville Springs |
| 610 | Spring Housing |
| 620 | Jam Nut |
| 630 | Connector Plate |
| 640 | Actuator Roller |
| 650 | Connector |
| 660 | Actuator Frame |
| 670 | Cable Guide |
| 680 | Ball Screw |
| 690 | Latch Bearing |
| 700 | Keyed bushing |
| 710 | Actuator Needle Bearing |
| 720 | Latch Needle Bearing |
| 730 | Latch Axle |
| 740 | Actuator Axle |
| 750 | Pillar Axle |
| 760 | Microswitch |
| 770 | Microswitch Tree |
| 780 | Bushing |
| 790 | Microswitch Actuation Surface |
| 800 | Alignment Socket |
| 810 | Force Moment Sensor (FMS) |
| 820 | FMS Plate |
| 830 | Spring Bushing |
| 840 | Reaction Washer |
| 850 | Spring |
| 860 | Stiffener Plate |
| 900 | Geartrain Housing |
| 910 | Motor |
| 920 | Idler Gear |
| 930 | Latch Drive Gear |
| 940 | Motor Output Gear |
| 950 | Motor Bearing |
| 960 | Motor Mount Plate |
| 970 | Motor Bearing plate |
| 980 | Idler Bearing Plate |
| 990 | Idler Bearing |

In an embodiment there is provided an interface coupling system for releasably securing a selected object to a spacecraft and securing various payloads to the selected object and to each other. The coupling system is comprised of an active interface assembly including 1) a first coupling located at its proximal end for structurally attaching it to the selected object, 2) electrical connections for electrically connecting it to the selected object, 3) a second coupling located at its distal end, 4) an active interface assembly latch mechanism, 5) an active interface assembly alignment mechanism, and 6) a computer control system connected to the active interface assembly latch mechanism. This embodiment also includes a passive interface assembly including 1) a first coupling located at its proximal end complementary to the second coupling on the active interface assembly for structurally attaching the passive interface assembly to said second coupling, 2) a second coupling located at its distal end for affixing the passive interface assembly to a desired object, 3) a passive interface assembly alignment mechanism complementary to said active interface assembly alignment mechanism, 4) a passive latch features complementary to, and engageable with, the active interface assembly latch mechanism. This embodiment further includes a sensor mechanism mounted and configured for sensing the forces and moments that occur during a sequence of aligning the active and passive interface assemblies together and the sensor mechanism is connected to the computer control system. The computer control system being programmed with instructions to use the sensed forces and moments output from the sensor mechanism to control the alignment of the active and passive interface assemblies until they are sufficiently aligned to initiate a latching sequence to releasably and rigidly lock the active and passive interface assemblies together.

In an embodiment the sensor mechanism is mounted in the active interface assembly, and wherein the sensor mechanism does not run through a primary structural load path of the passive and active interfaces or selected object. In this embodiment the sensing mechanism is a force moment sensor operably coupled to the active interface assembly alignment mechanism and configured to sense forces and moments on the active interface assembly alignment mechanism during alignment and engagement of the active interface assembly alignment mechanism to the passive interface assembly alignment mechanism.

In an embodiment the sensor mechanism is mounted in the passive interface assembly, and the passive interface assembly includes electrical connections configured to connect the sensor mechanism to the computer control system.

In an embodiment the sensor mechanism is mounted in the selected object.

In the above mentioned embodiments the selected object is a robotic manipulator.

In the above mentioned embodiments further comprising a sensor system mounted on one or both of the active and passive interface assemblies for enabling remote operator control of all activities associated with aligning and latching the active and passive interface assemblies together based on feedback from the sensor system. This sensor system comprises any one or combination of a camera based vision system, radar and LIDAR.

In all the embodiments mentioned above the second coupling on the active interface assembly and the first coupling on the passive interface assembly are matched halves of a Hirth coupling.

In all the embodiments mentioned above the passive interface assembly mechanism includes one or more elongate alignment pins, and the active interface assembly alignment mechanism comprises one or more elongate alignment sockets having a size and shape to accept the one or more elongate alignment pins.

In all the embodiments mentioned above the latch mechanism includes an actuator connected to the computer control system and latch arms wherein once the active and passive interface assemblies have come into sufficient contact, based on feedback from the sensor mechanism, said computer control system instructs the actuator to advance thereby forcing the latches outwards and into engagement with the passive latch features within the passive interface assembly to lock the active and passive interface assemblies together.

Further structural and operational details of the interface coupling system will be described in detail with respect to the Figures hereinafter.

Figure 3:
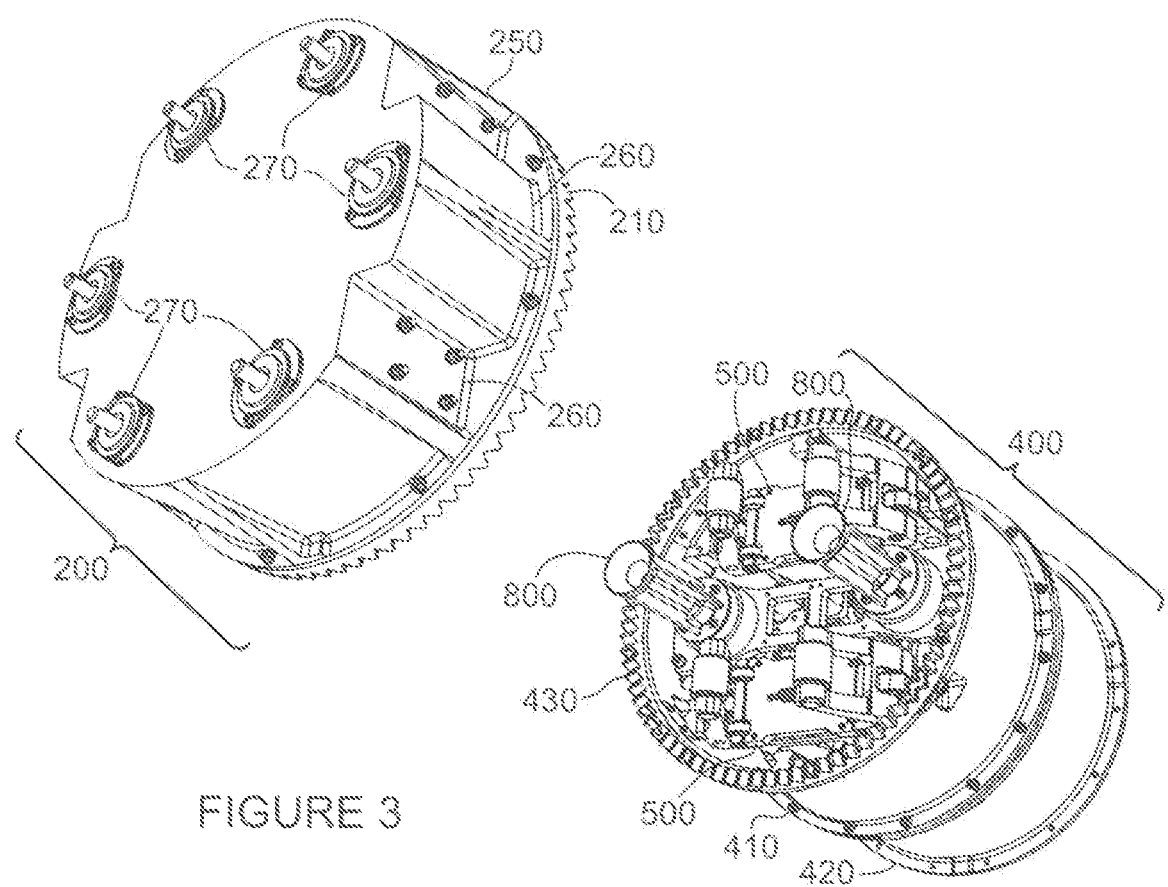
FIG. 3 is an overall isometric view of the active and passive parts of the interface system looking towards the Active Interface Assembly (AIA).

As shown in FIG. 1, the Low-Profile Manipulator Interface System consists of two primary components, the passive interface assembly PIA 200 and the active interface assembly AIA 400. The AIA 400 is attached to an arm subassembly 110 forming part of manipulator 100 with numerous degrees of motional freedom sufficient to perform its design tasks. As illustrated in FIG. 1, the arm subassembly 110 has seven degrees of freedom, but this is not a requirement. In terms of this disclosure, the arm subassembly 110 shown acts to manoeuver the AIA 400 into proximity of the PIA 200 and then to accomplish, in the manner described below, the coarse positioning of the AIA 400 relative to the PIA 200 such that a final structural and electrical mating of the two subassemblies may be accomplished by mechanisms within the AIA 400. In this embodiment, the PIA 200 is attached to the host spacecraft 120 and to the payload 130 using housing fasteners 270 (FIG. 3). A payload 130 or a spacecraft 120 may have numerous PIA 200 subassemblies attached to it as required by mission parameters. Each PIA 200 may serve as a structural connection and, if sufficient electrical connection capability is installed, as an electrical connection to the arm subassembly 110.

Figure 2:
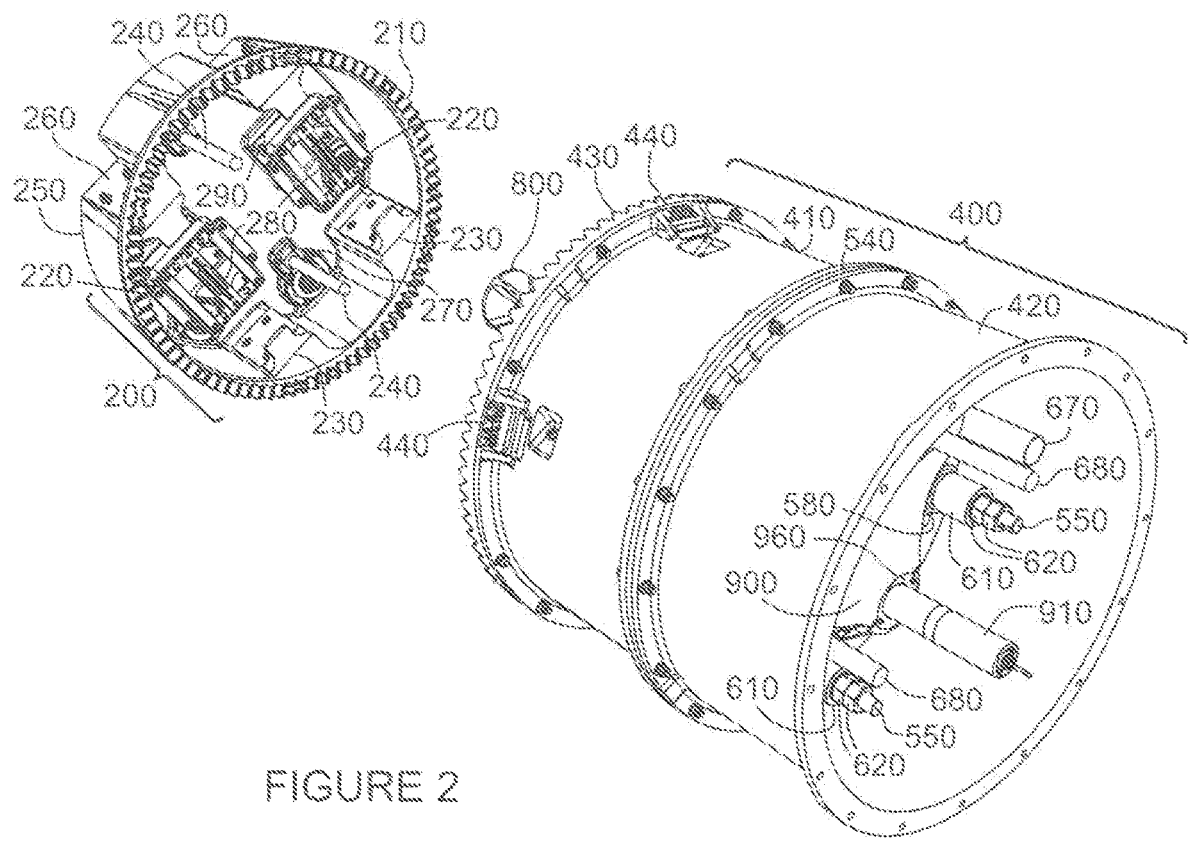
FIG. 2 is an overall isometric view of the active and passive parts of the interface system looking towards the Passive Interface Assembly (PIA).

FIG. 2 shows the principle components of the low-profile manipulator interface system when viewed from the outside while looking towards the PIA 200. The PIA 200 consists of first half of the Hirth coupling pair 210, connector frame 220, latch ramp 230, alignment pins 240, passive housing 250, ramp doubler 260, housing fasteners 270, connectors 280, and connector bracket 290.

On the AIA 400 can be seen the forward housing 410, aft housing 420, the second half of the Hirth coupling pair 430, microswitch 440, midplane plate 540, latch pillar 550, load sensor 580, spring housing 610, jam nuts 620, alignment socket 800, geartrain housing 900, motor 910, and motor mount plate 960.

FIG. 3 is similar to FIG. 2 except looking in the opposite direction down the long axis. On the PIA 200 is shown Hirth coupling 210, passive housing 250, ramp doubler 260 and the housing fasteners 270.

On the AIA 400 it shows the forward housing 410, aft housing 420, Hirth coupling 430, midplane plate 540 (see FIG. 2), latch assemblies 500, and the alignment sockets 800.

Figure 4:
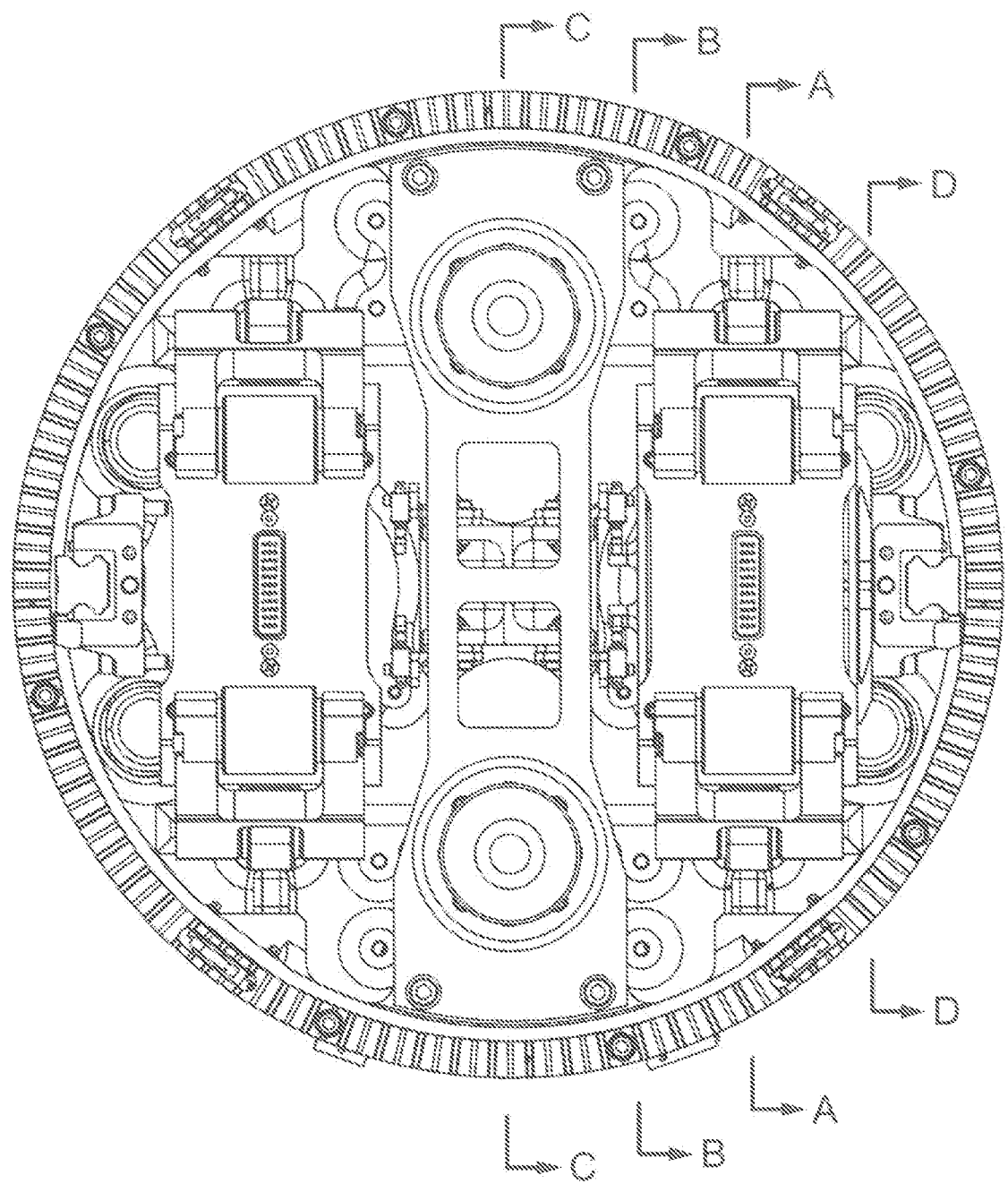
FIG. 4 is an end view of the AIA showing the various section planes used in other figures.

FIG. 4 is an end view of the AIA 400 showing the locations of the four section lines, A-A, B-B, C-C and D-D used in other Figures as described below.

Figure 5:
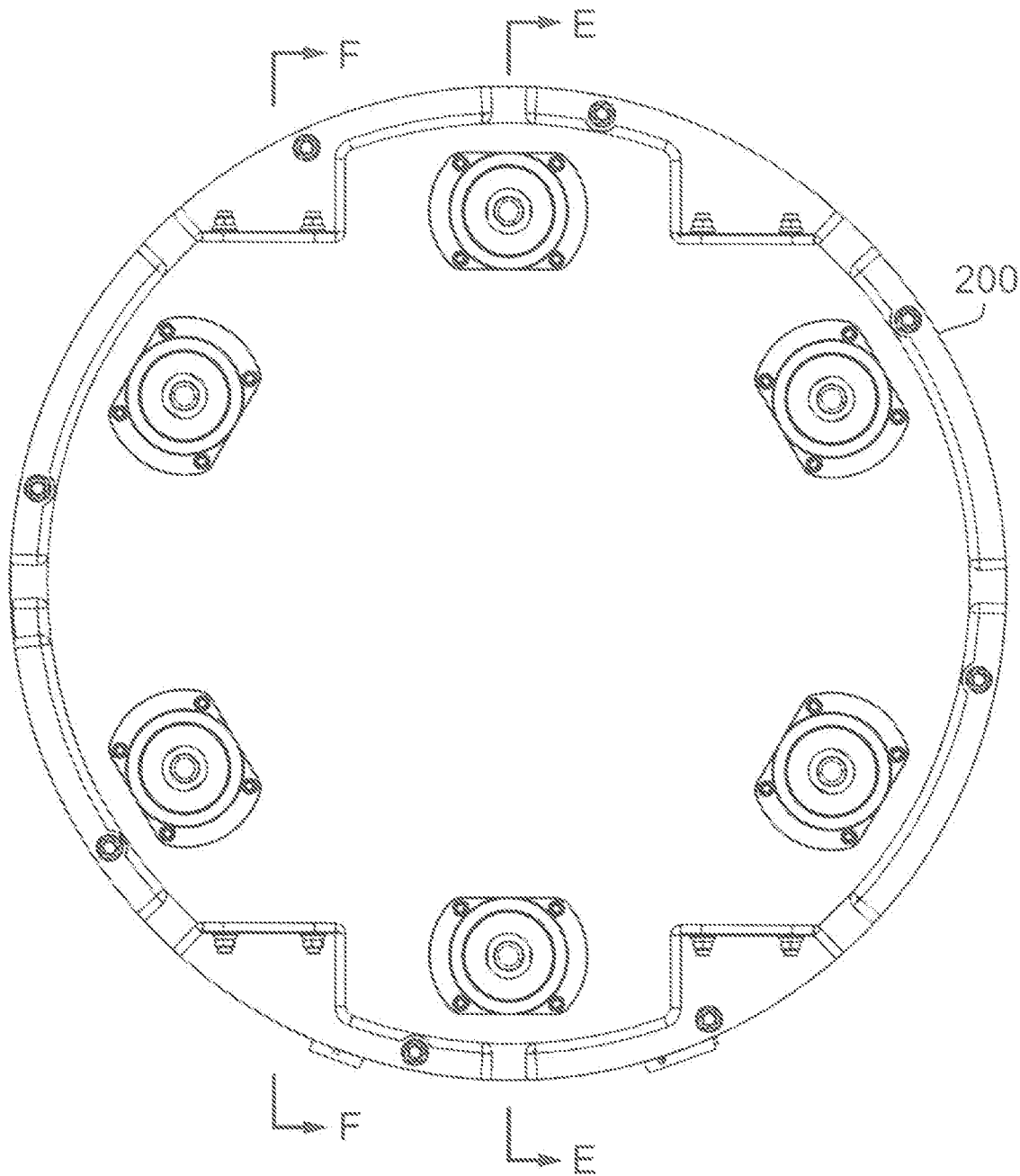
FIG. 5 is an end view of the PIA showing the various section planes used in other figures.

FIG. 5 is an end view of the PIA 200 showing the locations of the two section lines, E-E and F-F used in other Figures as described below.

Figure 6:
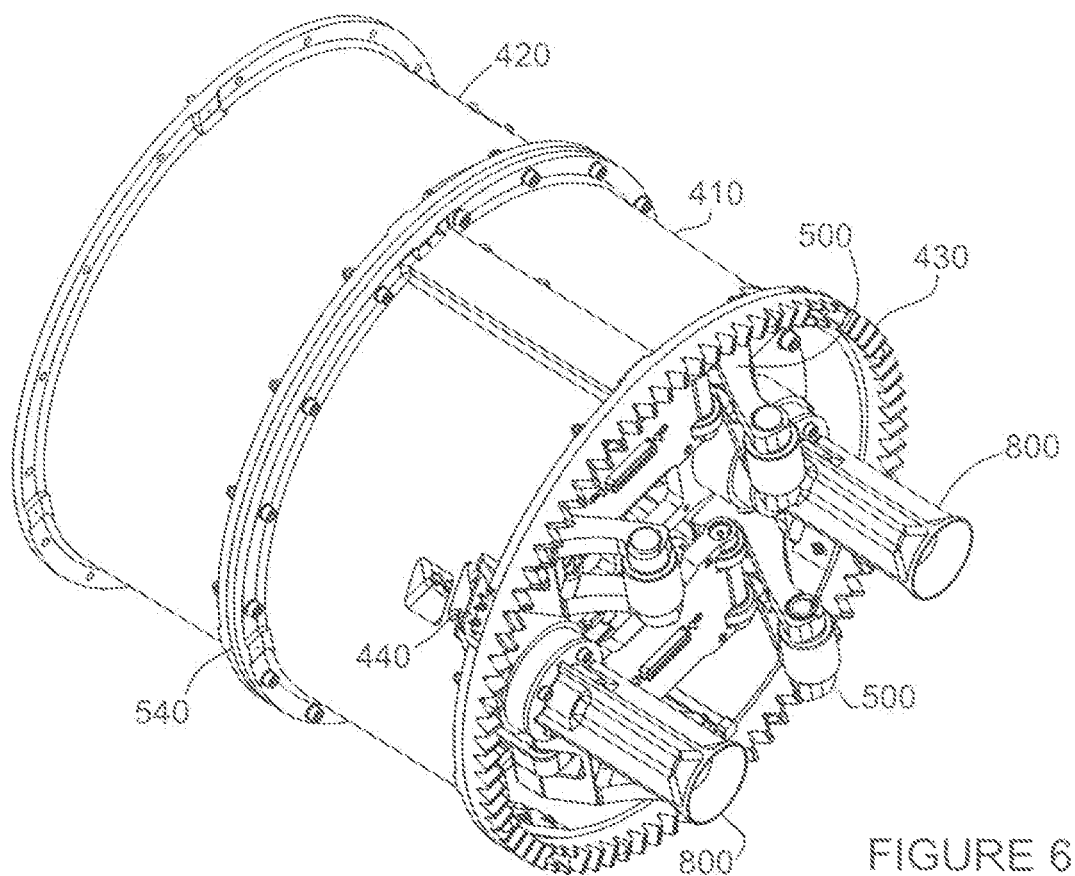
FIG. 6 is an isometric view of the AIA identifying the main externally visible features.

FIG. 6 is an exterior isometric view of the AIA 400 showing the forward housing 410, aft housing 420, Hirth coupling 430, microswitch 440, midplane plate 540, latch assembly 500, and the alignment sockets 800.

Figure 7:
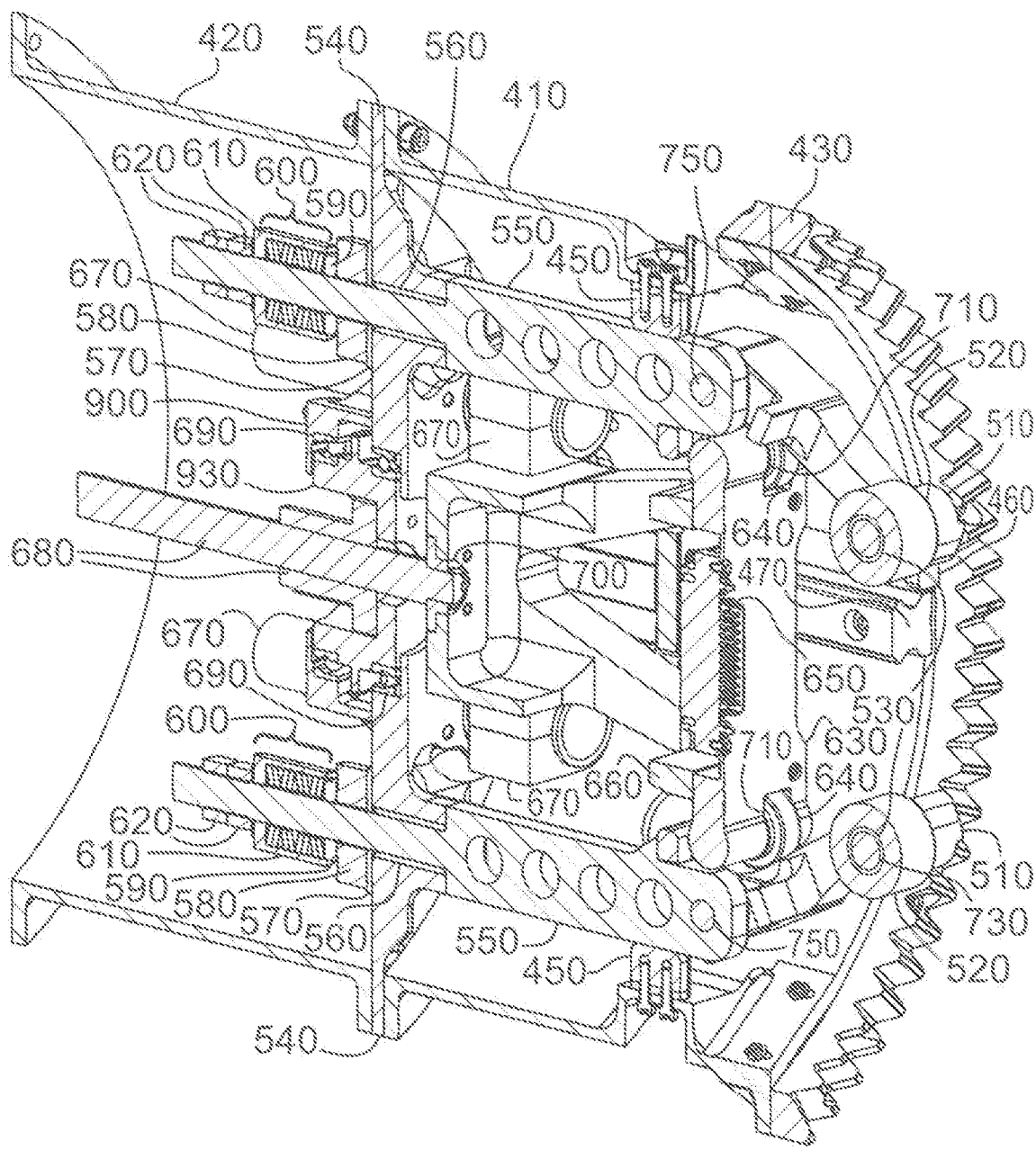
FIG. 7 is an isometric sectional view of the AIA taken along line A-A of FIG. 4.

FIG. 7 is an isometric section view through section line A-A of FIG. 4 which runs through the centreline of one of the at least one latch assemblies 500. The latch rollers 520 rotate on the roller bushings 530 around the latch axle 730. The latch axles 730 are located in each of the two latch arms 510 that rotate about the pillar axles 750 secured to the two latch pillars 550 that are part of each latch assembly 500.

The latch pillars 550 are secured to the midplane plate 540 such that they may translate longitudinally via the pillar bushings 560 but are secured against motion in other axes. Longitudinal latch pillar 550 motion is resisted by a series of Belleville springs 600 that are contained in a spring housing 610 and retained on the shaft of the latch pillar 550 by two jam nuts 620 that may be adjusted in position to provide an initial preload in the Belleville springs 600 that ensures the latch assembly 500 does not excessively move during operation or launch from Earth. The Belleville springs 600 contact the spring washer 590 which translates the ring contact of the Belleville springs 600 to a more even surface contact force on the face of the load sensor 580 which then bears on the midplane plate 540 via a load sensor washer 570.

The midplane plate 540 is sandwiched between the rear housing 420 and the forward housing 410 to which the $2^{nd}$ half of the Hirth coupling 430 is attached. Affixed to the forward housing 410 are the pillar supports 450 which restrict the outward bending of the latch pillar 550 under interface rigidization loads.

Actuating the latching mechanism are the drive train components. The motion of the latch arms 510 is driven by actuator rollers 640 being moved longitudinally along the latch cam surfaces 350 on the latch arms 510. The latch cam surfaces 350 (see FIG. 8) act as cams and the actuator rollers 640 act as cam followers. The connector plate 630 serves to support the actuator rollers 640 and hold one half of an electrical connector pair 650. The actuator rollers 640 rotate against actuator needle bearings 710. The connector plate 630 is connected, via the actuator frame 660 and the keyed bushing 700 to the shaft of the ball screw 680. The bearing portion of the ball screw 680 is connected to the latch drive gear 930 which is supported by two latch bearings 690, one in the midplane plate 540 and the second in the geartrain housing 900.

The actuator frame 660 is attached to the linear bearing platform 480 (see FIG. 8) which, running along the linear bearing rail 470, guides and structurally supports the motion of the actuator frame 660 during mechanism operation. The linear bearing rail 470 is accurately positioned within the forward housing 410 by the use of a tapered gib 460.

Cable guides 670 are affixed to the actuator frame 660 and translate with the actuator components. The cable guides 670 provide a method for protecting and guiding wires that come from the arm subassembly 110 and connect to the electrical connector 650 ensuring they do not snag on other items within the mechanism. Cables or wires are not shown in the figures for clarity.

Figure 8:
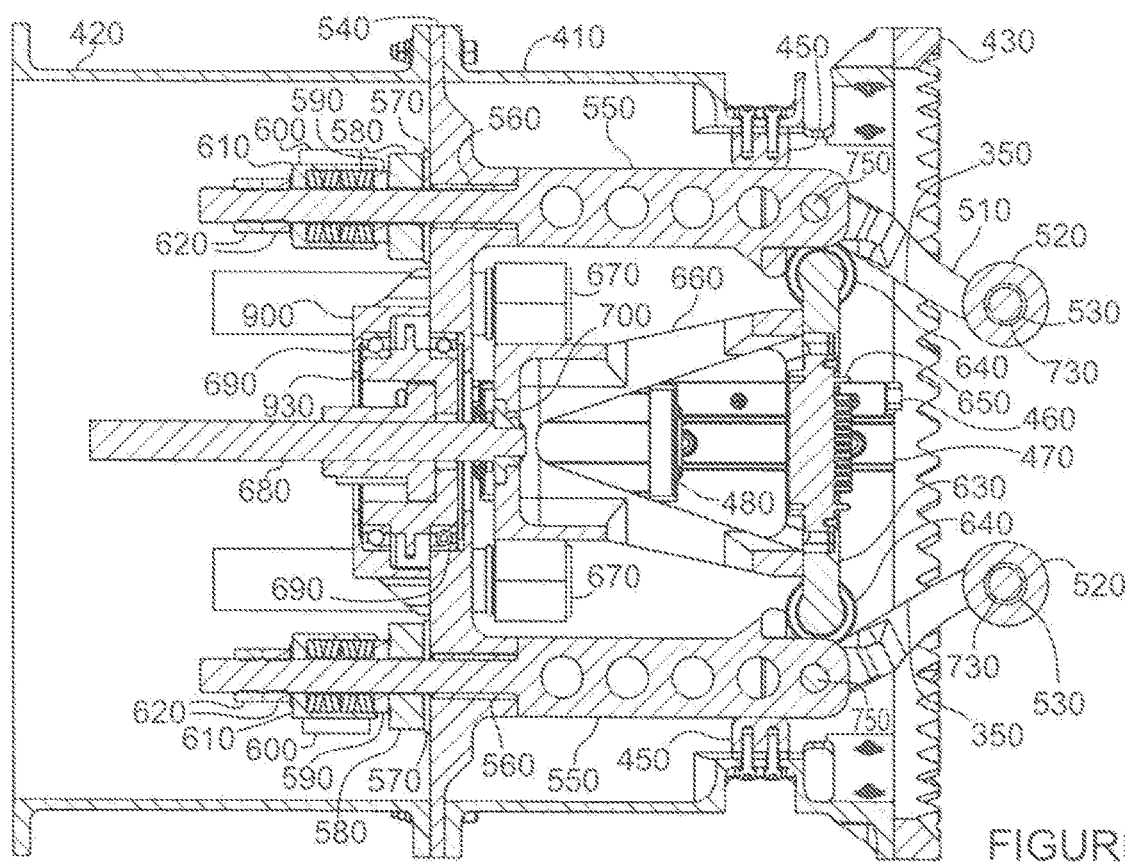
FIG. 8 is a sectional view of the AIA taken along line A-A of FIG. 4.

FIG. 8 is a true section view through section line A-A of FIG. 4. It shows latch rollers 520, roller bushings 530, latch axles 730, latch arms 510, pillar axles 750, latch pillars 550, midplane plate 540, latch cam surfaces 350, pillar bushings 560, Belleville springs 600, spring housing 610, jam nuts 620, spring washer 590, load sensor 580, load sensor washer 570, rear housing 420, forward housing 410, Hirth coupling 430, pillar supports 450, connector plate 630, actuator rollers 640, connector 650, actuator frame 660, keyed bushing 700, ball screw 680, latch drive gear 930, latch bearings 690, tapered gib 460, linear bearing rail 470, linear bearing platform 480, and cable guides 670.

Figure 9:
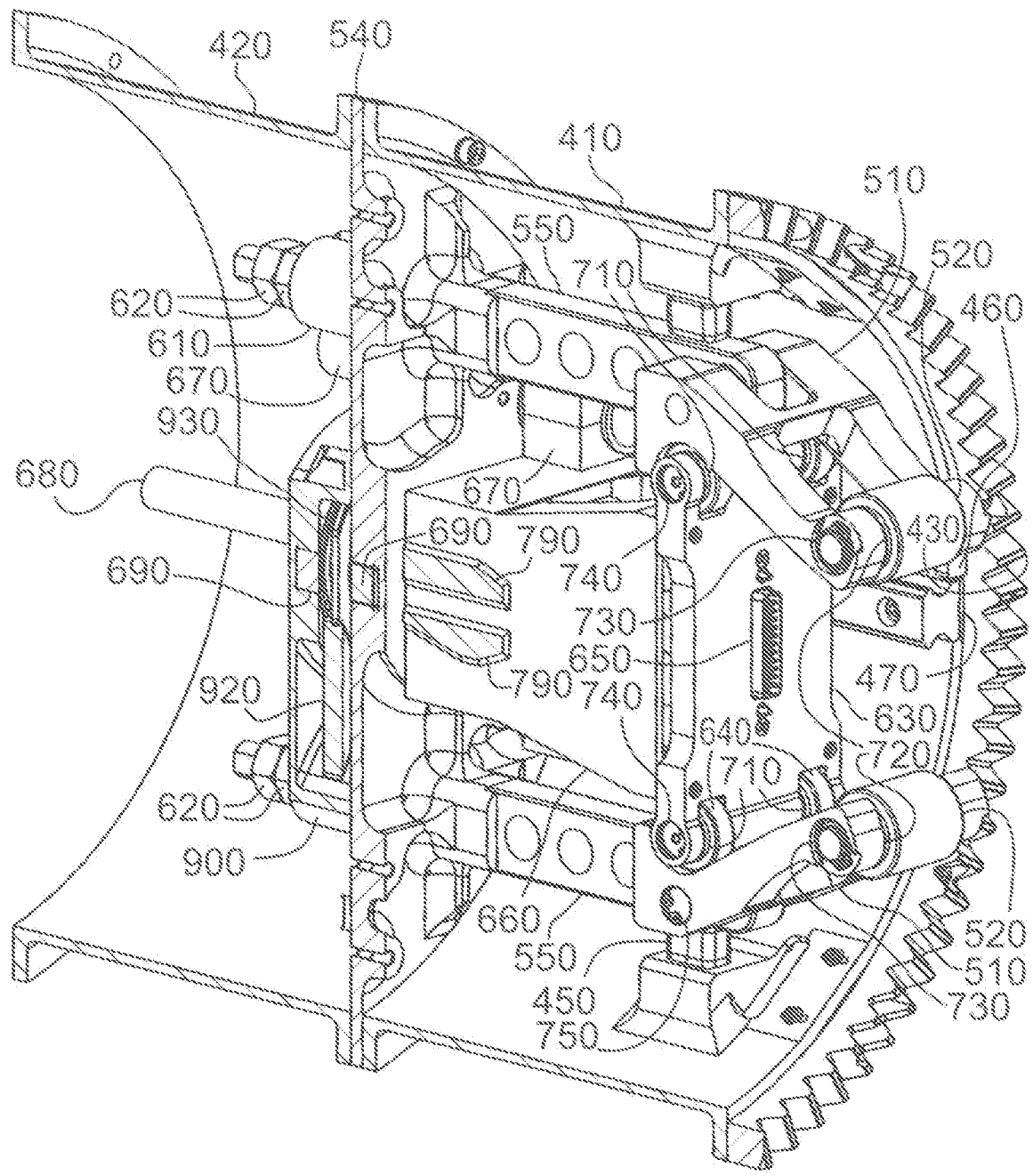
FIG. 9 is an isometric sectional view of the AIA taken along line B-B of FIG. 4.

FIG. 9 is an isometric section view through section line B-B of FIG. 4 showing the entirety of one of the at least one latch assemblies 500 (FIGS. 3, 6). It shows latch rollers 520, latch needle bearings 720, latch axles 730, latch arms 510, pillar axles 750, latch pillars 550, midplane plate 540, spring housing 610, jam nuts 620, rear housing 420, forward housing 410, Hirth coupling 430, pillar supports 450, connector plate 630, actuator rollers 640, actuator needle bearing 710, electrical connector 650, actuator frame 660, ball screw 680, latch drive gear 930, latch bearings 690, tapered gib 460, linear bearing rail 470, and cable guides 670.

Figure 10:
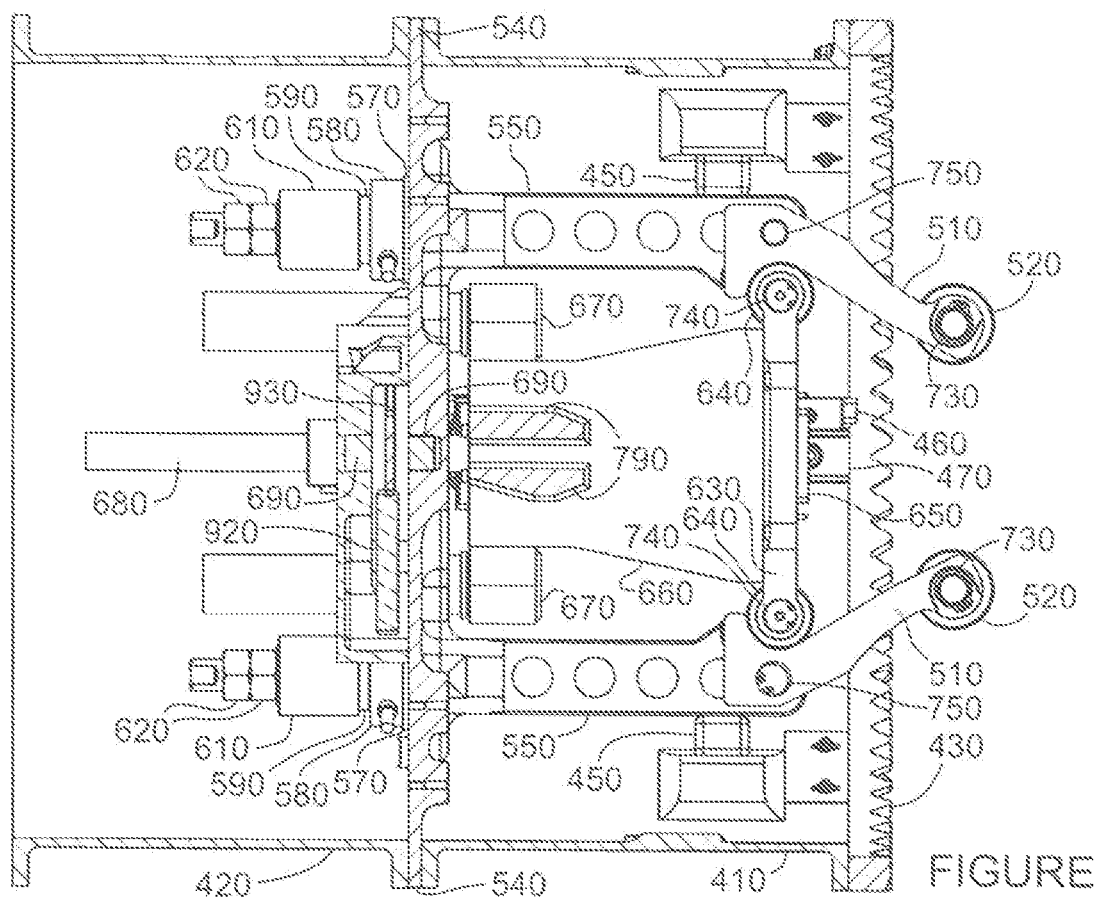
FIG. 10 is a sectional view of the AIA taken along line B-B of FIG. 4.

FIG. 10 is a true section view through Section line B-B of FIG. 4. It shows latch rollers 520, latch axles 730, latch arms 510, pillar axles 750, latch pillars 550, midplane plate 540, spring housing 610, jam nuts 620, spring washer 590, load sensor 580, load sensor washer 570, rear housing 420, forward housing 410, Hirth coupling 430, pillar supports 450, connector plate 630, actuator rollers 640, actuator axle 740, electrical connector 650, actuator frame 660, ball screw 680, latch drive gear 930, latch bearings 690, tapered gib 460, linear bearing rail 470, microswitch actuation surfaces 790, and cable guides 670.

Figure 11:
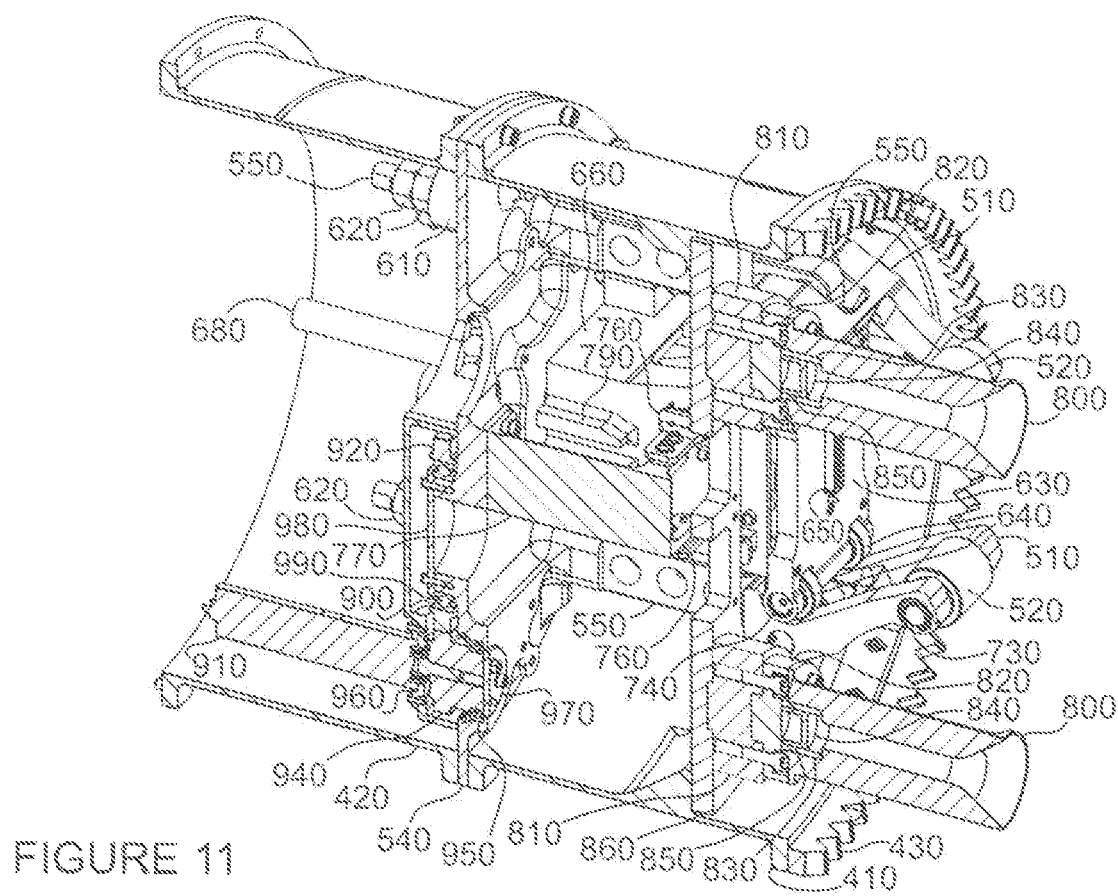
FIG. 11 is an isometric sectional view of the AIA taken along line C-C of FIG. 4.

FIG. 11 is an isometric section view through Section line C-C of FIG. 4 which is through the centerline of the two alignment sockets 800. It shows latch rollers 520, latch axles 730, latch arms 510, latch pillars 550, midplane plate 540, spring housing 610, jam nuts 620, rear housing 420, forward housing 410, Hirth coupling 430, connector plate 630, actuator rollers 640, electrical connector 650, actuator frame 660, ball screw 680, and cable guides 670.

FIG. 11 also shows motor 910 fastened to the motor mount plate 960 which is fastened to the geartrain housing 900 and connects to the motor output gear 940 which is supported by a motor bearing 950. The motor bearing 950 is retained by the motor bearing plate 970. The motor output gear 940 is in contact with, and drives, the idler gear 920 which is supported by the idler bearing 990 which is retained by the idler bearing plate 980.

The microswitch tree 770 is fastened to the midplane plate 540 and supports several microswitches 760 which are used to sense the various positions of the actuator frame 660 by contacting specifically shaped microswitch actuation surfaces 790 on the actuator frame 660.

The stiffener plate 860 is fastened securely to the forward housing 410 and the force moment sensor (FMS) 810 is secured to the stiffener plate 860. The alignment sockets 800 are attached to the FMS plate 820 which is fastened to the FMS 810. Within the alignment socket 800 are the spring bushing 830 which guides the spring 850 upon which rides the reaction washer 840.

Figure 12:
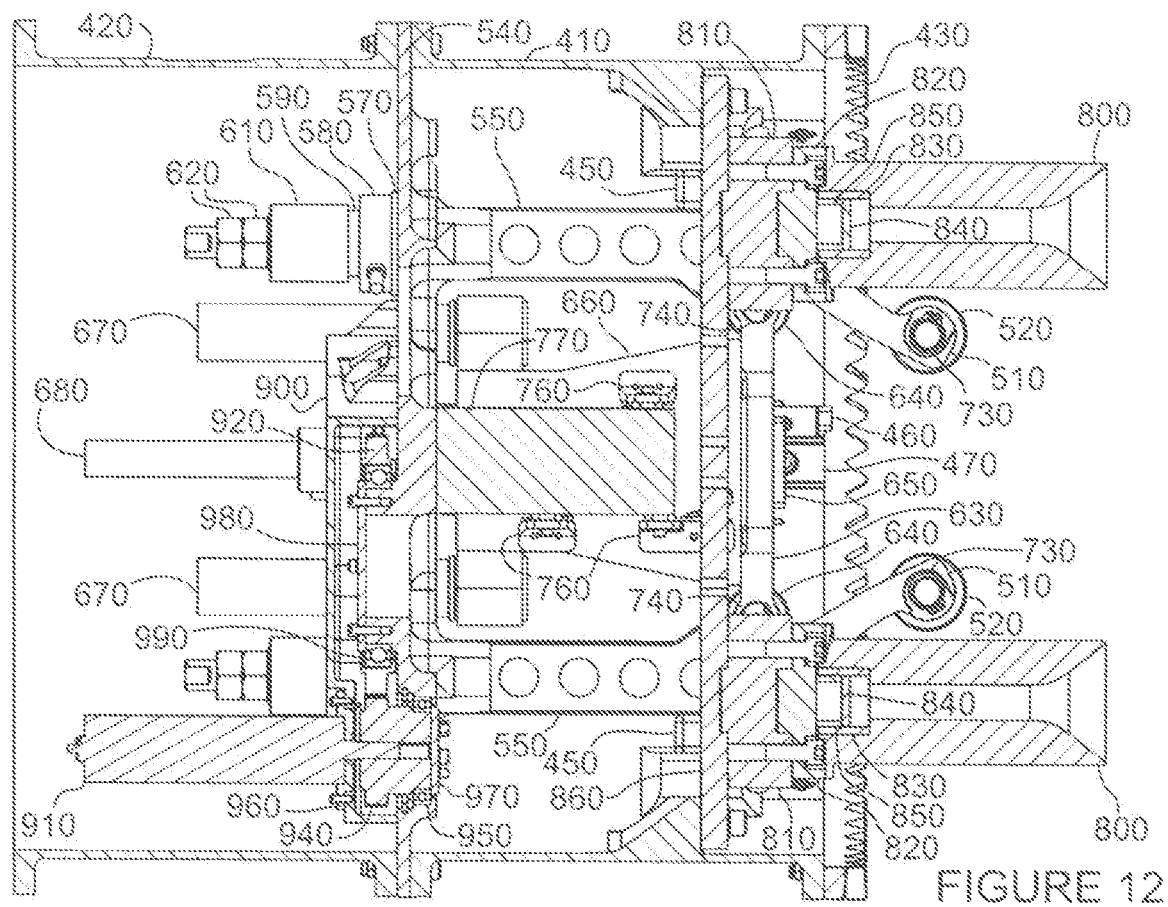
FIG. 12 is a sectional view of the AIA taken along line C-C of FIG. 4.

FIG. 12 is a true section view through section line C-C of FIG. 4. It shows latch rollers 520, latch axles 730, latch arms 510, latch pillars 550, midplane plate 540, spring housing 610, jam nuts 620, spring washer 590, load sensor 580, load sensor washer 570, rear housing 420, forward housing 410, Hirth coupling 430, pillar supports 450, connector plate 630, actuator rollers 640, actuator axle 740, electrical connector 650, actuator frame 660, ball screw 680, tapered gib 460, linear bearing rail 470, cable guides 670, motor 910, motor mount plate, 960 geartrain housing 900, motor output gear 940, motor bearing 950, motor bearing plate 970, idler gear 920, idler bearing 990, idler bearing plate 980, microswitch tree 770, microswitches 760, stiffener plate 860, FMS 810, FMS plate 820, spring bushing 830, spring 850 and reaction washer 840.

Figure 13:
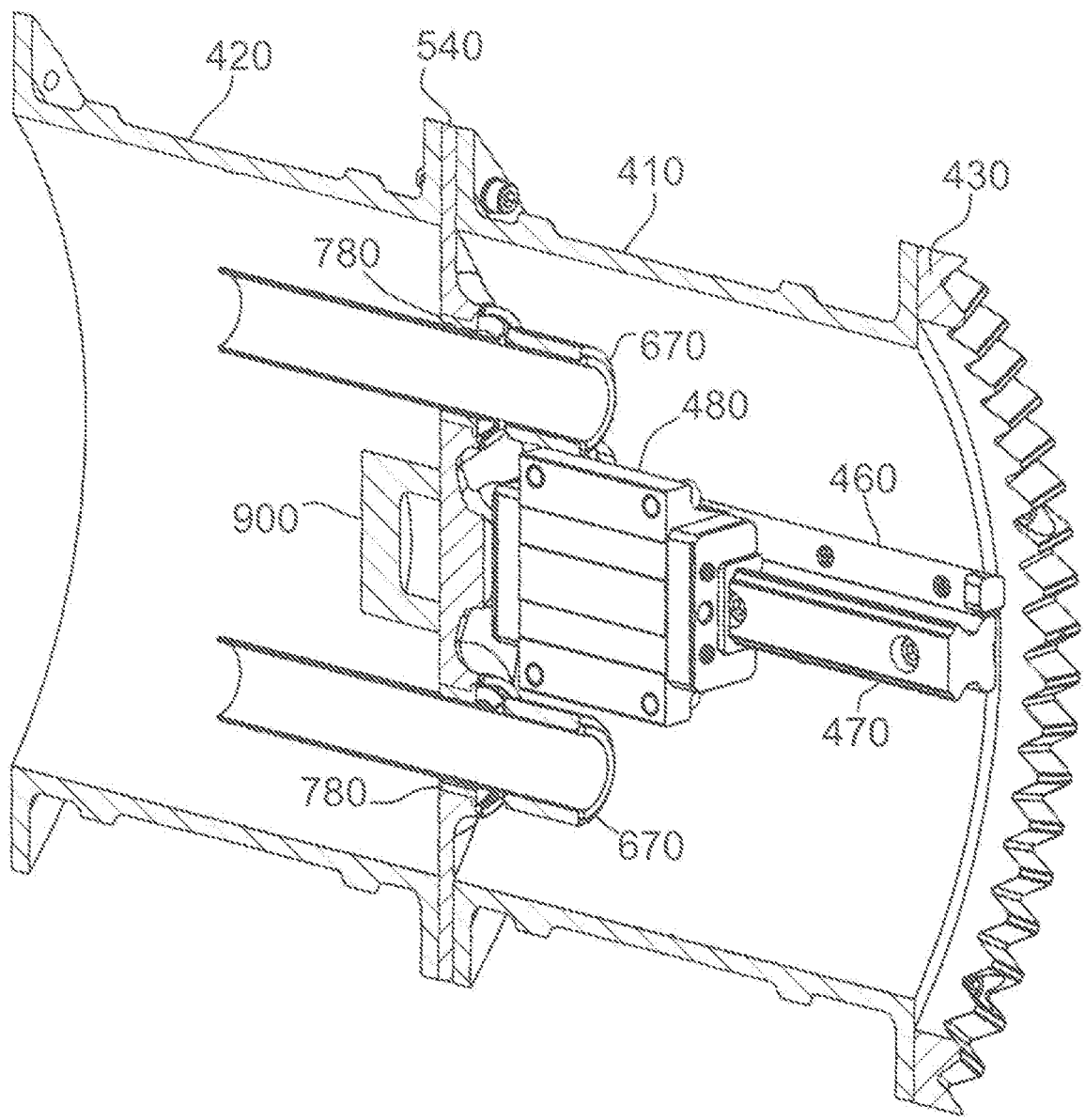
FIG. 13 is an isometric sectional view of the AIA taken along line D-D of FIG. 4.

FIG. 13 is an isometric section view through section line D-D of FIG. 4 primarily showing the linear translation elements of the at least one latch assembly 500. FIG. 13 also shows rear housing 420, forward housing 410, Hirth coupling 430, midplane plate 540, and the cable guide 670 which slides in the bushing 780. The actuator frame 660 (see FIG. 9) is fastened to the linear bearing platform 480 which slides on the linear bearing rail 470 which is secured to and aligned to the forward housing 410 by the tapered gib 460.

Figure 14:
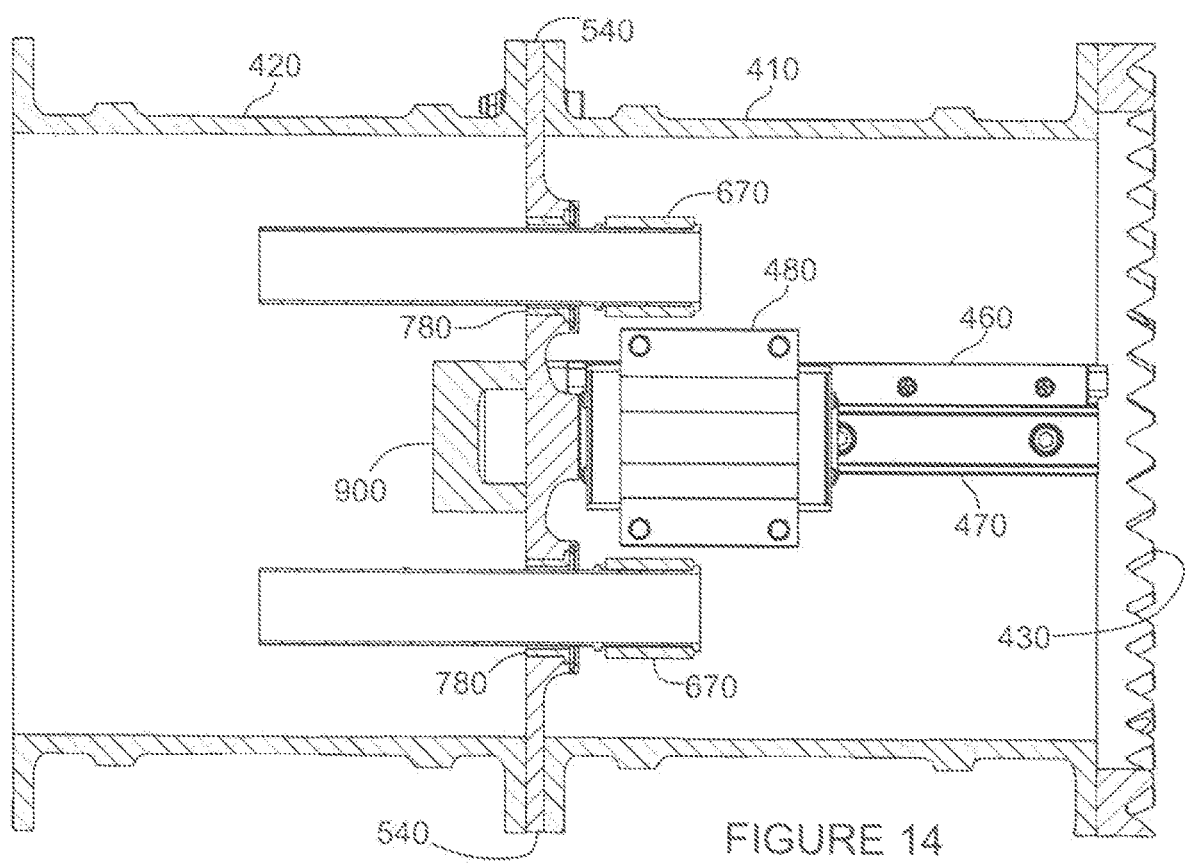
FIG. 14 is a sectional view of the AIA taken along line D-D of FIG. 4.

FIG. 14 is a true section view through section line D-D of FIG. 4. It shows rear housing 420, forward housing 410, Hirth coupling 430, midplane plate 540, cable guide 670, bushing 780, geartrain housing 900, linear bearing platform 480, linear bearing rail 470, and tapered gib 460.

Figure 15:
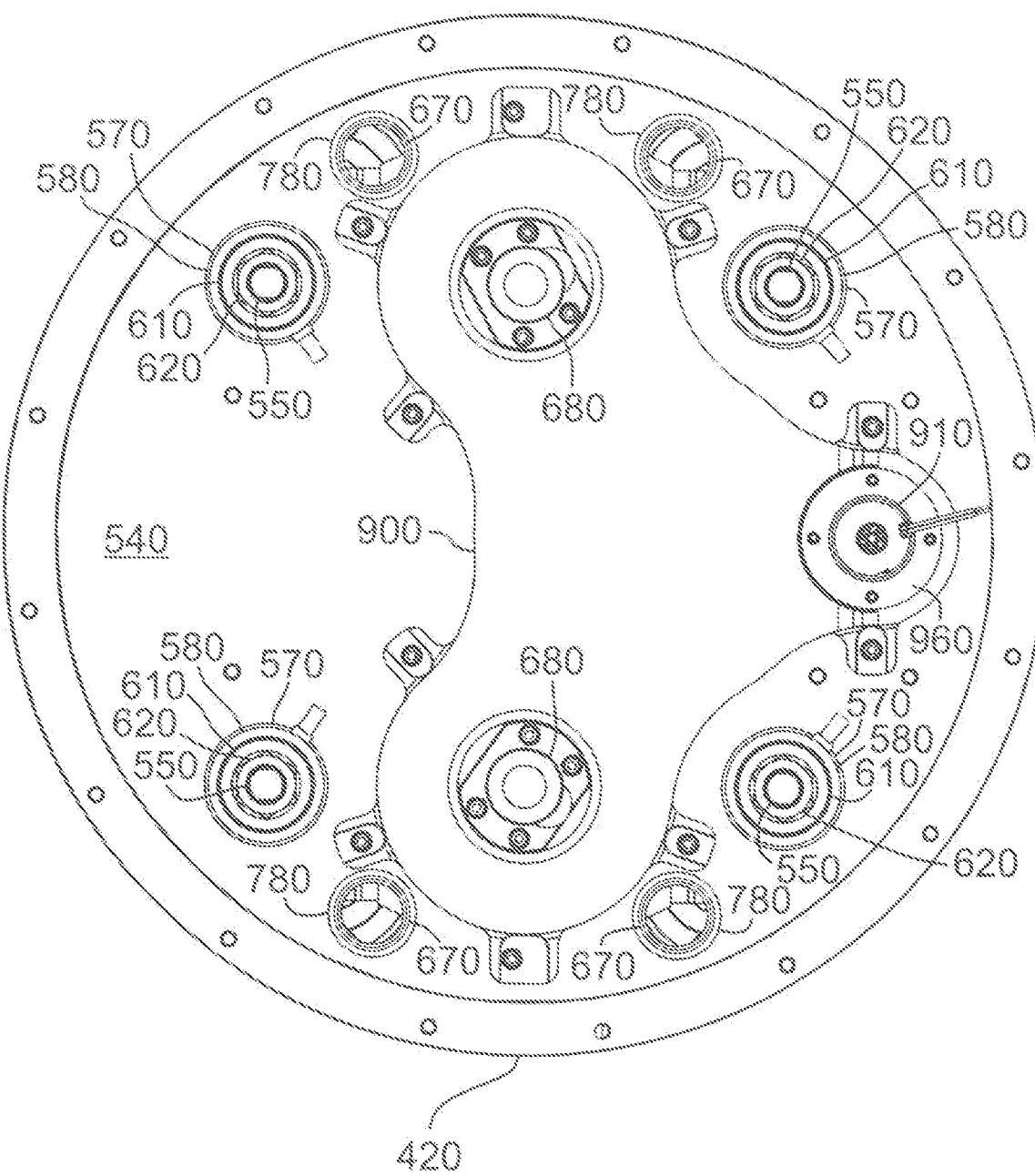
FIG. 15 is an interior end view of the AIA showing the general arrangement of the actuator and gear train.

FIG. 15 is an end view on the active interface assembly 400 showing the general arrangement of the gear train and visible latch components. It shows the rear housing 420, midplane plate 540, motor 910, motor mounting plate 960, geartrain housing 900 and the two ball screws 680. Arrayed symmetrically around each ball screw 680 are two cable guides 670, each with a bushing 780, and two latch pillars 550, each with a sensor washer 570, load sensor 580, spring housing 610, and a pair of jam nuts 620.

Figure 16:
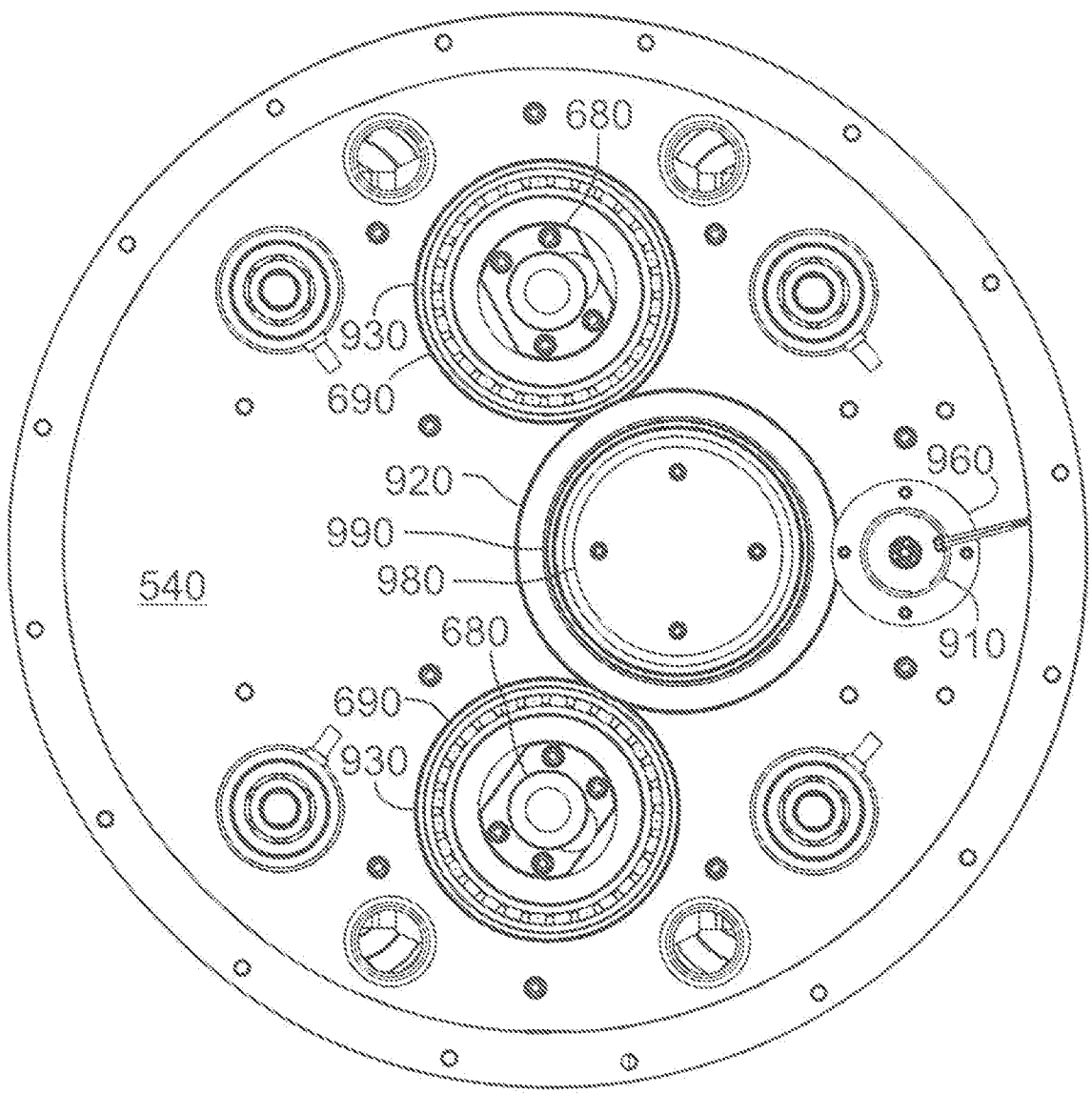
FIG. 16 is a repeat FIG. 14 with the gear train housing and rear housing removed for clarity showing the arrangement of the gear train.

FIG. 16 is a repeat of FIG. 15 with the geartrain housing 900 and rear housing 420 removed to allow the gears to be visible. Shown are the motor 910, motor mounting plate 960, idler bearing plate 980, idler bearing 990, idler 920 that meshes with and drives the two latch drive gears 930 which are attached to the ball screw 680 and are supported by the latch bearings 690.

Figure 17:
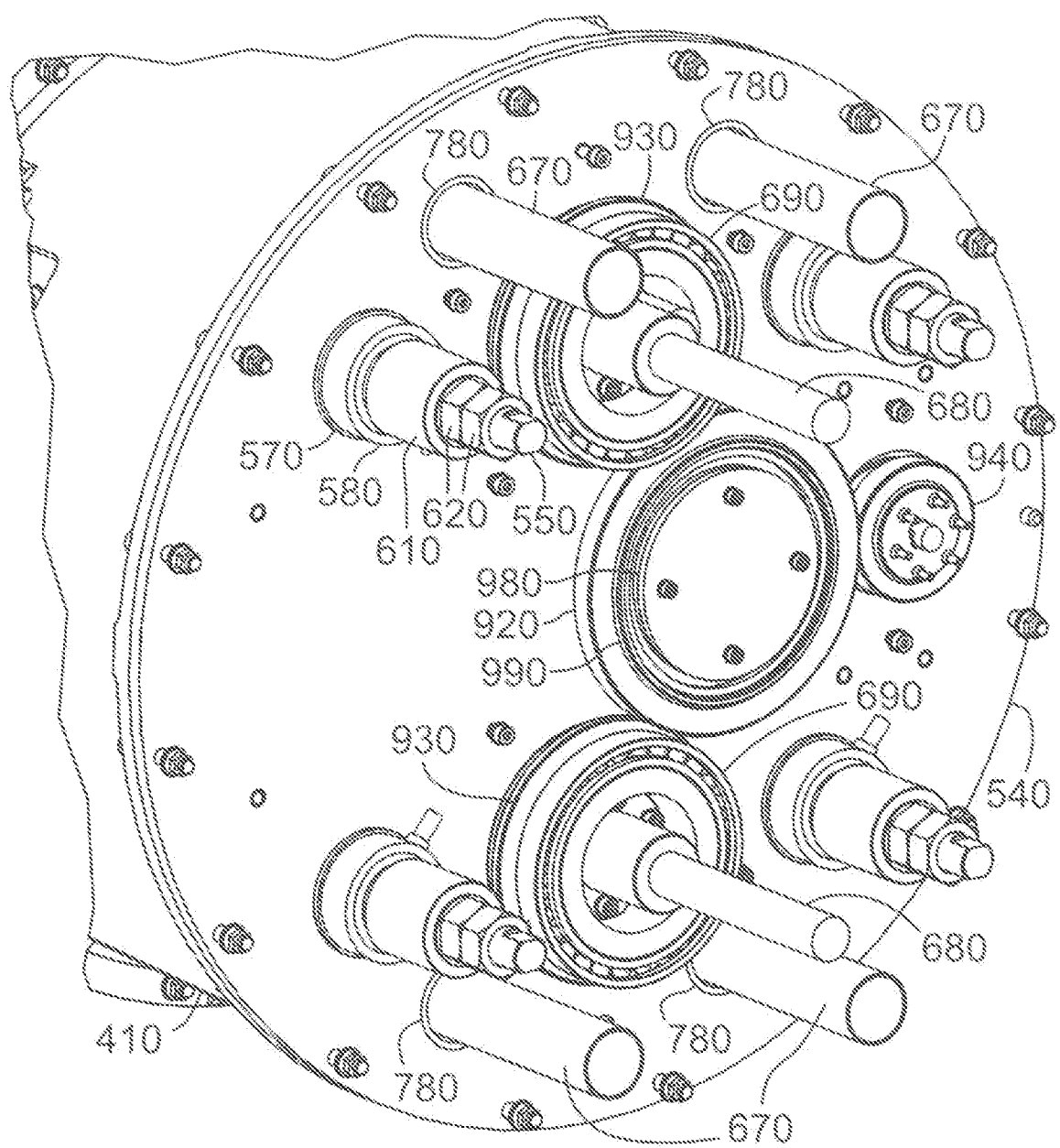
FIG. 17 is a repeat of FIG. 16 except at as an isometric view.

FIG. 17 is a repeat of FIG. 16 except at an isometric viewing angle and with the motor 910 and motor mounting plate 960 also removed for clarity. It shows the forward housing 410, midplane plate 540, idler bearing plate 980, idler bearing 990, idler 920, latch drive gears 930, ball screws 680, latch bearings 690, ball screws 680, cable guides 670, bushing 780, latch pillars 550, load sensor washers 570, load sensors 580, spring housing 610, and jam nuts 620.

Figure 18:
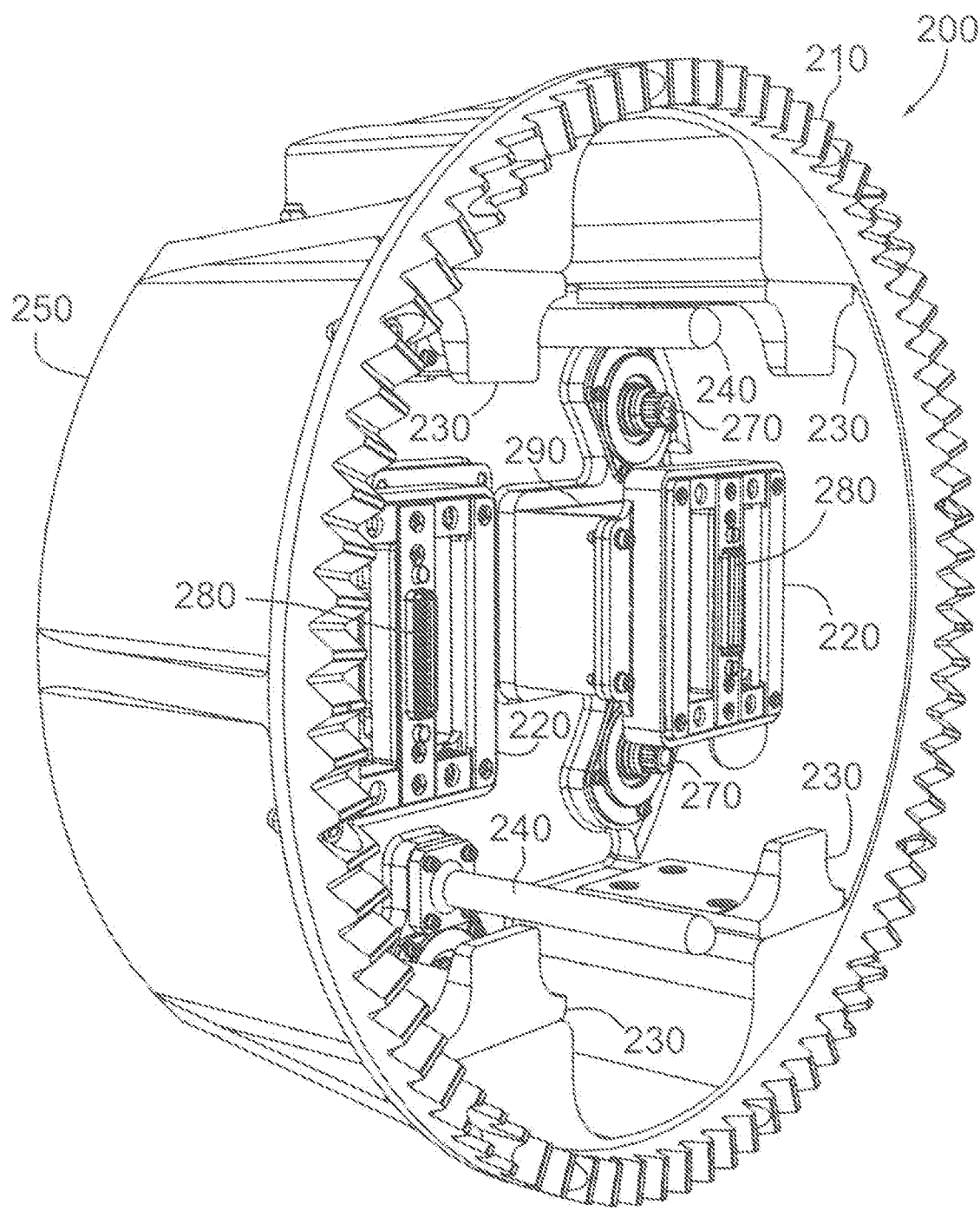
FIG. 18 is an isometric view of the PIA identifying the main features.

FIG. 18 is an isometric view on the PIA 200 showing the passive housing 250, 1$^{st}$ half of the Hirth coupling 210, connector 280 fastened to the connector frame 220 which is attached to the connector bracket 290 which provides sufficient room for wiring (not shown), to exit behind the connector 280. The latch ramps 230 and alignment pins 240 are fastened to the passive housing 250. The passive housing is attached to the payload 130 (not shown) or spacecraft 120 (not shown) by housing fasteners 270.

Figure 19:
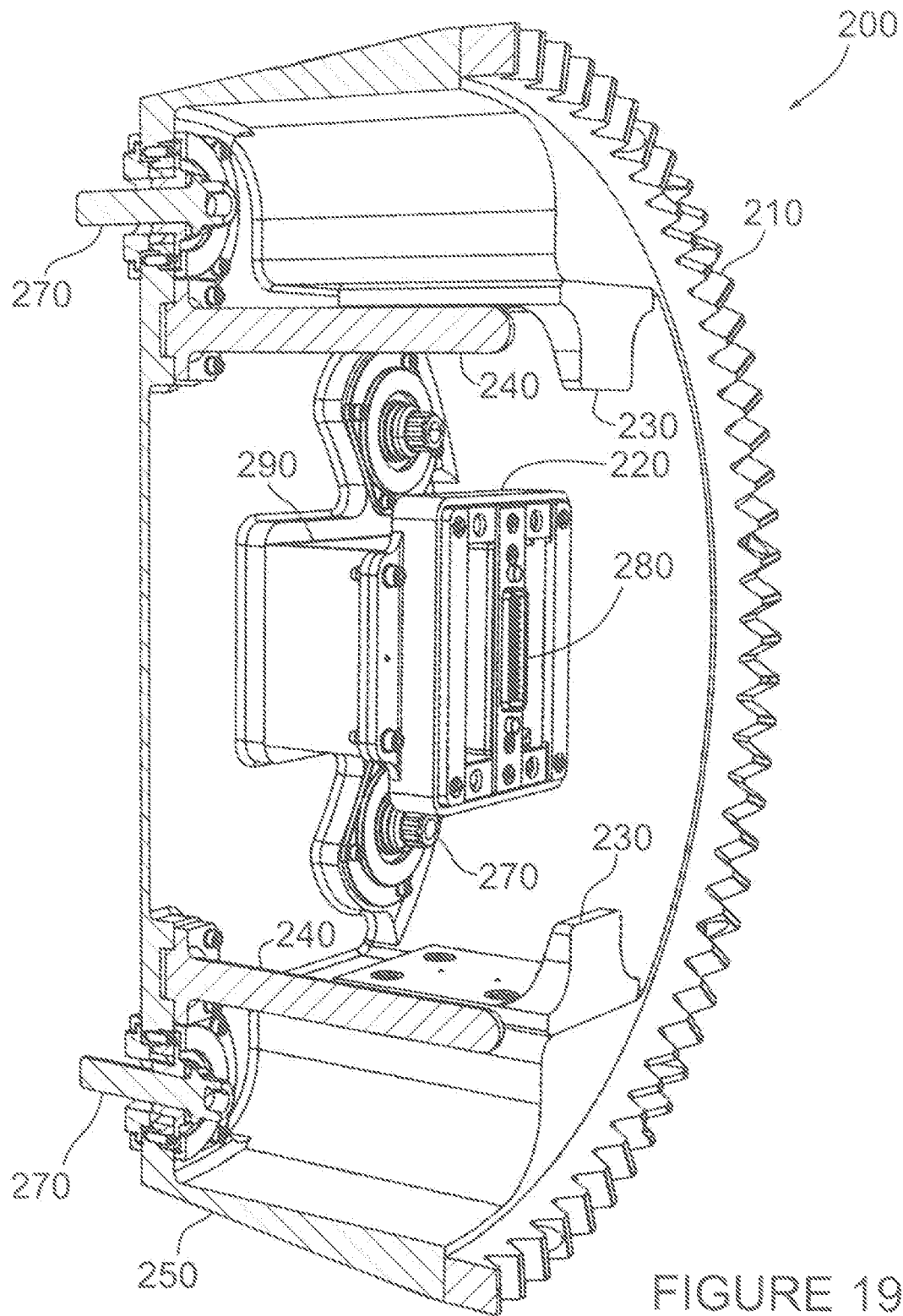
FIG. 19 is an isometric sectional view of the PIA taken along line E-E of FIG. 4.

FIG. 19 is an isometric section view through line E-E of FIG. 5 and shows passive housing 250, Hirth coupling 210, second half of the electrical connector pair 280, connector frame 220, connector bracket 290, latch ramps 230, alignment pins 240, and housing fasteners 270.

Figure 20:
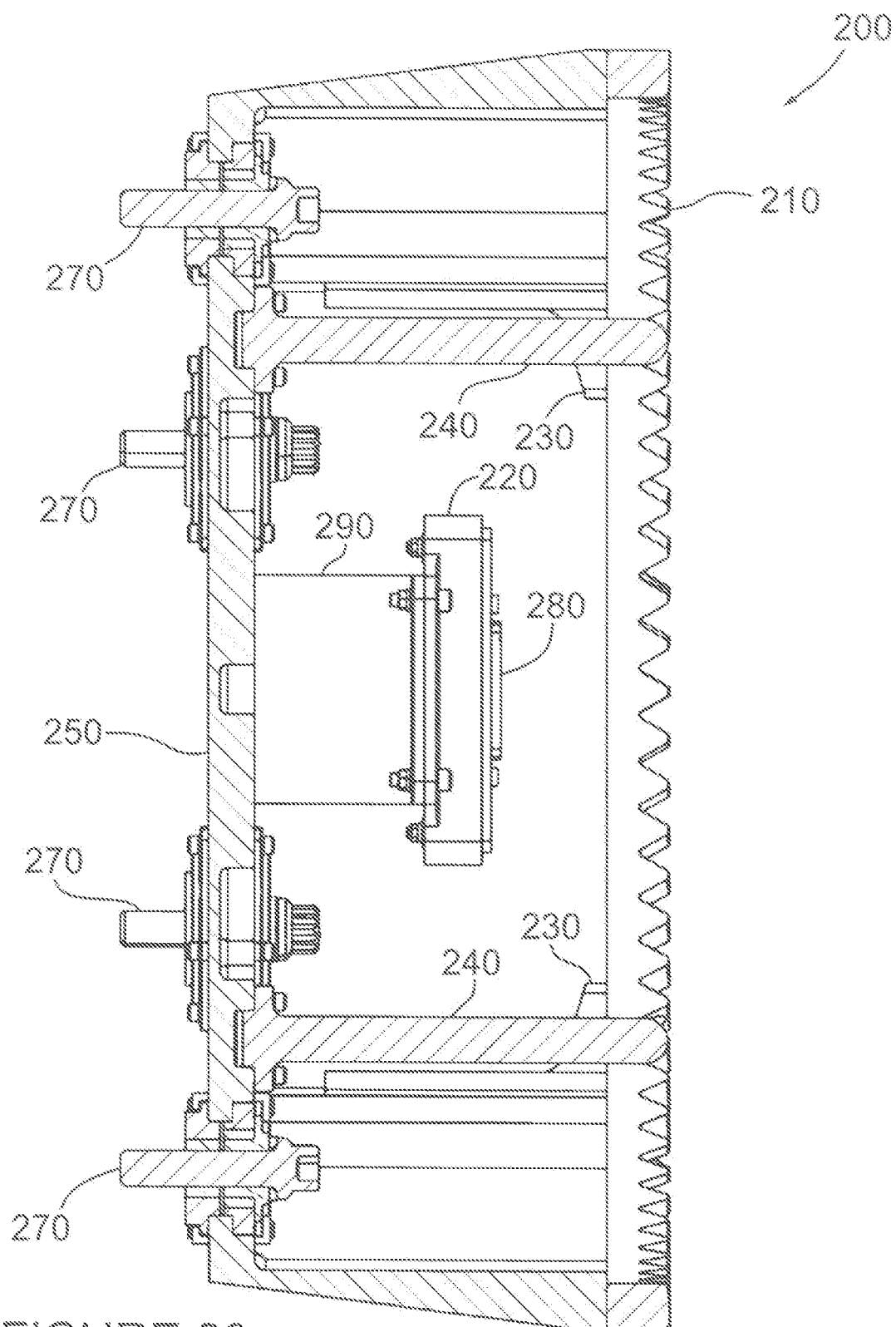
FIG. 20 is a sectional view of the PIA taken along line E-E of FIG. 4.

FIG. 20 is a true section view through line E-E of FIG. 5 and shows passive housing 250, Hirth coupling 210, second half of the electrical connector pair 280, connector frame 220, connector bracket 290, latch ramps 230, alignment pins 240, and housing fasteners 270.

Figure 21:
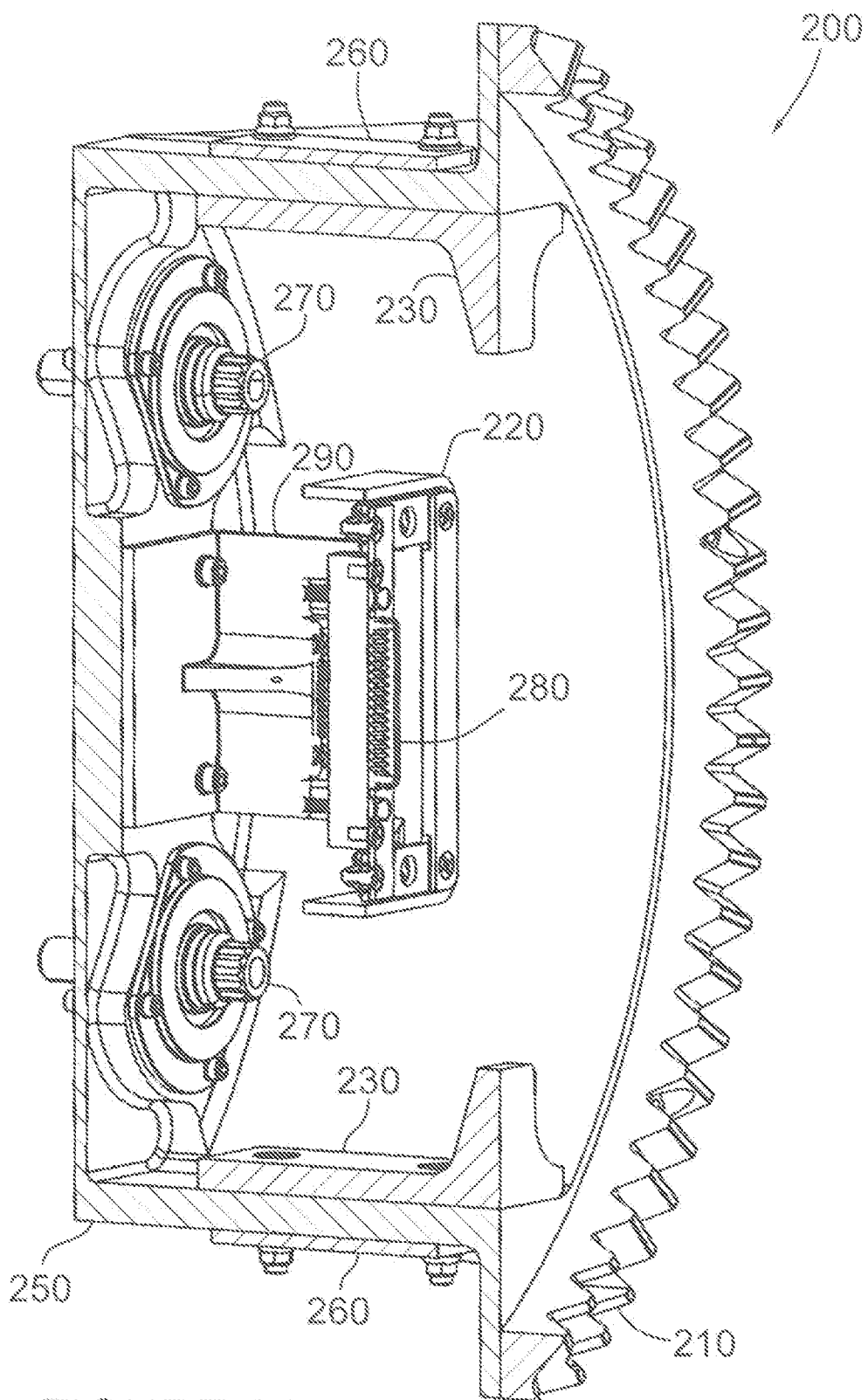
FIG. 21 is an isometric sectional view of the PIA taken along line F-F of FIG. 4.

FIG. 21 is an isometric section view through line F-F of FIG. 5 and shows passive housing 250, Hirth coupling 210, second half of the electrical connector 280, connector frame 220, connector bracket 290, latch ramps 230, and housing fasteners 270. The ramp doublers 260 serve to reinforce the attachment of the latch ramp 230 to the passive housing 250.

Figure 22:
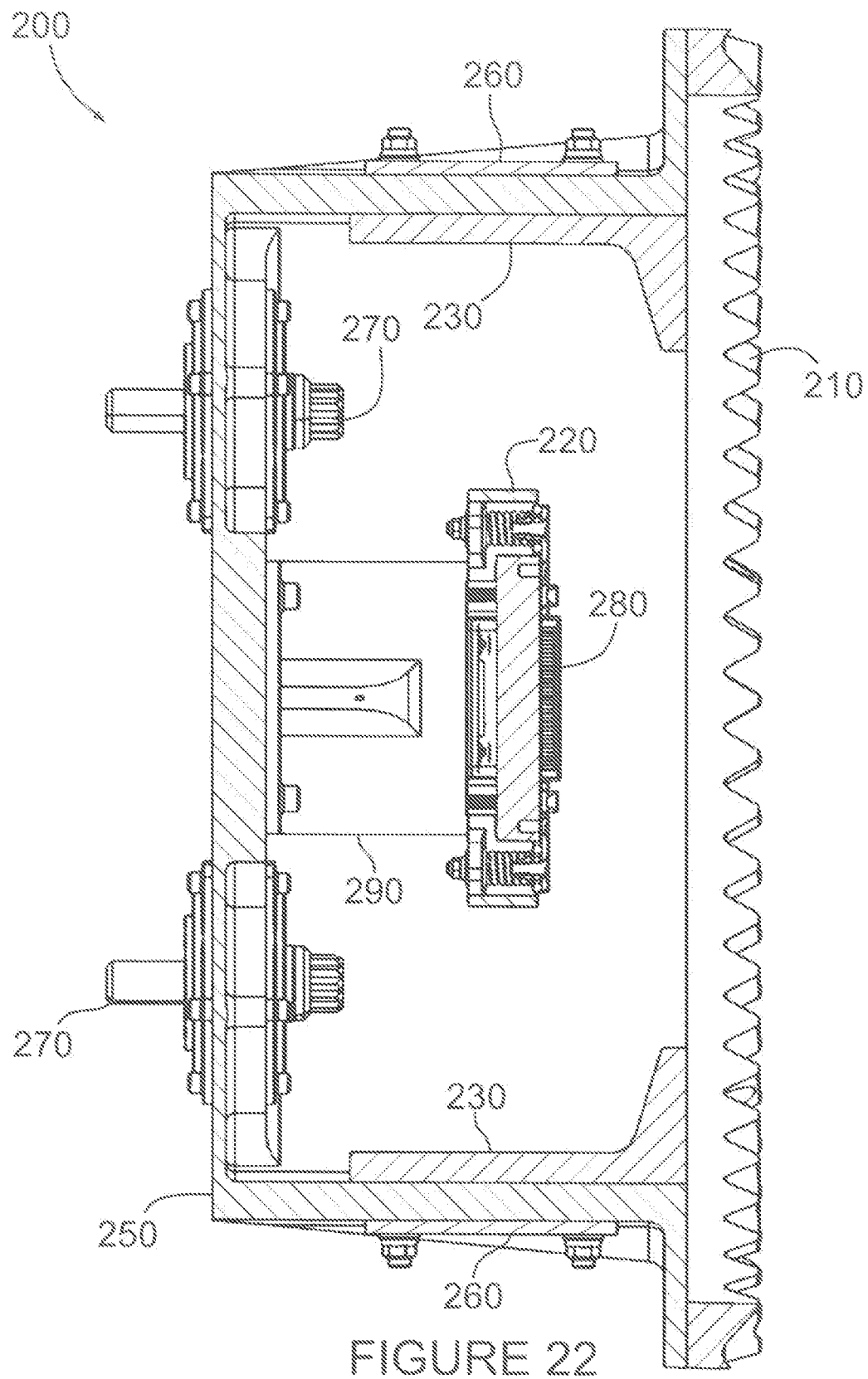
FIG. 22 is a sectional view of the PIA taken along line F-F of FIG. 4.

FIG. 22 is a true section view through line F-F of FIG. 5 and shows passive housing 250, Hirth coupling 210, connector 280, connector frame 220, connector bracket 290, latch ramps 230, latch doublers 260, and housing fasteners 270.

Figure 23A:
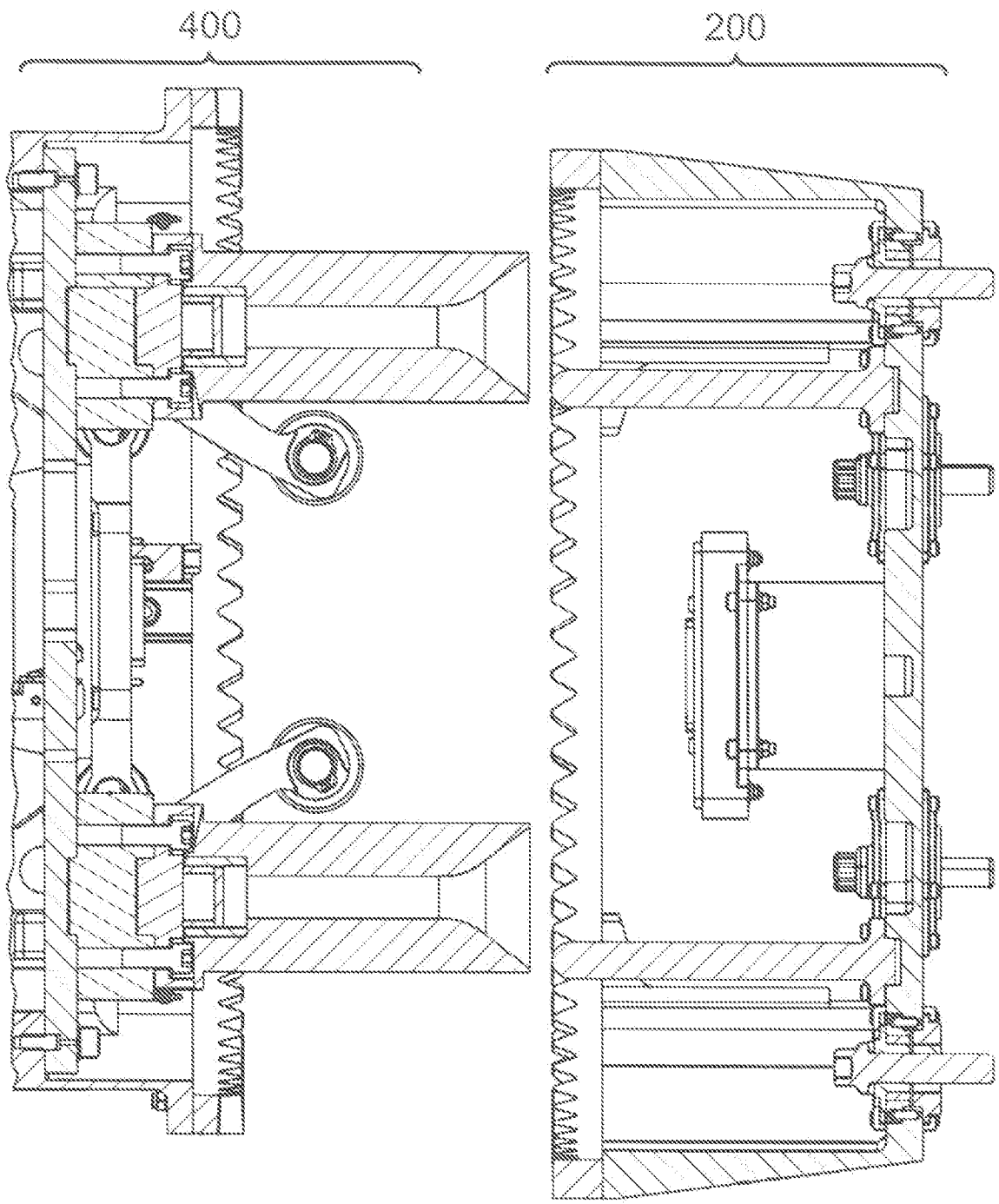
Figure 23B:
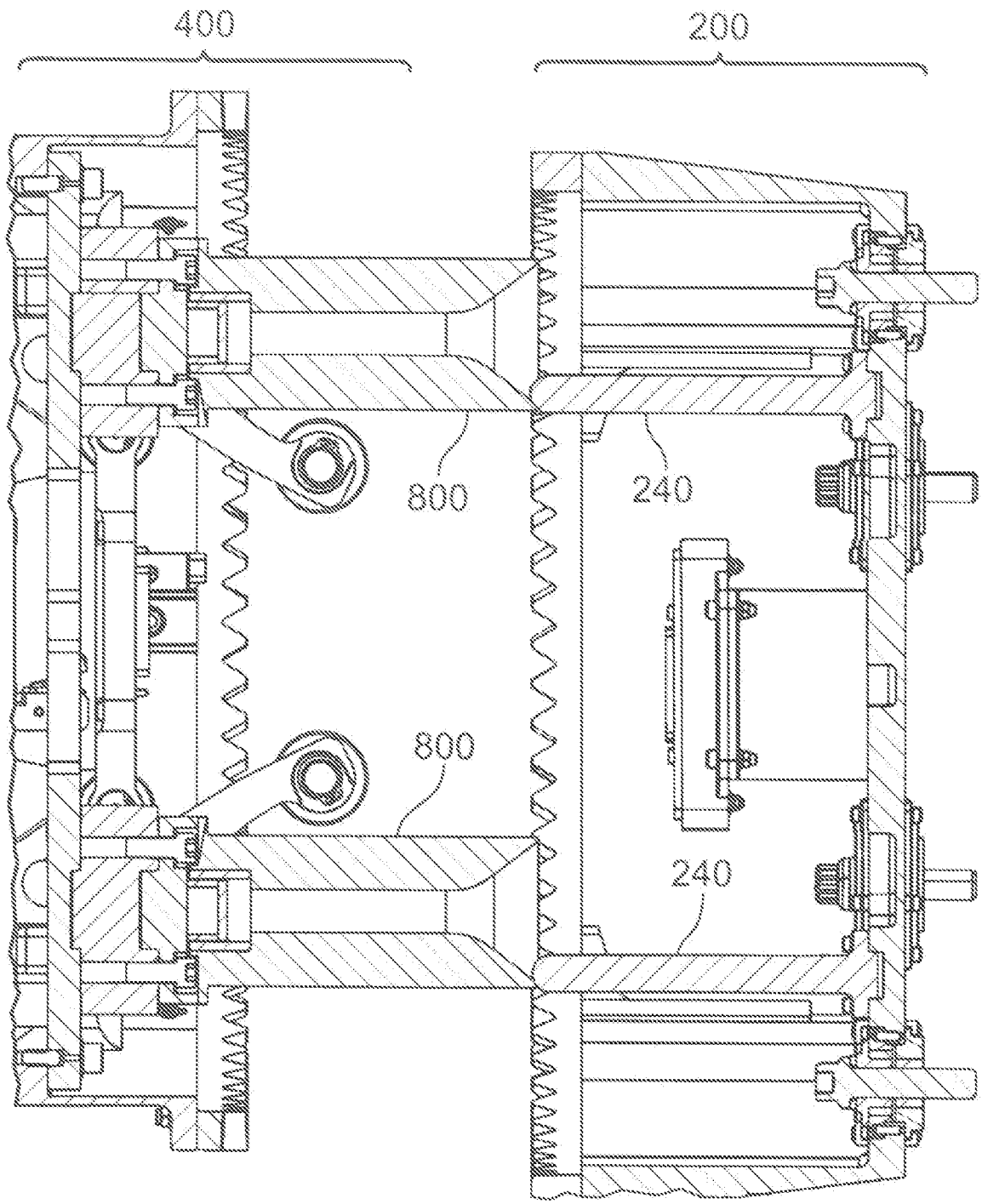
Figure 23C:
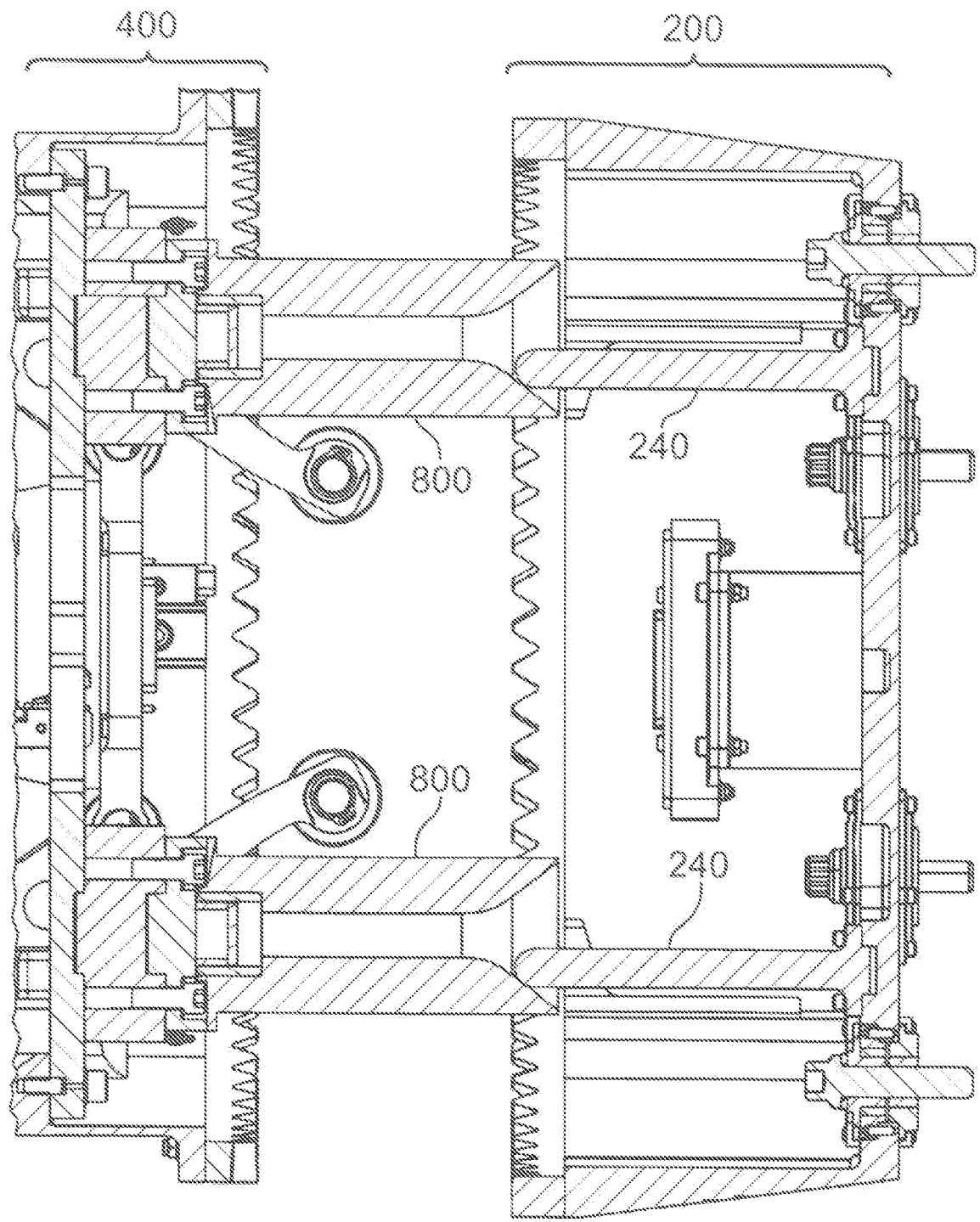
Figure 23D:
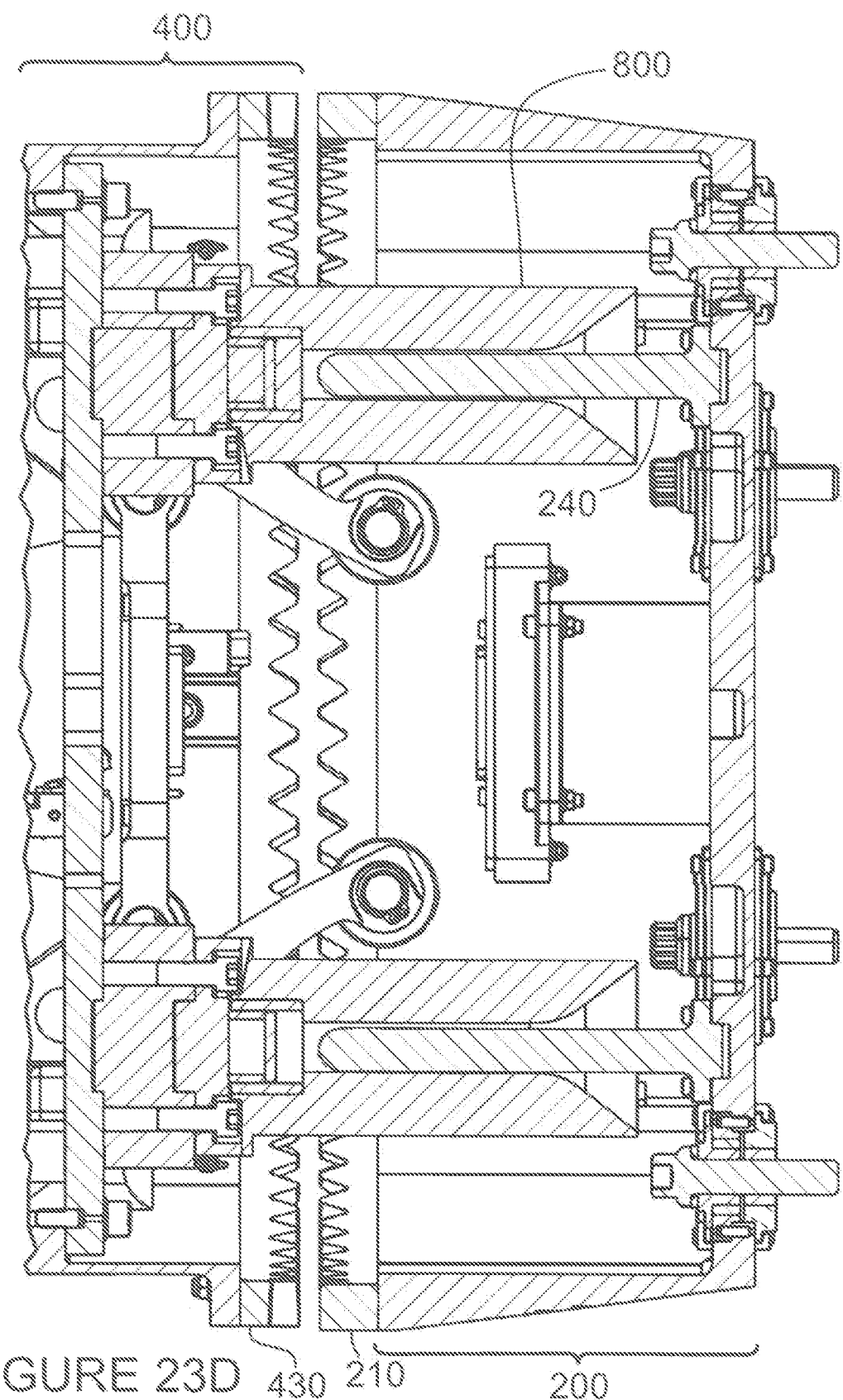
Figure 23E:
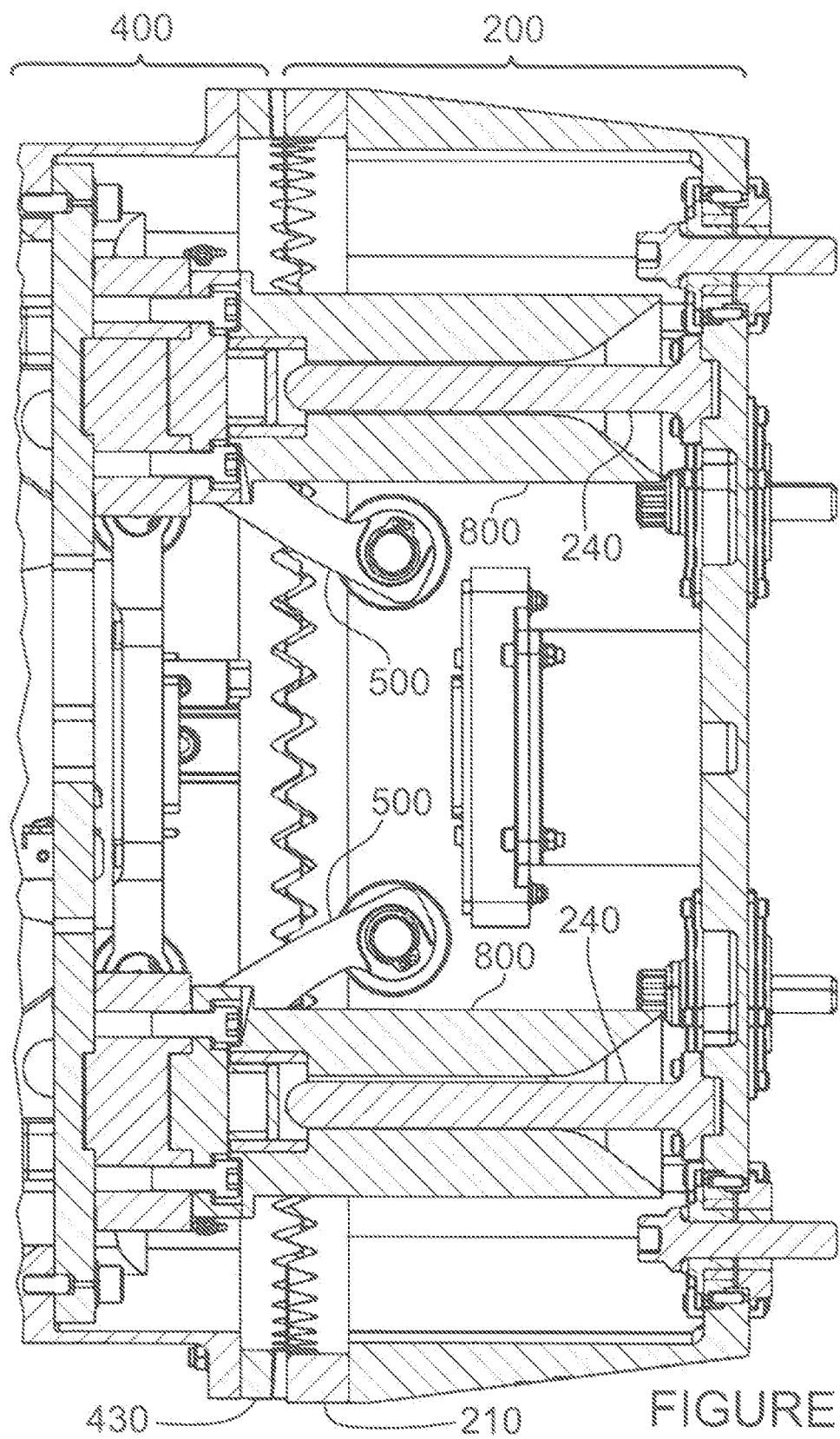

FIGS. 23A to 23E illustrate the sequence of events by which the AIA 400 aligns to the PIA 200 from the point at which the AIA 400 is manoeuvered into the capture envelope to the point immediately before the latch sequence is initiated. FIG. 23A shows the AIA 400 in the approach mode at the lateral limit of the capture envelope. Ideally the AIA 400 will be more accurately aligned to the PIA 200 at this point, but the maximum lateral misalignment is shown to better illustrate the alignment functions of the low-profile manipulator interface system. FIG. 23B shows the initial contact of the alignment pins 240 against the alignment sockets 800. FIG. 23C shows the AIA 400 moving towards the PIA 200 with the alignment pins 240 running against the conical surface of the alignment sockets 800 and becoming more aligned with the bore of the alignment sockets 800. FIG. 23D shows the alignment pins 240 positioned well within the bore of the alignment sockets 800 providing both lateral and angular alignment of the AIA 400 to the PIA 200. The two Hirth couplings 210 and 430 have not yet come into engagement. FIG. 23E shows the alignment pins 240 even further down the bore of the alignment socket 800 and the Hirth couplings 210 and 430 almost completely engaged. The latch assemblies 500 are nearly in a position to be engaged at this point.

Figure 24A:
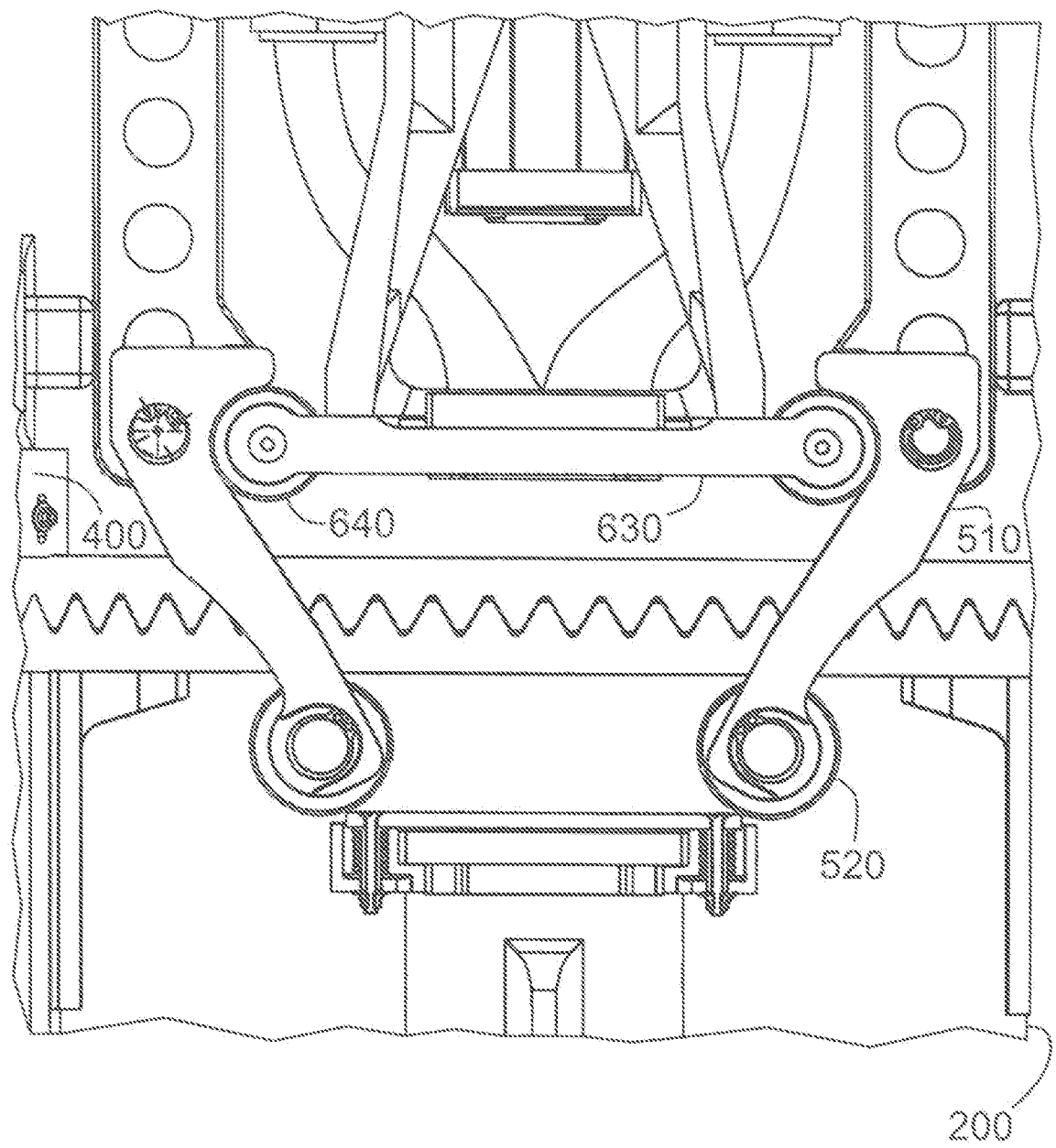
Figure 24B:
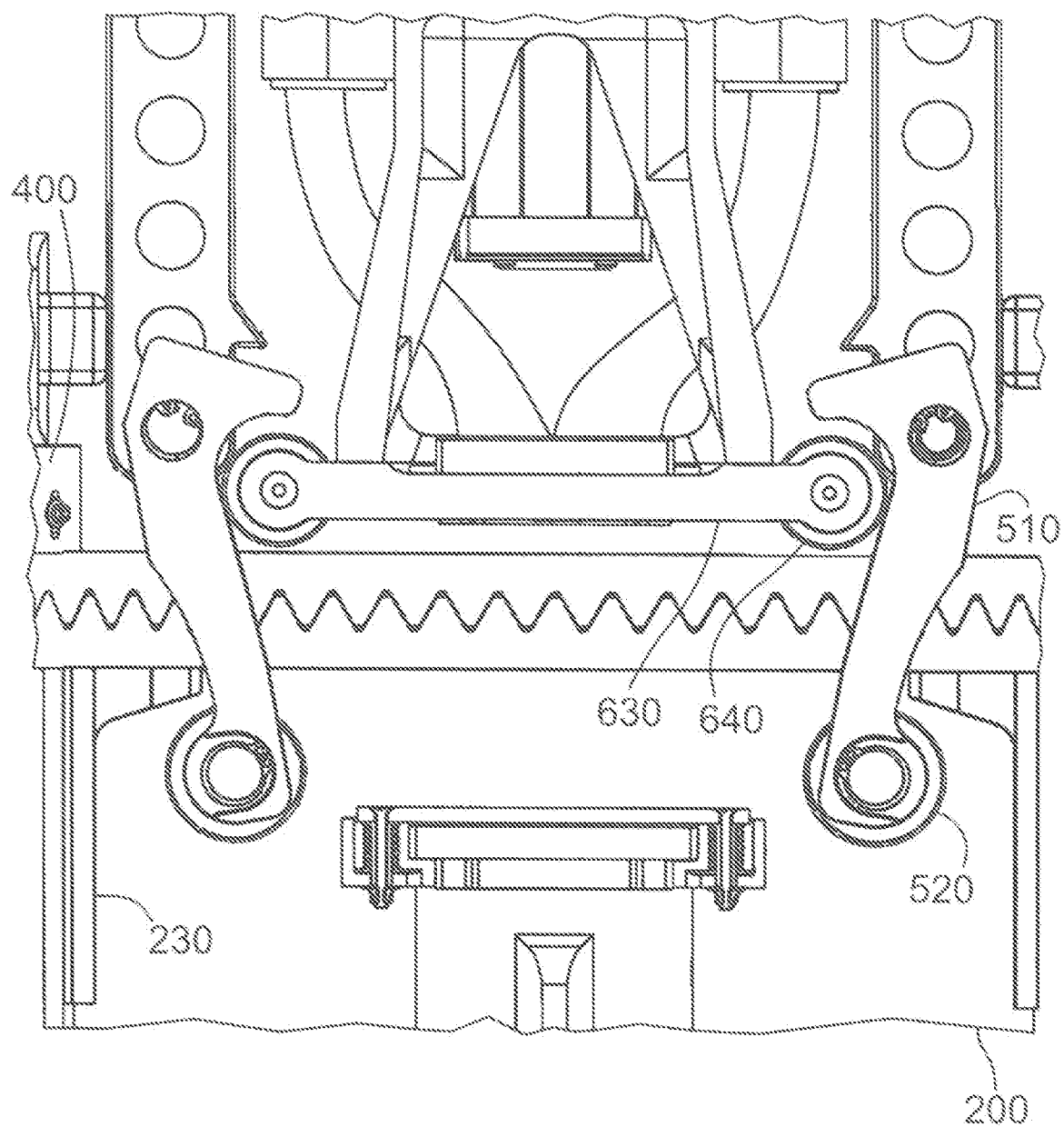

FIGS. 24A to 24E illustrate the sequence of events by which the latch mechanism structurally secures the AIA 400 to the PIA 200 and completes the electrical connections between the two sides of the interface. FIG. 24A shows the mechanism in the unlatched condition and in approximately the same condition as shown in FIG. 23E with the exception that the AIA 400 has come into full contact with the PIA 200. The connector plate 630 and associated actuator rollers 640 are in the fully retracted position holding the latch arms 510 and associated latch rollers 520 also in their fully retracted position. FIG. 24B shows the latch sequence starting with the connector plate 630 being extended (moving toward the PIA 200 in the Figure) and the actuator rollers 640 pushing the latch arms 510 outwards. At this point the latch rollers 520, while not in contact with the latch ramps 230 do extend outwards to a point where the PIA 200 could no longer be withdrawn past them. In this condition the AIA 400 is considered to be "soft docked" to the PIA 200. The connection is not sufficient to withstand significant structural loads or to make the electrical connections, but is sufficient to prevent the AIA 400 and PIA 200 from drifting apart should there be an event that stops the latching sequence.

Figure 24C:
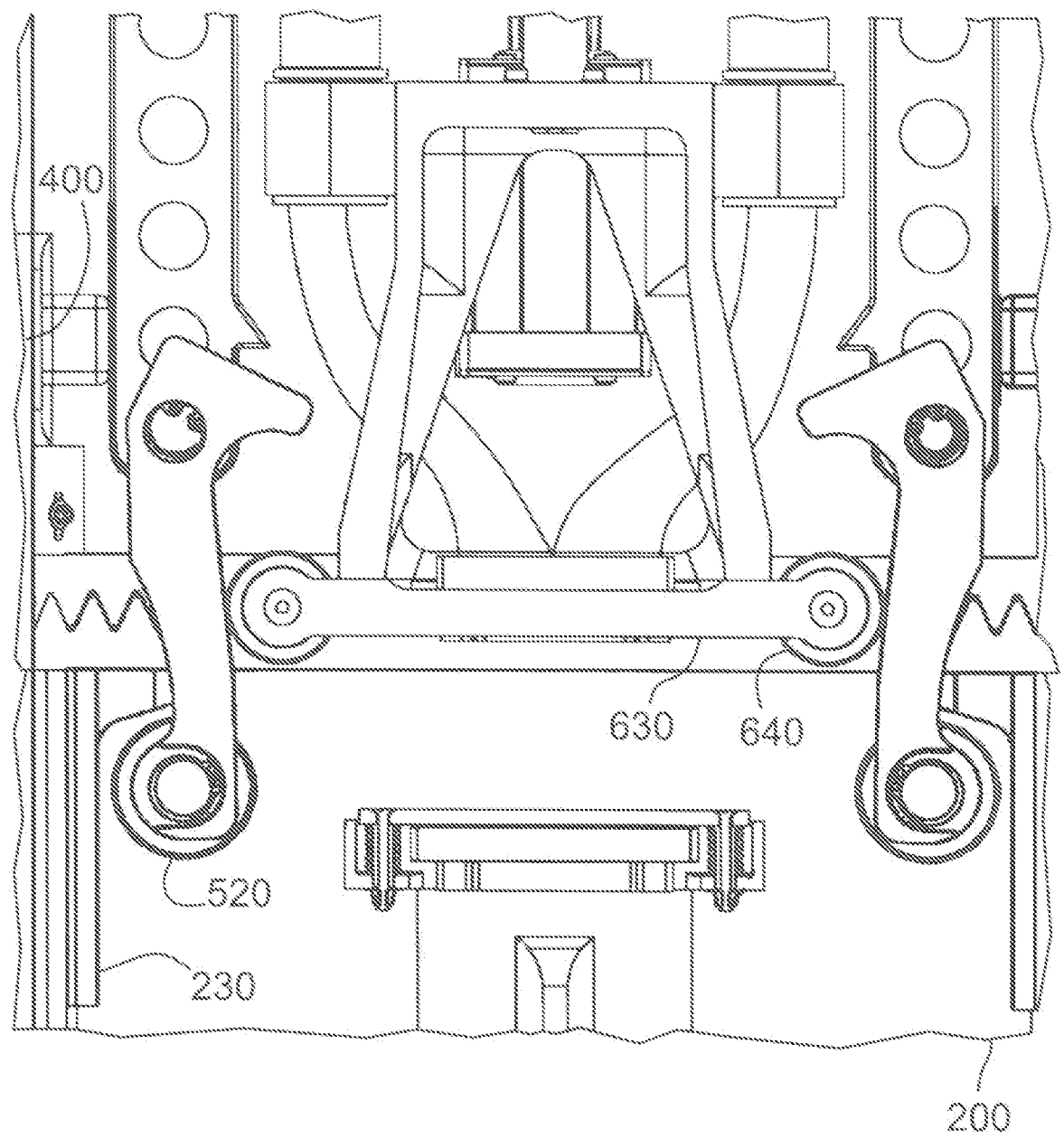

FIG. 24C shows the latch sequence further advanced with the connector plate 630 moving toward the PIA 200 and the latch arms 510 further extended. It can be seen that the latch rollers 520 will soon contact the latch ramp 230.

Figure 24D:
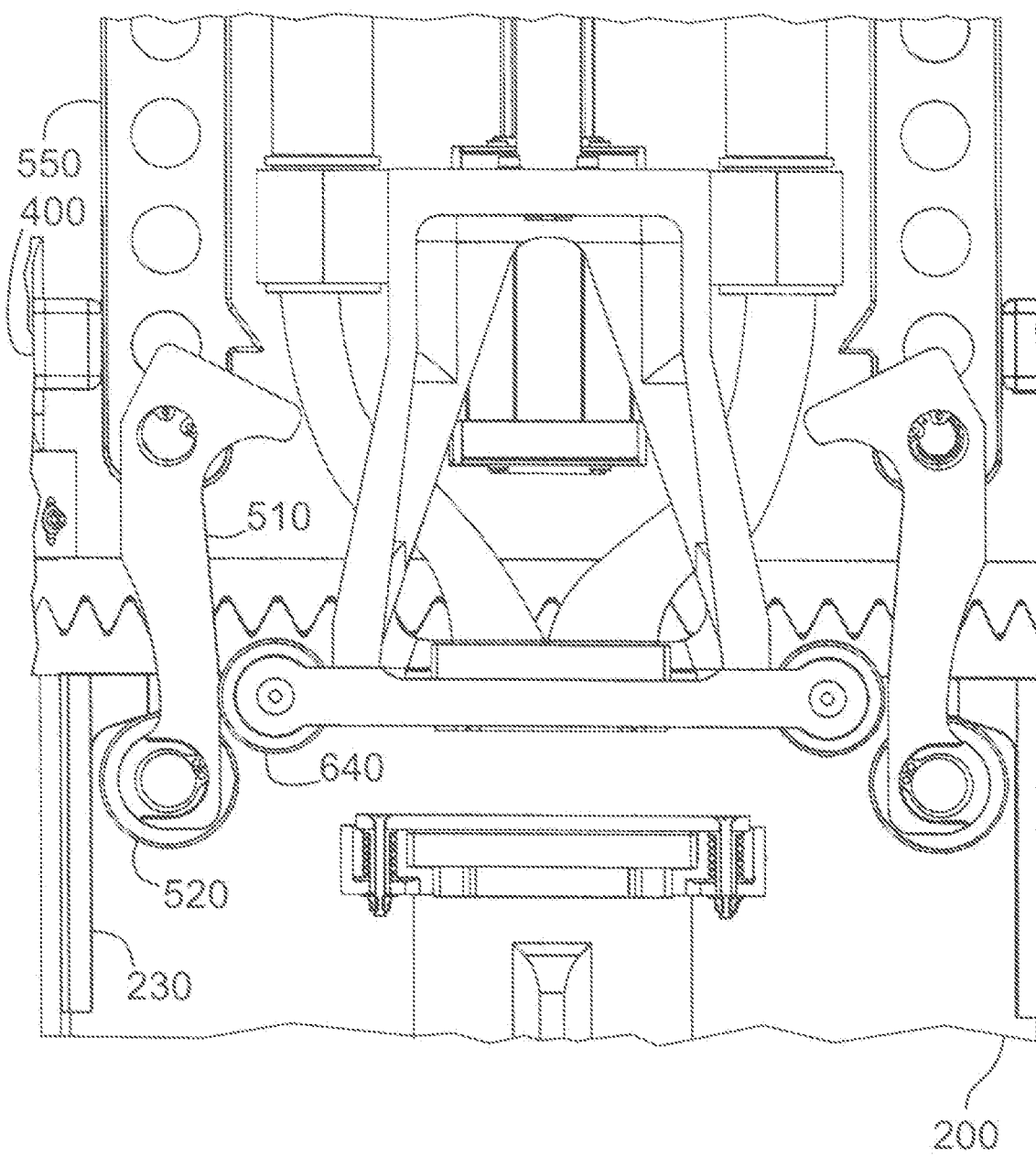
Figure 24E:
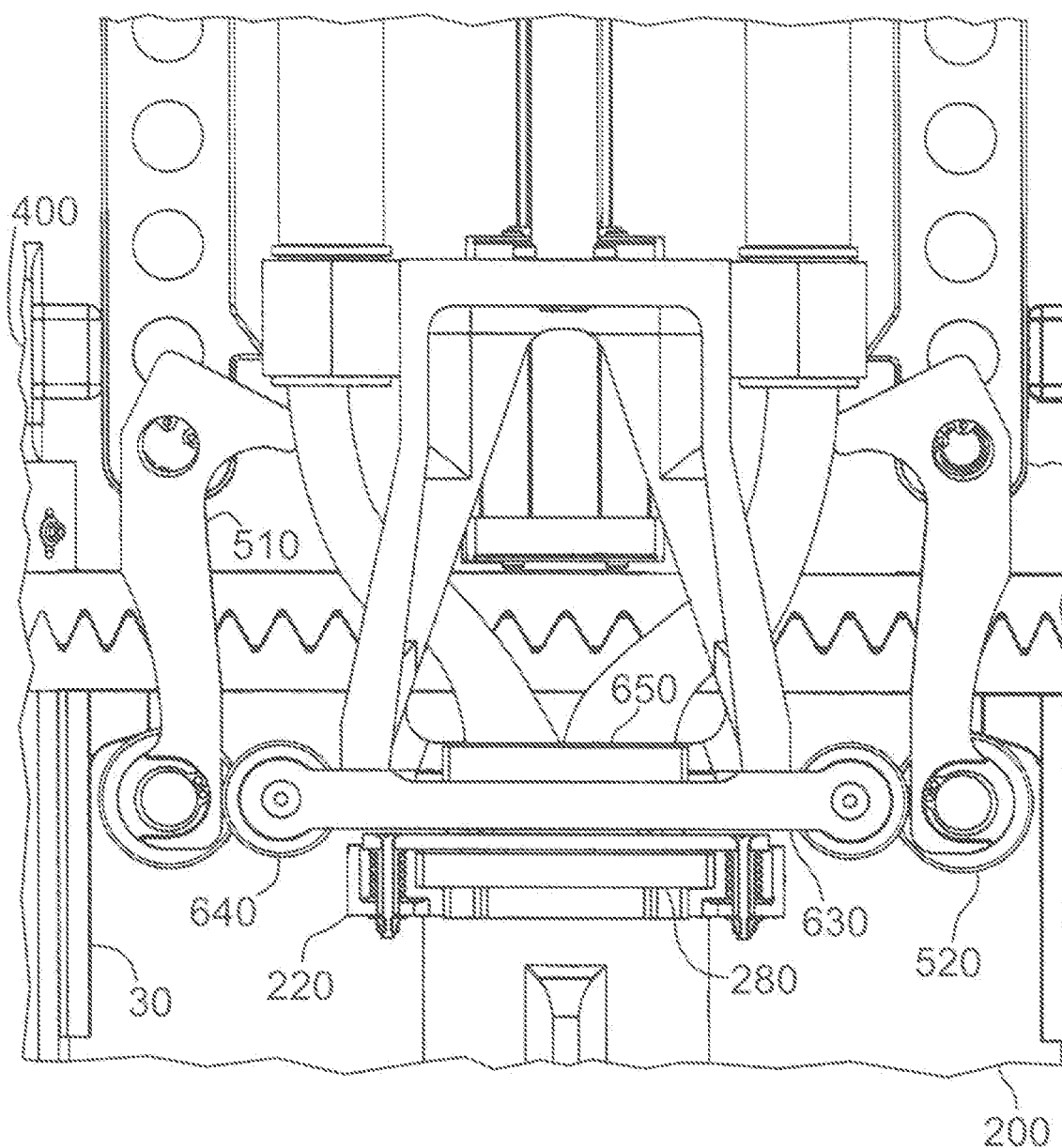

FIG. 24D shows the AIA 400 fully structurally latched to the PIA 200. The actuator rollers 640 have forced the latch arms 510 to their most outward position forcing the latch rollers 520 not only into contact with the latch ramp 230, but up the inclined surface of the latch ramp 230 such that the position of the latch arm 510 and latch pillar 550 are moved towards PIA 200. This action compresses the Belleville springs 600 (FIG. 8) exerting a force on the load sensor 580 (FIG. 8) that verifies that the desired structural preload between the two assemblies has been achieved. The electrical connection has not yet been made. If no electrical connection is to be made to the PIA 200, the latch sequence may halt here with the two assemblies structurally connected.

Where mating of the two halves of the electrical connector 650 and 280 is required, the connector plate 630 is further extended. FIG. 24E shows the connector plate 630 positioned further towards PIA 200. The actuator rollers 640 remain in full contact with the latch arms 510 but do not push them further apart, thus the preload does not change. The movement of the connector plate 630 towards PIA 200 forces the first half of the electrical connector 650 attached to the connector plate 630 into engagement with the second half of the electrical connector 280 attached to the connector frame 220 thus completing the electrical connection of the AIA 400 to the PIA 200 and also completing the latch sequence.

Figure 25:
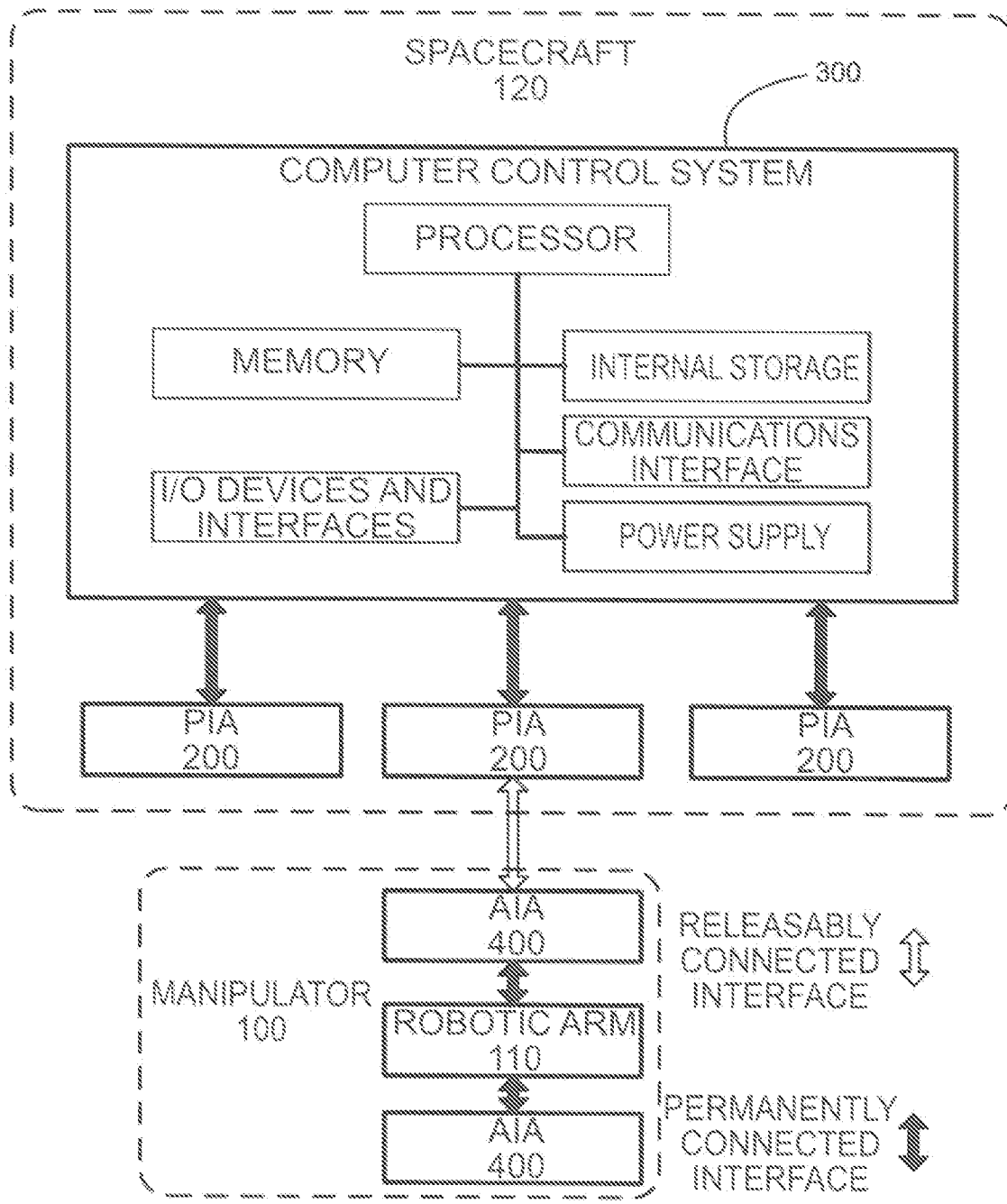
FIG. 25 is a system block diagram illustrating the principle functional blocks and connections when the manipulator is mated to the spacecraft but has not yet mated to a payload.

FIG. 25 is a block diagram illustrating the avionics interfaces within the system when the manipulator 100 is fully latched to the spacecraft 120 and not yet connected to the PIA 200 attached to a payload 130. It also shows the avionics interfaces at that point while the manipulator 100 is transitioning from one PIA 200 on a Spacecraft 120 to a different PIA 200 on the same Spacecraft 120.

Figure 26:
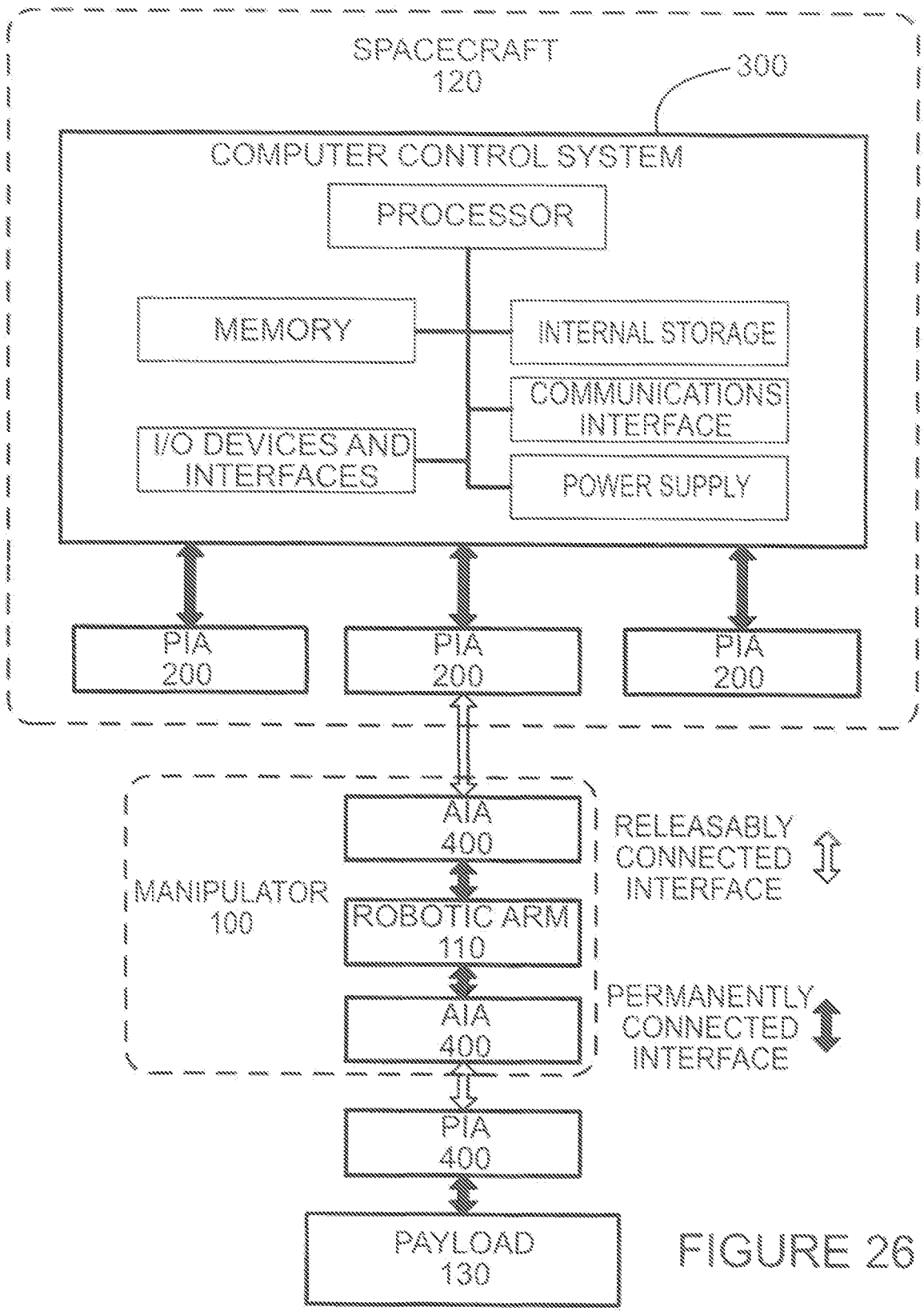
FIG. 26 is a system block diagram which like FIG. 25 shows the mating interface between the arm and spacecraft but also shows the connections between the other end of the robotic arm which is terminated with a second AIA that mates to the PIA on a payload.

FIG. 26 is a block diagram illustrating the avionics interfaces within the system when the manipulator 100 is fully latched to the spacecraft 120 and also fully latched to the PIA 200 attached to a Payload 130.

Figure 27:
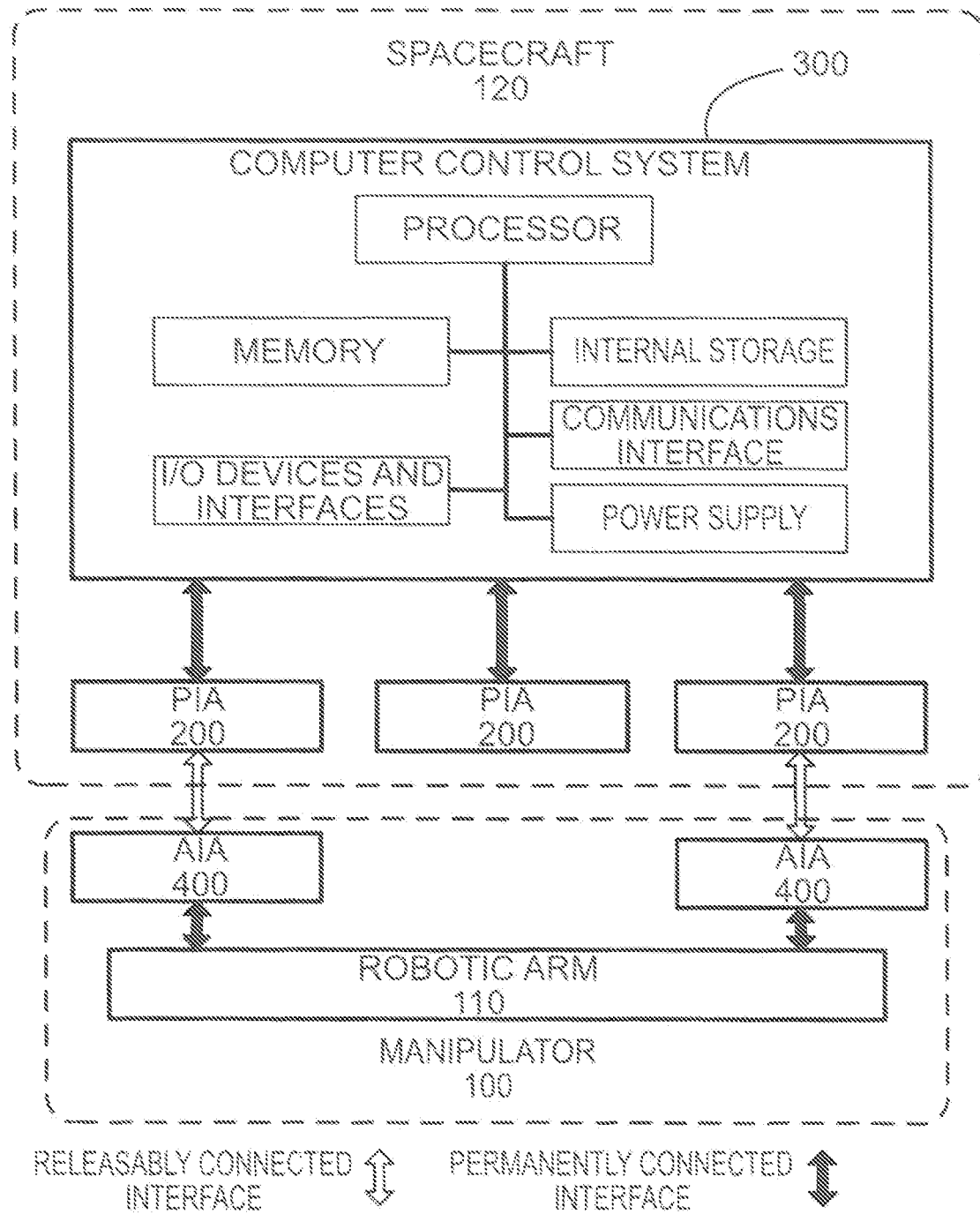
FIG. 27 is a system block diagram illustrating the principle functional blocks and connections when the manipulator is mated to the spacecraft at two locations, an essential state in the process of "walking" the manipulator from one PIA to another on the same spacecraft.

FIG. 27 is a block diagram illustrating the avionics interfaces within the system while the manipulator 100 is transitioning from one PIA 200 on a spacecraft 120 to a different PIA 200 on the same spacecraft 120 where the manipulator 100 is fully latched to one PIA 200 on the spacecraft 120 and also fully latched to a different PIA 200 attached to the same spacecraft 120.

Figure 28A:
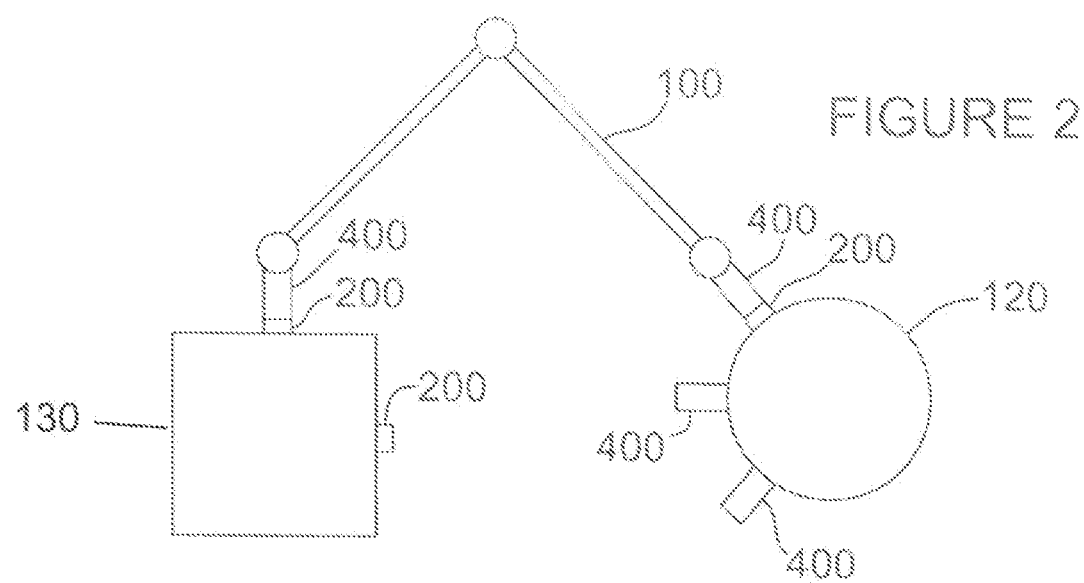
FIG. 28A to 28C show a series of Figures illustrating an alternate embodiment showing how a payload 130 may be releasably berthed to a spacecraft 120 via the use of an AIA 400 fixed to the spacecraft 120 and a PIA 200 fixed to a payload 130.
Figure 28B:
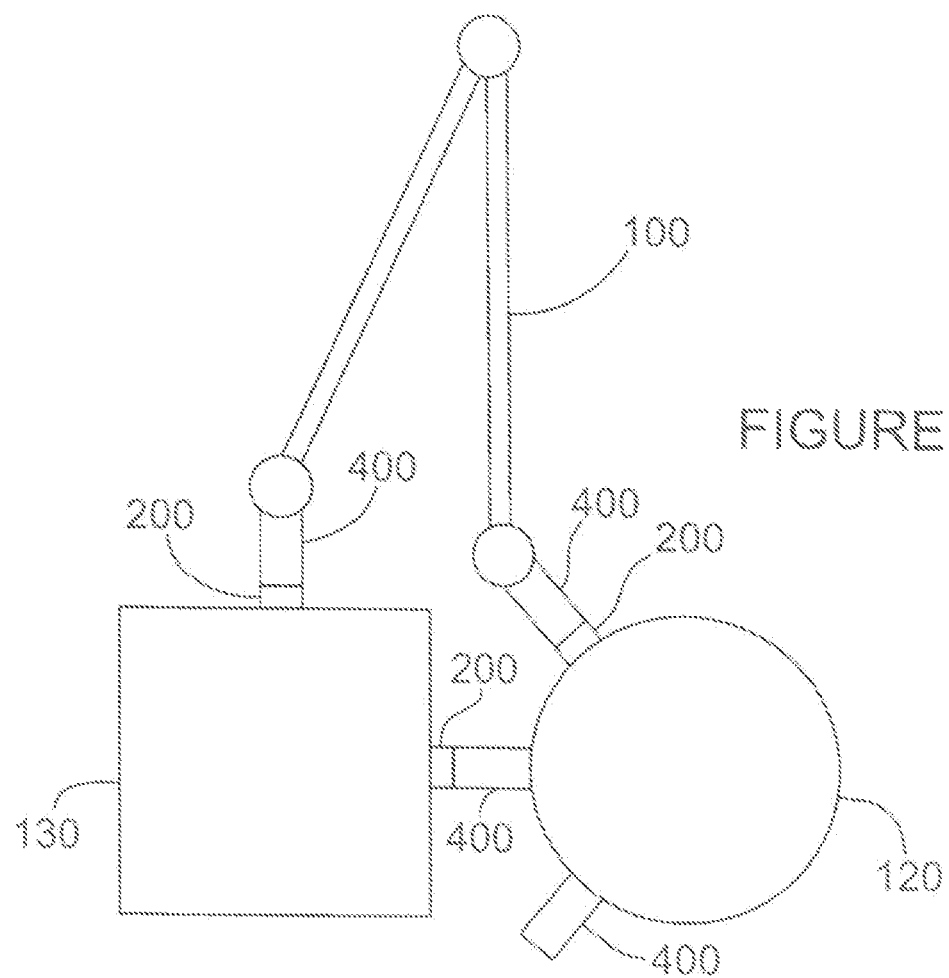
Figure 28C:
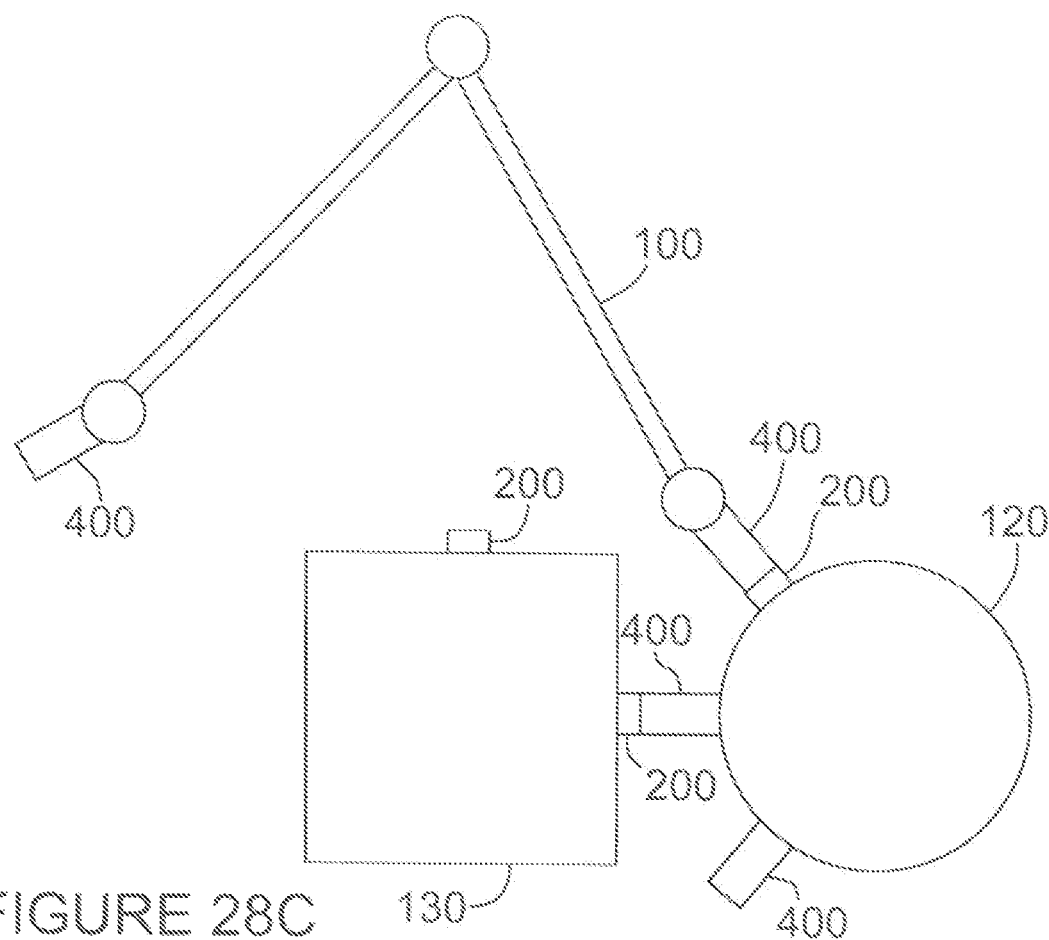

FIGS. 28A to 28C illustrate this alternate embodiment. FIG. 28A shows the manipulator 100 manoeuvering an attached payload 130 fitted with a PIA 200 towards an AIA 400 fixed to the spacecraft 120. FIG. 28B shows the payload 130 releasably mated to both the manipulator 100 and the spacecraft 120. FIG. 28C shows the payload 130 now releasably mated to the spacecraft 120 with the manipulator 100 free to perform other tasks.

FIGS. 28A to 28C illustrate an alternate embodiment where a payload 130 may be releasably attached to a spacecraft 120 using an AIA 400 attached directly to the spacecraft 120 mating to an additional PIA 200 attached to the payload 130.

FIGS. 29A to 29D show an additional embodiment where an assemblage of multiple payloads may be created using additional PIAs 200 and AIA's 400 attached to any number of payloads 130 and the spacecraft 130.

Figure 30:
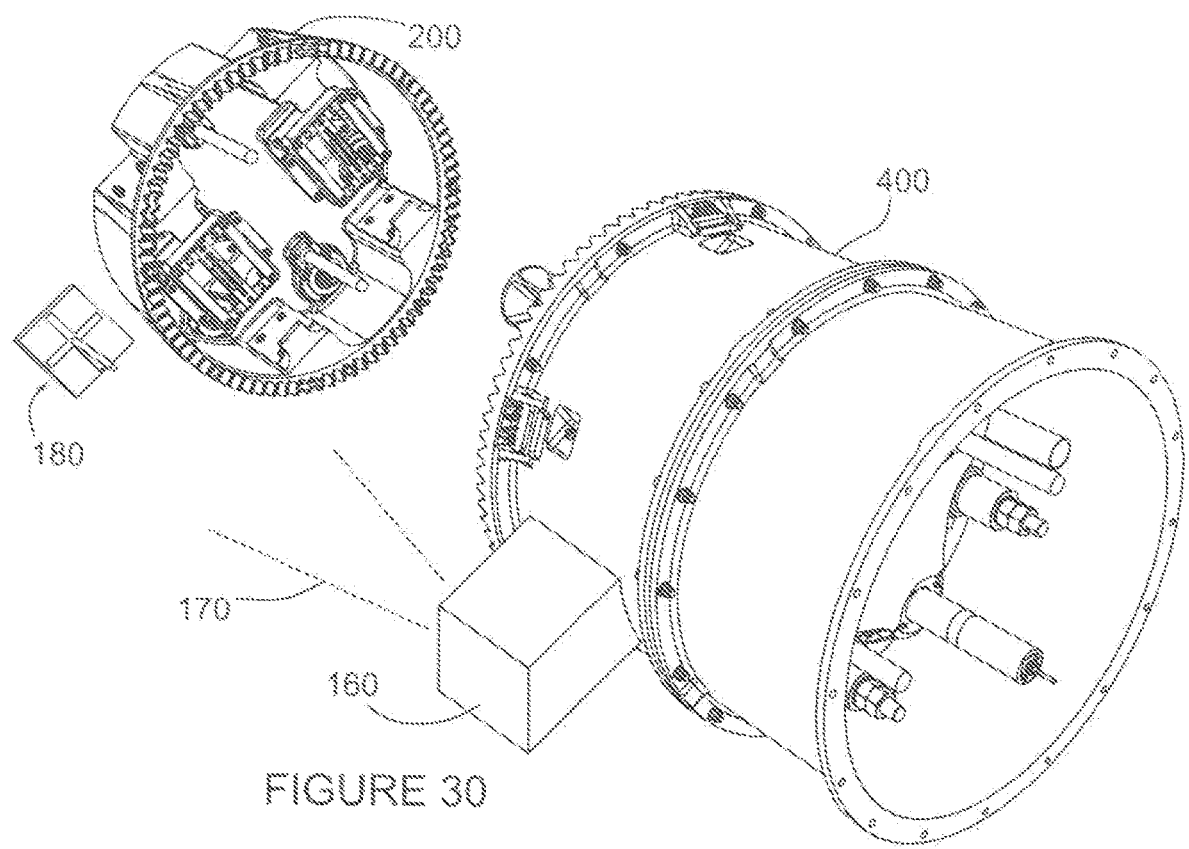
FIG. 30 is a repeat of FIG. 2 with the addition of a camera system mounted to the AIA 400 that via viewing angle 170 can see a target 180 located in a known position relative to the PIA 200.

FIG. 30 illustrates an embodiment where a sensor system, in this case a camera-based machine vision system, can be used to guide the PIA 200 into the capture envelope of the AIA 400.

Method of Operation

FIG. 1 shows the spacecraft 120 with permanently fastened passive interface assembly PIA 200, and containing a computer control system 300 which may communicate 150 with a ground station on earth 150 if required. The PIA 200 is releasably mated to a manipulator 100 that consists of an arm subassembly 110 and two active interface assemblies AIA 400. The unmated AIA 400 at the distal end of the arm subassembly 110 is depicted approaching a payload 130 which is attached to some other object, not shown, which may be the spacecraft 120 or some other fixed location in space. The payload 130 also has at least one PIA 200 permanently fastened to it.

Both the spacecraft 120 and the payload 130 may have more than one PIA 200 fastened to them (see FIGS. 28 and 29). In the case of a spacecraft 120 (which contains the computer control system 300 capable of controlling the entire manipulator 100, including the attached AIAs 400) with more than one PIA 200, the manipulator 100 may be commanded to sequentially mate to a different PIA 200 within reach on the spacecraft 120, unmate the AIA 400 at the base of the manipulator 100 from its PIA 200 and then move the arm subassembly 110 so as to mate what was the base AIA 400 to yet another PIA 200 (not shown) located on the spacecraft 120 thus moving the manipulator 100 around the spacecraft 120 from one PIA 200 to a different PIA 200 permitting the reach of the manipulator 100 to be significantly extended.

In detail, to mate any AIA 400 to any PIA 200, the computer control system 300 commands the arm subassembly 110 to move the unmated AIA 400 into proximity to the PIA 200. Positioning the AIA 400 with sufficient accuracy to permit mating it to the PIA 200 may be accomplished in several ways, which include, but are not limited to autonomous control by the computer control system 300 or human-in-the-loop command from a remote location, possibly using communication 150 with a ground station 140, using various sensors that may include cameras (illustrated in FIG. 30), radar, LIDAR, etc. or the payload 130 may manoeuver the PIA 200 under the control of the payload 130 to within the capture envelope of the AIA 400. For the purposes of explanation, further description will assume that the manipulator 100 is moving the AIA 400 to complete the mating function, however, it is possible for the PIA 200 on the payload 130 to be the portion of the interface that actually moves into contact with the AIA 400.

The volume of space and the relative positions of the PIA 200 and the AIA 400 wherein a successful mating of the two halves of the interface may be achieved is termed the capture envelope. This capture envelope includes the relative positions, attitudes and motions of the AIA 400 and PIA 200 as well as several environmental factors such as temperature, and static electrical charge. If all elements of the defined capture envelope are met, a successful mating of the AIA 400 to the PIA 200 can be accomplished. It is a beneficial feature of the low-profile manipulator interface system that the means for mating of the AIA 400 to the PIA 200 are contained in the AIA 400 and controlled via the AIA 400 to PIA 200 connection at the base or shoulder of the manipulator 100. This means that the payload 130 can be completely passive during the mating sequence, thus reducing the complexity of both the PIA 200 and the payload 130 it is fastened to, to the cost and mass benefit of both.

FIG. 30 illustrates one possible method by which the PIA 200 may be positioned within the capture envelope of the AIA 400. The camera system 160 is electronically connected to machine vision software that forms part of the computer control system 300 (see FIG. 25) and is used in conjunction with a target 180 that is configured to convey information about the relative positions of the camera system 160 and the target 180 when within the field of view 170 of the camera 160. The machine vision software within the computer control system 300 uses the relative positions of the camera system 160 and the target 180 to compute the commands necessary to manoeuver the PIA 200 into the capture envelope of the AIA 400.

The mating of the AIA 400 to the PIA 200 takes place in two main phases once the PIA 200 has entered the capture envelope of the AIA 400. The first is the coarse alignment and contact, the second is fine alignment and latching.

Coarse Alignment and Contact

Referring to FIG. 23A, the AIA 400 is shown located within the capture envelope in the approach mode at the lateral limit of the capture envelope. There will also be some maximum angular misalignment permitted. Ideally the AIA 400 will be more accurately aligned to the PIA 200 at this point, but the maximum lateral misalignment is shown to better illustrate the alignment functions of the low-profile manipulator interface system. The alignment process to position the AIA 400 within the capture envelope is achieved through position control of the robotic arm 100.

In one embodiment, the positioning of the AIA on the end of the robotic arm 110 is achieved through teleoperation control, whereby a remote operator, in the spacecraft 120 or controlling the arm from a remote ground control station 140 via radio communications 150 on earth specifies incremental position or rate commands via a motion input device such as a hand controller, based on visual feedback from a camera system 160 (FIG. 30) showing views of a target 180 (FIG. 30) located in a known position relative to the PIA 200. Relative misalignment of the target with respect to a reticle shown on the centre of a remote control station TV screen is an indication of the translational or angular misalignment of the AIA alignment sockets 800 and the PIA alignment pins 240.

In an alternate embodiment, a machine vision system can be used to guide the motion of the robotic arm 110. Images of the target 180 from the camera system 160 are fed into computer vision software resident on the computer control system 300. The relative pose (translational position and angular orientation) of the target 180 to the AIA 400 are computed using techniques such as photogrammetry or object recognition. This relative pose, which equates to the misalignment error, is used by the control system controlling the position of the distal end of the manipulator 100 to null the error and position the AIA 400 within the capture envelope.

Final assessment that the PIA 200 is within the capture envelope of the AIA 400 can be established by several means that include, but are not limited to computed knowledge of where the AIA 400 is relative to the PIA 200, based upon sensors 122 in various parts of the arm subassembly 110 and measurements made during manufacture or calibrated once in service, mechanical touch probes attached to either the AIA 400 or PIA 200, cameras and precisely aligned targets either attached to the AIA 400 and PIA 200 or cameras 126 based on the spacecraft 120 with sufficient resolution to establish positions.

With the PIA 200 within the capture envelope of the AIA 400, the computer control system (CCS) 300 commands the arm subassembly 110 to move the AIA 400 attached to the free end of the arm subassembly 110 closer to the PIA 200. Because it is within the capture envelope, the motion commanded by the CCS 300 is in a direction parallel with the longitudinal axis of the alignment sockets 800. As shown in FIG. 23B, initial contact of the alignment pins 240 is against the conical opening of the alignment sockets 800. The forces that result from this contact are sensed by the force moment sensor (FMS) 810 at the base of each alignment socket 800 and fed back to the CCS 300 which modifies the motion command of the robotic arm and AIA 400 so as to minimise moments about axes orthogonal to the insertion axis and forces lateral to the alignment socket 800 while continuing to push the alignment sockets 800 progressively on to the base of the alignment pins 200.

One such method for controlling forces and moments during this type of insertion process is described in Results of Human-in-the-Loop Testing of the Force/Moment Accommodation Feature Using the Special Purpose Dexterous Manipulator Ground Test Bed, Lymer, J.; Mukherji, R., 30th International Conference on Environmental Systems, 2000. Iteratively manoeuvering the AIA 400 to minimise the forces has the effect of moving the AIA 400 into successively better alignment with the PIA 200 as the distance between the two assemblies diminishes. FIG. 23C shows the AIA 400 moving towards the PIP 200 with the alignment pins 240 running against the conical surface of the alignment sockets 800 and becoming more aligned with the bore of the alignment sockets 800. Once the alignment pins 240 are centred within the long bore of the alignment sockets 800 the coarse alignment of the AIA 400 to the PIA 200 is complete.

The FIG. 23D does show an idealised state. In reality perturbations and imprecisions in the motion of the arm subassembly 110 will mean that the alignment pins 240 will continue to contact the sides of the bore of the alignment socket 800 throughout this phase of the mating sequence. The CCS 300 will act to actively minimise these contacts while also being programmed to not cause excessive motion in the arm subassembly 110 in attempts to find an optimal solution.

As described thus far, the alignment socket 800 imposes predominantly moment loads upon the FMS 810 which it then transmits to the CCS 300. These loads are transmitted mechanically through the FMS plate 820 which connects the alignment socket 800 to the FMS 810. Once the alignment pin 240 is at nearly the full depth of the bore of the alignment pin 240 a means is needed to sense and control the final contact between the AIA 400 and the PIA 200. As shown in FIGS. 12 and 23, just before the point of final contact of the two Hirth couplings 210 and 430 the tip of the alignment pin 240 will contact the reaction washer 840 which then compresses the spring 850 which runs within the spring bushing 830. This contact produces a longitudinal force upon the FMA plate 820 that is transmitted to the FMS 810. This allows the FMS 810 to sense both the moments generated along the bore of the alignment socket 800 and the longitudinal forces generated when the reaction washer 840 is contacted by the alignment pin 240. The stiffener plate 860 provides a sufficiently stiff connection between the alignment socket 800 and the forward housing 410 so that the FMS 810 may generate correct readings.

It should be noted that in an alternate embodiment of the AIA, a full force-moment sensor 850 will not be incorporated. Instead the force and moment sensing required to perform the coarse alignment described in FIGS. 23B to 23D will be performed by an independent force and moment sensor located in between each end of the arm sub-assembly 110 and the AIAs 400. In this application, the FMS 810 in the AIA can be replaced with a simpler contact sensor indicating that the tip of alignment pins 240 have reached a sufficient travel down the alignment sockets 800. The force control system for the robot arm sub-assembly will use this alternative force-moment sensor to control contact forces which result during the coarse alignment of the AIA 400 and the PIA 280, noting its different position within the overall robot manipulator system 100 topology. With the alignment pins 240 in contact with the reaction washers 840, the arm subassembly 110 continues to move the AIA 400 closer to the PIA 200 until the two Hirth couplings 210 and 430 come into contact. This contact is sensed by the series of microswitches 440 placed peripherally about the circumference of the forward housing 410. These microswitches 440 indicate contact between the two halves of the interface. Their position around the periphery of the contact surfaces provides sensing that the contact is uniform around the circumference and that the contact is suitable to initiate the latch sequence. At this point the coarse alignment and contact phase is complete.

Fine Alignment and Latching

Once the coarse alignment and contact phase is complete, the AIA 400 performs the fine alignment and latching sequence to complete the process of mating to the PIA 200. Referring to FIGS. 24A, 7, 8, and 20, FIG. 24A shows the mechanism in the unlatched condition and is approximately the same condition as shown in FIG. 23E with the exception that the AIA 400 has come into sufficient contact with the PIA 200. The two Hirth couplings 240 and 430 are in sufficient and even contact as sensed by the alignment pin 240 having depressed reaction washer 840 sufficiently to generate the correct contact force on the FMS 810 and the four microswitches 440 having been activated to indicate all-round contact. At this point there may still remain some small gap and rotational misalignment between the Hirth couplings 240 and 430. The connector plate 630 and associated actuator rollers 640 are in the fully retracted position holding the latch arms 510 and associated latch rollers 520 also in their fully retracted position.

At this point the CCS 300 commands the motor 900 to turn thereby driving the motor output gear 940 (shown in FIGS. 11 and 12) which thereby turns the idler gear 920 which, in turn, simultaneously drives the two latch drive gears 930 which are attached to the two ball screws 680. With the latch drive gears 930 longitudinally fixed in the AIA 400 by the two idler bearings 990, rotating the latch drive gears 930 has the effect of forcing the shaft of the ball screw 680 to move forwards or backwards along the long axis of the ball screw 680. The shaft of the ball screw 680 is connected to the base of the actuator frame 660 and rotationally fixed to the actuator frame 600 by the use of the keyed bushing 700, which, because the actuator frame 660 is rotationally fixed to the linear bearing platform 480 and linear bearing rail 470 prevents the shaft of the ball screw 680 from rotating. Therefore, the rotation of the base of the ball screw 680 forces the shaft of the ball screw 680 to move longitudinally. When the shaft of the ball screw 680 moves towards the pia 200, it forces the connected actuator frame 660 and connector plate 630 to move forward as well.

In order for the CCS 300 and any human controllers to understand the positions of the various components during the latch sequence, sensors are used to establish the position of the actuator frame 660. A plurality of microswitches 760 are supported on the microswitch tree 770 and each generates a signal as the microswitch 760 is tripped by engaging the various microswitch actuation surfaces 790 that are formed into the surface of the actuator frame 660 (see FIG. 11). While microswitches 760 are used in this embodiment, other linear sensors such as potentiometers and resolvers can be used instead to provide similar sensing of the position of the actuator frame 660 and thereby knowledge of the state of the latch assembly 500.

Attached to the connector plate 630 are the actuator rollers 640 which rotate around the actuator axles 740 and are supported by actuator needle bearings 710 to permit free rotation. The actuator rollers 640 are in constant and close contact with the latch arms 510 on the latch cam surfaces 350 which are shaped specifically to impart the desired motion in the latch arms 510. As the actuator rollers 640 are pushed further towards the PIA 200 by the extending shaft of the ball screw 680, the actuation rollers 640 push the latch arms 510 outwards.

The latch arms 510 are secured to the latch pillars 550 by the latch axles 730 and rotate about the latch axles 730. The latch pillars 550 are free to move longitudinally and are supported in the midplane plate 540 by the pillar bushings 560. Restricting the longitudinal motion of the latch pillars in the midplane plate 540 are the Belleville springs 600, protected by the spring housing 610 and retained by the jam nuts 620. The Belleville springs 600 bear upon the spring washer 590, which serves to even out the concentrated load from the Belleville springs 600, which then bears upon the load sensor 580 which is calibrated to sense the forces moving the latch pillar 550 through of the midplane plate 540. The load sensor 580 sits upon the load sensor washer 570 which evens out the load distribution seen by the load sensor 580. The load sensor 580 is connected to the CCS 300 which uses the forces sensed to control the latching sequence.

At the point shown in FIG. 24B the latch arms 510 have started to move and the latch rollers 520, while not in contact with the latch ramps 230 do extend outwards to a point where the PIA 200 can no longer be withdrawn past them. The connection is not sufficient to withstand significant structural loads or to make the electrical connections, but is sufficient to prevent the AIA 400 and PIA 200 from drifting apart should there be an event that stops the latching sequence at that point.

FIG. 24C shows the latch sequence further advanced with the connector plate 630 moved towards the PIA 200 in the Figure) and the latch arms 510 further extended. It can be seen that the latch rollers 520 will soon contact the latch ramp 230.

Once the latch arms 510 have been extended to the point where the latch rollers 520 contact the latch ramp 230 the connector plate 630 continues to extend towards the PIA 200 pushing the latch rollers 520 further outwards. This additional outwards movement of the latch rollers 520 forces the latch rollers 520 up the inclined plane of the latch ramp 230. The inclined surface of the latch ramp 230 is shaped such that as the latch rollers 520 move outwards along them the PIA 200 is forced towards the AIA 400 thus forcing the two Hirth couplings 240 and 430 together completing the fine alignment of the AIA 400 to the PIA 200 and creating the desired preload that acts to prevent the two halves of the interface from separating under operating loads. The preload force is reacted through the latch arms 510, to the latch pillar 550 which via the jam nuts 620 and spring housing 610 compresses the Bellville springs 600 allowing the latch pillar 550 and latch arms 510 to move a small distance towards the PIA 200 compared to the unlatched position, in which the base of the latch pillar 550 is in contact with the midplane plate 540. The compression of the Belleville Springs 600 exerts a force on the load sensor 580 in direct relation to the amount of movement of the latch pillar 550 and latch arms 510 caused by the latch rollers 520 moving up the inclined plane of the latch ramp 240. When the Belleville Spring 600 forces on the load sensor 580 achieve a pre-established level, the desired preload between the two halves of the interface have been achieved.

FIG. 24D shows the AIA 400 fully structurally latched to the PIA 200. The actuator rollers 640 have forced the latch arms 510 to their most outwards position forcing the latch rollers 520 not only into contact with the latch ramp 230, but up the inclined surface of that latch ramp 230 such that the position of the latch arm 510 and latch pillar 550 have been moved towards the PIA 200.

As of this point the latch sequence is structurally complete but the electrical connection has not yet been made therefore the latch is considered to be partially "hard docked". If no electrical connection is to be made to the PIA 200, the latch sequence may halt here with the two assemblies structurally connected. In fact, if electrical connections are not required, the PIA 200 in this case may not contain electrical connectors 280, connector frames 220 or connector brackets 290.

If making electrical connections between the AIA 400 and PIA 200 is desired then the connector plate 630 is further advanced towards the PIA 200. The shape of the latch cam surface 350 is such that this continued advancement of the connector plate 630 does not push the latch rollers 520 further outwards and thus the preload forcing the AIA 400 and PIA 200 together does not change. The connector plate 630 continues to be advanced until the connector 650 contacts the mating connector 280 and engages, making the electrical connection.

FIG. 24E shows the connector plate 630 having advanced further towards the PIA 200 and having completed mating of the electrical connection. The actuator rollers 640 remain in full contact with the latch arms 510 but do not push them further apart, thus the preload has not changed. The movement of the connector plate 630 towards the PIA 200 forces the connector 650 attached to the connector plate 630 into engagement with the connector 280 attached to the connector frame 220 thus completing the electrical connection of the AIA 400 to the PIA 200.

Once the latch sequence is complete no further power is required to maintain the structural and electrical connection between the AIA 400 and PIA 200 because the shape of the latch cam surface 350 is such that at that point the forces generated by the preload mechanism are in equilibrium and do not act to cause the connector plate 630 to retract or reduce the preload.

To disconnect or demate the PIA 200 from the AIA 400, the above sequences are run in reverse. The motor 910 is commanded to rotate the opposite direction as before, the shaft of the ball screw 680 retracts away from the PIA 200 bringing with it the connector plate 630 and actuation rollers 640. This causes the connectors 280 and 650 to separate, and then the latch arms 510 to withdraw towards each other first allowing the latch rollers 520 to move down the inclined plane of the latch ramp 230, thus removing the preload, and then move away from the latch ramps 230 entirely, eventually moving sufficiently that the lip of the latch ramps 230 is no longer obstructed by the latch rollers 520 and the AIA 400 may be freely withdrawn from the PIA 200 by the CCS 300 commanding the motion of the arm subassembly 110.

Additional Embodiments

The foregoing description of the preferred embodiments of the disclosure has been presented to illustrate the principles of the disclosure and not to limit the disclosure to the particular embodiment illustrated. It is intended that the scope of the disclosure be defined by all of the embodiments encompassed within the following claims and their equivalents.

The preferred embodiment disclosed uses two Latch Assemblies 500, however only one is necessary for the invention disclosed to operate correctly. In this embodiment two have been used to leave room between them for additional tools or sensors to be affixed to the AIA 400 to perform additional tasks.

Additionally, greater force and moment loads or greater economies of scale may be achieved by using more than two latch assemblies 500.

The current embodiment also uses the Hirth style coupling to react rotational loads and moments at the interface between the AIA 400 and the PIA 200. Other styles of couplings, such as curvic couplings or "dogs and slots", may be used if advantageous.

It will be understood that the definition of "spacecraft" and "payload" in this disclosure is based upon which of the objects being attached to the manipulator 100 contains the CCS 300 that is actually controlling the manipulator 100. Another embodiment would have a CCS 300 in each of two spacecraft and that control of the manipulator 100 and attached AIAs 400 passes from one CSS 300 to another as operations demand, the role of payload 130 and spacecraft 120 exchanging depending upon which CCS 300 is actually controlling the manipulator 100 at the time. In such a manner a manipulator 100 may transfer from one spacecraft to another as well as from location to location about a single spacecraft.

While it maximises the utility of the manipulator 100 to have it releasably mounted on a PIA 200 affixed to the spacecraft 120, the low-profile manipulator interface system works equally well if it is part of a manipulator 100 that is permanently attached to a spacecraft.

Similarly, the actual presence of a manipulator 100 or arm subassembly 110 is not necessary for the low-profile manipulator interface system to function as long as there exists a means to perform the "coarse alignment" of the AIA 400 into sufficiently close proximity of the PIA 200 such that the latch assembly 500 can engage the features on the PIA 200 and create the proper preload between the AIA 400 and PIA 200. With a suitably compliant mounting system, the low-profile manipulator interface system could be used to berth payloads 130 to one or more storage locations on the spacecraft 120, each fitted with a permanently attached AIA 400. In this embodiment, an AIA 400 is mounted directly to the surface of the spacecraft without an attached arm subassembly 110 and a payload 130 is manipulated such that the payload manipulation means performs the movement needed to achieve the coarse alignment and contact sequences at which time the AIA 400 mounted to the spacecraft 120 performs the fine alignment and latching sequences to secure the payload 130 to the spacecraft 120. The payload 130 manipulation means may include, but is not limited to, another manipulator 100 mounted to the spacecraft 120 or to a different spacecraft.

FIGS. 28A to 28C illustrate this alternate embodiment. FIG. 28A shows the manipulator 100 manoeuvering an attached payload 130 fitted with a PIA 200 towards an AIA 400 fixed to the spacecraft 120 via coupling interface 602. FIG. 28B shows the payload 130 releasably mated to both the manipulator 100 and the spacecraft 120. FIG. 28C shows the payload 130 now releasably mated to the spacecraft 120 with the manipulator 100 free to perform other tasks. Given a notional payload 130 with a PIA 200 on one side and an AIA 400 on another side and electrical connections between the PIA 200 and AIA 400, it would be possible to stack payloads 130, one after another, in a string, from a single AIA 400 mounted on a manipulator 100 or spacecraft 120, thus forming, in effect, a train of payloads 130 which would act rigidly and could be used as building blocks for a larger assembly. Once created, this string or train or assemblage of payloads 130 may be disengaged from the AIA 400 connecting it to the CCS 300, the said assemblage then being free to be used for any other purpose. In such a way, assemblages may be made in space that serve as entirely new spacecraft, as storage facilities, as structural components in other larger structures in space or on a surface, the low-profile manipulator interface system essentially being the fasteners that hold the various pieces together.

Figure 29A:
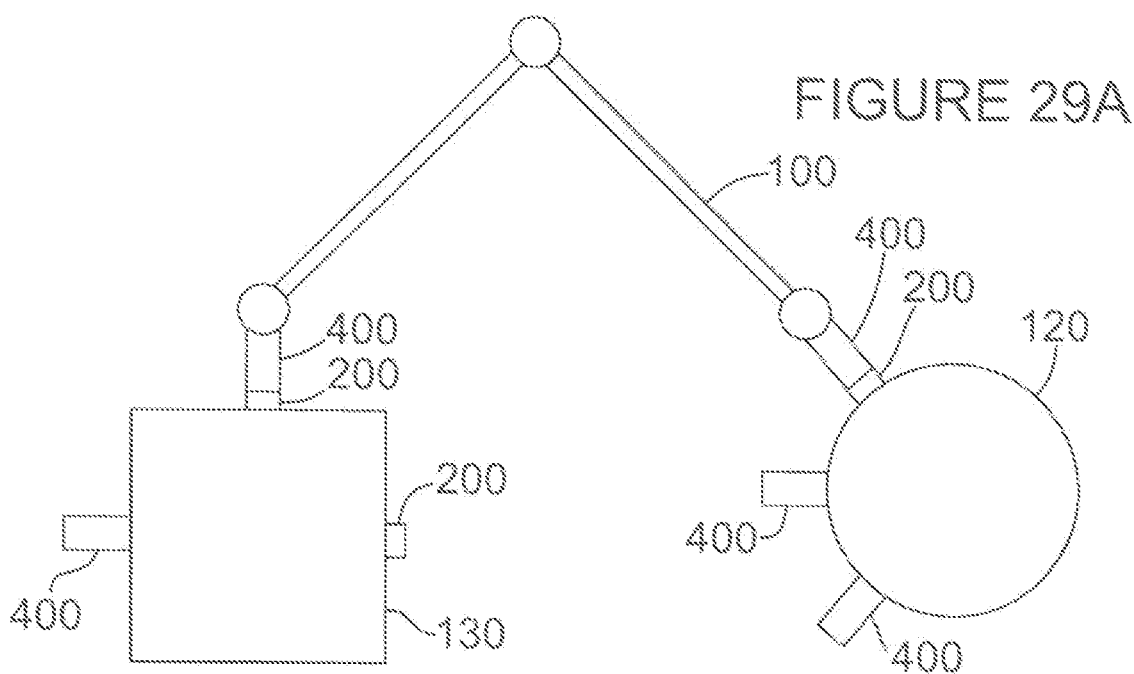
FIG. 29A to 29D are a series of Figures illustrating an alternate embodiment showing a series of payloads 130 releasably mated to each other using a plurality of AIAs 400 and PIAs 200 fixed to each payload 130 and to a spacecraft 120.
Figure 29B:
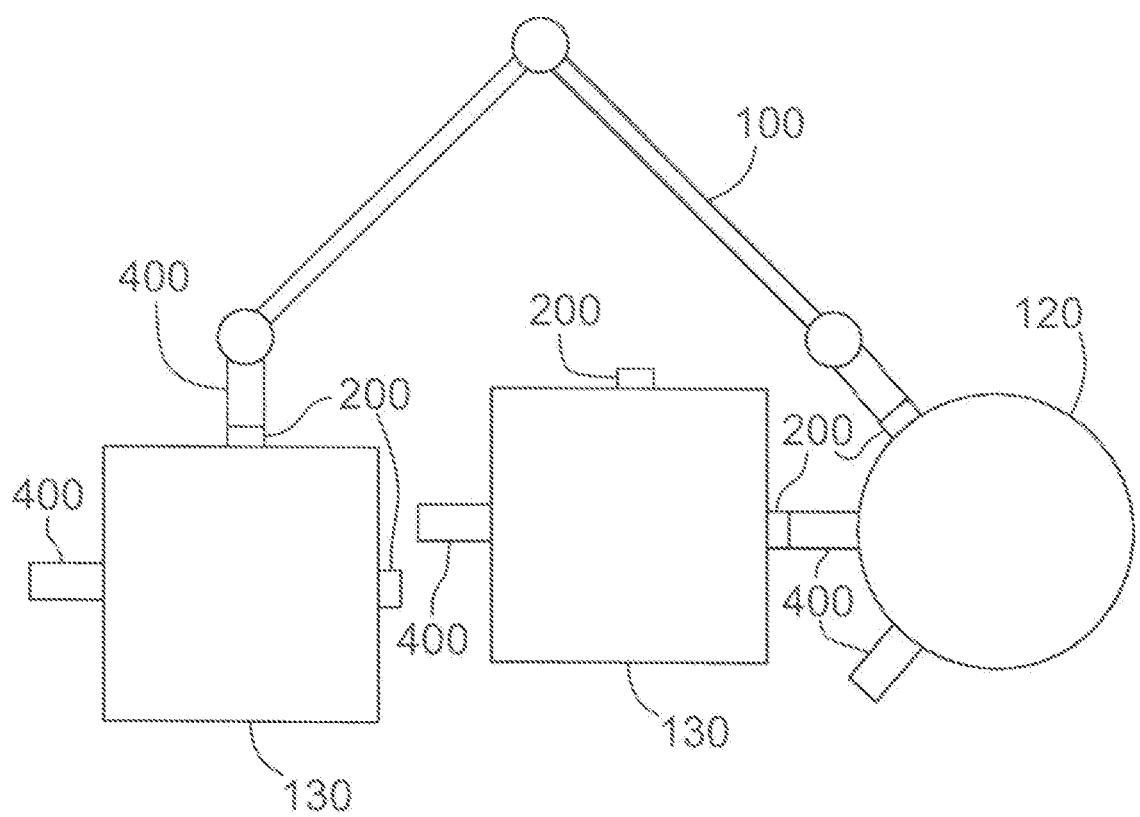
Figure 29C:
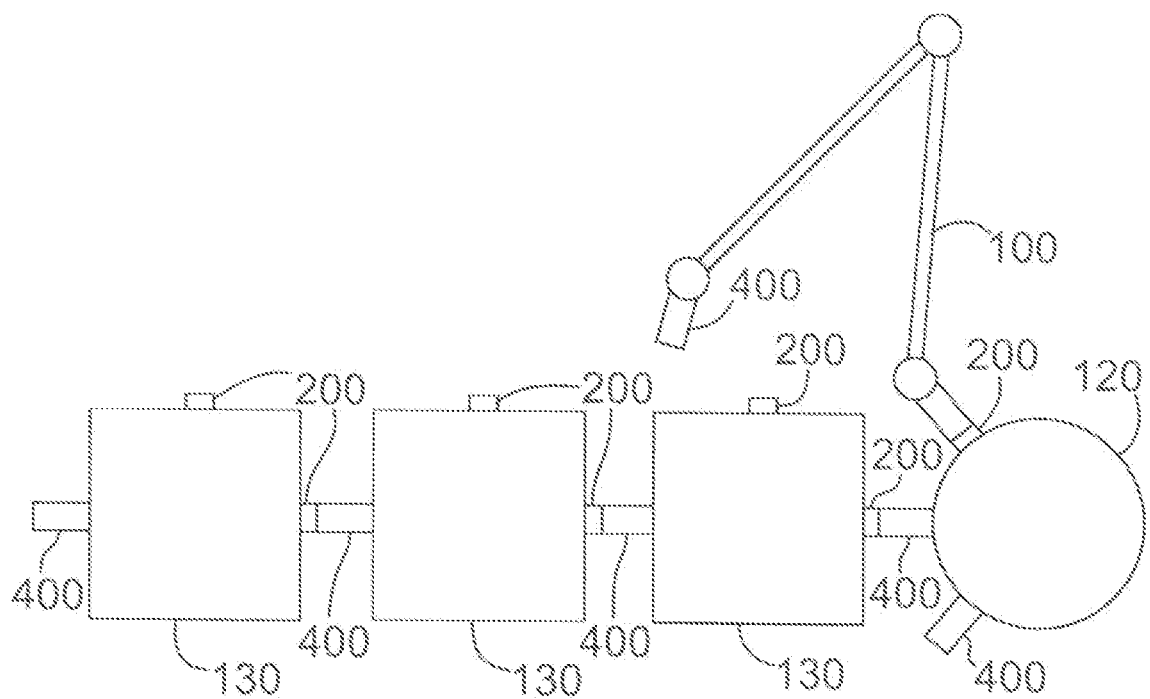
Figure 29D:
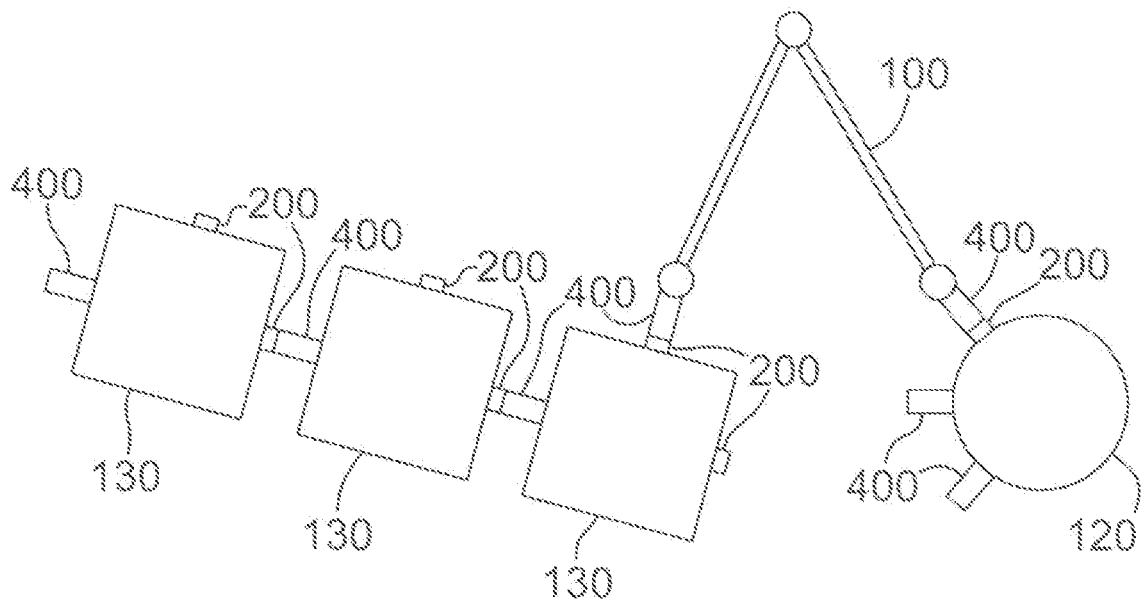

FIG. 29A to 29D illustrate this alternate embodiment showing a series of payloads 130 releasably mated to each other using a plurality of AIAs 400 and PIAs 200 fixed to each payload 130 and to a spacecraft 120. FIG. 29A shows the PIA 200 on a first payload 130 being moved towards an AIA 400 about to be berthed to the spacecraft 120. FIG. 29B shows a payload 130 now releasably mated to the spacecraft 120 and an additional payload 130 being manoeuvered in anticipation of being mated the payload 130 currently releasably mated to the spacecraft 130. FIG. 29C shows an additional payload 130 having been mated to the previous two creating a larger assemblage, FIG. 29D shows the larger assemblage of payloads 130 with the manipulator 100 attached to a PIA 200 on the assemblage, and having been released by the spacecraft-mounted AIA 400, being moved away from the spacecraft 130. While the illustrations depict a linear assemblage of payloads 130, it may be appreciated that by positioning the various PIAs 200 on various surfaces of the various payloads 130, that the resulting assemblage may be of virtually any shape or size.

It is also possible to create a latch mechanism that provides more than one preload between the AIA 400 and PIA 200. By varying the angle of inclined plane of the latch ramp 230, the extension stroke of the latch arm 510 and varying the shape of the latch cam surface 350, the latch assembly 500 can be made to apply different preloads when mated to different PIAs 200. This would permit PIAs 200 to be created with preloads better tailored to the needs of the connection being created so that connections seeing lighter loadings can have lighter and cheaper PIAs 200 than connections that see more severe loads. A single AIA 400 would be able to engage these more and less strong PIAs 200 by varying the stroke of the ball screw 680 connected to the connector plate 630.

In an alternate embodiment (not shown in FIG. 30), the target 180 can be mounted inside the PIA 200 on the same mounting surface as the alignment pins 240 with the camera system mounted inside the ring formed by the hirth coupling 430 on the AIA 400, such that the viewing centre line of the camera is coincident with the centre of the target.

Finally, while the apparatus, system and method associated with the PIA 200 and AIA 400 have been taught for spacecraft assembly and servicing operations as described above, the design could be used in non-space applications where robot based relocation or the picking up of robot payloads such as factory automation or nuclear inspection and maintenance. Any PIAs 200 being used as additional base locations of the manipulator would need to be supplied with power and data connections to some central computing function much like the spacecraft CCS 300.

Therefore what is claimed is:

1. An interface coupling system for releasably securing a selected object to a spacecraft and securing various payloads to the selected object and to each other, comprising:
   a) a robotic arm or other positioning mechanism having proximal and distal ends;
   b) a passive interface assembly attached to a spacecraft and/or a payload;
   c) one or more active interface assemblies attached to the proximal and/or distal ends of said robotic arm or other positioning mechanism with each said active interface assemblies further including at least one force-moment sensor and;
at least one latch mechanism; and
   d) a computer control system connected to said at least one force-moment sensor and said latch mechanism and being programmed with instructions to use the sensed forces and moments output from said force-moment sensor to control the motion of said robotic arm or other positioning mechanism to align one of said active interface assemblies onto said passive interface assembly until they are aligned to initiate a latching sequence by said latching mechanism to releasably and rigidly lock said active and passive interface assemblies together, said at least one force-moment sensor being configured and located in said one or more active interface assemblies such that upon latching of said active and passive interface assemblies together said at least one force-moment sensor is not located in a structural load path of said active and passive interface assemblies when latched together by said at least one latch mechanism.

2. The interface coupling system according to claim 1, wherein each active interface assembly further including;
   a first coupling interface located at a proximal end of the active interface assembly for structurally attaching the active interface assembly to the selected object, electrical connections for electrically connecting the active interface assembly to said selected object, a second coupling located at a distal end of the active interface assembly, an active interface assembly latch mechanism; and
   said passive interface assembly further comprising
   a first coupling located at a proximal end of the passive interface complementary to said second coupling on the active interface assembly for structurally attaching said passive interface assembly to said second coupling,
   a second coupling located at a distal end of the passive interface for affixing said passive interface assembly to a desired object; and
   passive latch features complementary to, and engageable with, said active interface assembly latch mechanism.

3. A method for sensing forces and moments during a sequence of mechanical alignment of two objects during a process of aligning and mating the two objects together, said two objects including complementary alignment features and complementary latching mechanisms, the method comprising:
   mounting a sensor mechanism configured for sensing forces and moments to one or both of the two objects during alignment and mating the two objects together, said sensor mechanism being configured such that said sensor mechanism does not run through a primary structural load path of the two objects once said two objects are rigidly latched together via said complementary latching mechanisms; and
   using a computer control system connected to said one or both of said objects to conduct the process of aligning and latching the two objects together, said computer control system being programmed with instructions to use the sensed forces and moments output from said sensor mechanism to control the alignment of said two objects until they are aligned to initiate a latching sequence to releasably and rigidly lock said two objects together.

4. The method according to claim 3, wherein during alignment of the two objects, said complementary alignment features on the two objects are aligned with each other, and once aligned together and in a state ready to be latched, said computer control system instructs said latch mechanism to engage to rigidly latch the two objects together.

5. The method according to claim 3, wherein said sensor mechanism is a force moment sensor operably coupled to at least one of said alignment mechanisms and configured to sense forces and moments on one or both of said alignment mechanism during alignment and engagement of said two objects.

6. The method according to claim 3, further comprising a first sensor system mounted on one or both of said objects for enabling remote operator control of all activities associated with aligning and latching the active and passive interface assemblies together based on feedback from said first sensor system.

7. The method according to claim 6, wherein said first sensor system comprises any one, or combination of a camera-based vision system, radar and lidar.

8. The method according to claim 3, wherein one or both of said objects are configured to allow one or both of said objects to be grasped by robotic manipulators.

9. The method according to claim 8, wherein said robotic manipulators each include a second sensor system mounted on the robotic manipulators for enabling remote operator control of all activities associated with aligning and latching the active and passive interface assemblies together based on feedback from each second sensor system.

10. The method according to claim 9, wherein said second sensor system comprises any one, or combination of a camera-based vision system, radar and lidar.

* * * * *